United States Patent
Lee et al.

(10) Patent No.: US 12,016,034 B2
(45) Date of Patent: Jun. 18, 2024

(54) METHOD OF OPERATING TERMINAL AND BASE STATION IN WIRELESS COMMUNICATION SYSTEM AND APPARATUS SUPPORTING SAME

(71) Applicant: LG Electronics Inc., Seoul (KR)

(72) Inventors: Kilbom Lee, Seoul (KR); Kyuseok Kim, Seoul (KR); Kijun Kim, Seoul (KR); Jiwon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 290 days.

(21) Appl. No.: 17/417,036

(22) PCT Filed: Dec. 23, 2019

(86) PCT No.: PCT/KR2019/018297
§ 371 (c)(1),
(2) Date: Jun. 21, 2021

(87) PCT Pub. No.: WO2020/130746
PCT Pub. Date: Jun. 25, 2020

(65) Prior Publication Data
US 2022/0095350 A1 Mar. 24, 2022

(30) Foreign Application Priority Data
Dec. 21, 2018 (KR) .................. 10-2018-0167910

(51) Int. Cl.
*H04W 72/23* (2023.01)
*H04L 1/00* (2006.01)
(Continued)

(52) U.S. Cl.
CPC ........... *H04W 72/23* (2023.01); *H04L 1/0003* (2013.01); *H04W 56/001* (2013.01); *H04W 74/0833* (2013.01)

(58) Field of Classification Search
CPC ...... H04W 56/001; H04W 72/23; H04L 5/00; H04L 5/0035; H04L 5/0048
See application file for complete search history.

(56) References Cited

U.S. PATENT DOCUMENTS

2020/0015200 A1* 1/2020 Vilaipornsawai ..... H04W 72/23
2020/0052950 A1* 2/2020 Manolakos ......... H04L 27/2657
(Continued)

FOREIGN PATENT DOCUMENTS

WO  WO2018084663  5/2018

OTHER PUBLICATIONS

Huawei, HiSilicon, "Enhancements on multi-TRP/panel transmission," R1-1812243, 3GPP TSG RAN WG1 Meeting #95, Spokane, USA, dated Nov. 12-16, 2018, 11 pages.
(Continued)

*Primary Examiner* — Yee F Lam
(74) *Attorney, Agent, or Firm* — Fish & Richardson P.C.

(57) ABSTRACT

The present disclosure discloses a method of operating a terminal and a base station in a wireless communication system and an apparatus supporting same. According to an embodiment applicable to the present disclosure, a terminal may establish a connection with a base station on the basis of a synchronization signal/physical broadcast channel (SS/PBCH) block received from the base station. Then, the terminal is set to a transmission mode in which data generated from identical information is transmitted by the base station through a plurality of physical downlink shared channels (PDSCHs), and on the basis of the aforementioned, the terminal may obtain resource information through which the data is transmitted through the plurality of PDSCHs, and obtain related data information.

9 Claims, 38 Drawing Sheets

(51) Int. Cl.
*H04W 56/00* (2009.01)
*H04W 74/0833* (2024.01)

(56) References Cited

U.S. PATENT DOCUMENTS

| | | | |
|---|---|---|---|
| 2020/0100277 A1* | 3/2020 | Khoshnevisan | H04W 72/1273 |
| 2020/0106559 A1* | 4/2020 | Vilaipornsawai | H04L 1/1896 |
| 2020/0153543 A1* | 5/2020 | Khoshnevisan | H04W 72/23 |
| 2020/0205137 A1* | 6/2020 | Khoshnevisan | H04L 1/0013 |
| 2022/0069957 A1* | 3/2022 | Lee | H04W 72/23 |

OTHER PUBLICATIONS

International Search Report and Written Opinion in International Appln. No. PCT/KR2019/018297, dated Apr. 13, 2020, 16 pages (with English translation).

NTT DOCOMO, Inc., "Enhancements on multi-TRP/panel transmission," R1-1813333, 3GPP TSG RAN WG1 Meeting #95, Spokane, USA, dated Nov. 12-16, 2018, 22 pages.

Qualcomm Incorporated, "Multi-TRP Enhancements," R1-1813442, 3GPP TSG-RAN WG1 Meeting #95, Spokane, WA, USA, dated Nov. 12-16, 2018, 22 pages.

ZTE, "Enhancements on multi-TRP/Panel transmission," R1-1812256, 3GPP TSG RAN WG1 Meeting #95, Spokane, USA, dated Nov. 12-16, 2018, 16 pages.

\* cited by examiner (a)

(b)

CW-wise grouping

METHOD OF OPERATING TERMINAL AND BASE STATION IN WIRELESS COMMUNICATION SYSTEM AND APPARATUS SUPPORTING SAME

CROSS-REFERENCE TO RELATED APPLICATIONS

This application is a National Stage application under 35 U.S.C. § 371 of International Application No. PCT/KR2019/018297, filed on Dec. 23, 2019, which claims the benefit of Korean Application No. 10-2018-0167910, filed on Dec. 21, 2018. The disclosures of the prior applications are incorporated by reference in their entirety.

TECHNICAL FIELD

The following description is for a wireless communication system, in the wireless communication system, the terminal performs initial access to the base station, and the terminal acquires data information based on the same information from the base station through a plurality of physical downlink shared channels (PDSCHs). The present invention relates to a method of operating a terminal and a base station related to an operation of obtaining resource information through which the data information is transmitted, and an apparatus supporting the same.

BACKGROUND

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As more communication devices have demanded higher communication capacity, enhanced mobile broadband (eMBB) communication technology relative to legacy radio access technology (RAT) has been introduced. In addition, a communication system considering services/UEs sensitive to reliability and latency as well as massive machine type communication (MTC) for providing various services anytime and anywhere by connecting a plurality of devices and objects to each other has been introduced. Thus, the new generation RAT considering eMBB communication, massive MTC, ultra-reliable and low-latency communication (URLLC), etc. have been introduced.

SUMMARY

An object of the present disclosure is to provide a method for operating a terminal and a base station in a wireless communication system, and devices supporting the same.

The technical objects that can be achieved through the present disclosure are not limited to what has been particularly described hereinabove and other technical objects not described herein will be more clearly understood by persons skilled in the art from the following detailed description.

The present disclosure provides a method for operating a terminal and a base station in a wireless communication system, and devices therefor.

As an example of the present disclosure, a method for operating a terminal in a wireless communication system may include: receiving a sync signal/physical broadcast channel (SS/PBCH) block including an SS and a PBCH from a base station; performing a procedure of access to the base station including transmission of a random access channel (RACH) preamble based on the received SS/PBCH block; receiving, from the base station, downlink control information (DCI) including a plurality of transmission configuration indicator (TCI) states; acquiring, from the base station, mode information related to a first mode for transmission of a plurality of data, the data being based on the same information; based on the DCI and the mode information, assuming that (i) data reception via a plurality of physical downlink shared channels (PDSCHs) is scheduled by the DCI, and that (ii) data received via the plurality of PDSCHs are based on the same information; acquiring resource information about the plurality of PDSCHs based on the assumption; and acquiring data information via the plurality of PDSCHs based on the resource information.

In the present disclosure, the DCI may include two TCI states, wherein the plurality of PDSCHs may include two PDSCHs.

As a specific example, based on a size of precoding resource block group (PRG) bundling configured for the terminal: (i) the resource information about the plurality of PDSCHs may be determined based on a localized PRG configuration based on the size of the PRG bundling being configured with a wideband PRG; and (ii) the resource information about the plurality of PDSCHs may be determined based on an interleaved PRG configuration based on the size of the PRG bundling being set to 2 or 4.

As another specific example, the method may further include: independently determining a frequency position of a phase tracking reference signal (PT-RS) for each of the PDSCHs based on respective frequency resources for the two PDSCHs; and receiving the PT-RS for each of the PDSCHs based on the frequency position of the PT-RS for each of the PDSCHs.

As another specific example, the DCI may include information for two transport blocks (TB), wherein, based on information related to one of the two TBs related to the DCI, the resource information about the two PDSCHs may be determined based on one of a spatial division multiplexing (SDM) mode, a time division multiplexing (TDM) mode, and a frequency division multiplexing (FDM) mode.

As another specific example, the resource information about the two PDSCHs may include frequency resource information about each of the two PDSCHs determined based on information related to one transport block (TB) in information for two TBs included in the DCI.

Herein, based on a configuration of precoding resource block group (PRG) bundling configured for the terminal, a PRG bundling mode of one of a localized PRG or an interleaved PRG may be configured for the terminal, wherein the frequency resource information may be configured differently between the two PDSCHs based on (i) the configured PRG mode and (ii) the information related to the one TB.

More specifically, based on an odd number of total resource block group (RBG) sizes allocated to the terminal: (i) based on a first modulation and coding scheme (MCS) for a first PDSCH among the PDSCHs being higher than a second MCS for a second PDSCH among the PDSCHs, one more RBG may be allocated for the first PDSCH; (ii) based on the first MCS being higher than the second MCS, one more RBG may be allocated for the second PDSCH; or (iii) based on the first MCS being equal to the second MCS, one more RBG may be allocated for the first PDSCH or the second PDSCH; or (iv) one more RBG is allocated for one PDSCH determined based on the information related to the one TB among the PDSCHs.

In the present disclosure, the information related to the one TB may be information related to a TB corresponding to a second order between the two TBs, wherein the information related to the TB corresponding to the second order may include at least one of the followings:

a new data indicator (NDI) related to the second TB;

a redundancy version (RV) related to the second TB; or a modulating and coding scheme (MCS) related to the second TB.

As another specific example, the resource information about the two PDSCHs may include time resource information about each of the two PDSCHs determined based on information related to one transport block (TB) in information for two TBs included in the DCI.

Herein, the time resource information may be related to an offset between time resource positions for the two PDSCHs, wherein frequency resources for the two PDSCHs may be identically configured.

As another specific example, the obtaining of the data information by the terminal via the two PDSCHs may include: obtaining first demodulation reference signal (DMRS) port information for a first PDSCH based on antenna port related information included in the DCI; obtaining second DMRS port information for a second PDSCH based on information related to one of the two TBs related to the DCI; and receiving the data information via the first PDSCH and the second PDSCH based on the first DMRS port information and the second DMRS port information.

In the present disclosure, the two PDSCHs may each be related to two TCI states, wherein the two PDSCHs may be received from different transmission reception points.

As another example of the present disclosure, a terminal operating in a wireless communication system may include: at least one transmitter; at least one receiver; at least one processor; and at least one memory operably connected to the at least one processor and configured to store instructions causing, when executed, the at least one processor to perform a specific operation, wherein the specific operation may include: receiving a sync signal/physical broadcast channel (SS/PBCH) block including an SS and a PBCH from a base station; performing a procedure of access to the base station including transmission of a random access channel (RACH) preamble based on the received SS/PBCH block; receiving, from the base station, downlink control information (DCI) including a plurality of transmission configuration indicator (TCI) states; acquiring, from the base station, mode information related to a first mode for transmission of a plurality of data, the data being based on the same information; based on the DCI and the mode information, assuming that (i) data reception via a plurality of physical downlink shared channels (PDSCHs) is scheduled by the DCI, and that (ii) data received via the plurality of PDSCHs are based on the same information; acquiring resource information about the plurality of PDSCHs based on the assumption; and acquiring data information via the plurality of PDSCHs based on the resource information.

In the present disclosure, the terminal may communicate with at least one of a mobile terminal, a network, or an autonomous vehicle other than a vehicle containing the terminal.

As another example of the present disclosure, a base station operating in a wireless communication system may include: at least one transmitter; at least one receiver; at least one processor; and at least one memory operably connected to the at least one processor and configured to store instructions causing, when executed, the at least one processor to perform a specific operation; wherein the specific operation may include: transmitting a sync signal/physical broadcast channel (SS/PBCH) block including an SS and a PBCH to a terminal; performing a connection establishment procedure with the terminal based on the transmitted SS/PBCH block; transmitting downlink control information (DCI) including a plurality of transmission configuration indicator (TCI) states to the terminal; transmitting downlink control information (DCI) including a plurality of transmission configuration indicator (TCI) states to the terminal; providing, to the terminal, mode information related to a first mode for transmission of a plurality of data, the plurality of data being based on the same information; and based on the DCI and the mode information, transmitting data information based on the same information on a resource indicated by resource information about a plurality of physical downlink shared channels (PDSCHs) via the plurality of PDSCHs.

The above-described aspects of the present disclosure are merely some of the preferred embodiments of the present disclosure, and various embodiments reflecting the technical features of the present disclosure may be derived and understood by those of ordinary skill in the art based on the following detailed description of the disclosure.

As is apparent from the above description, the embodiments of the present disclosure have the following effects.

According to the present disclosure, a base station may schedule a plurality of PDSCHs (or codewords (CWs) or transport blocks (TBs)) for a terminal through one DCI, and the terminal may receive the plurality of PDSCHs through one TRP or a plurality of TRPs.

To this end, the base station should provide the terminal with resource information (e.g., frequency/time resource information, etc.) through which the plurality of PDSCHs is transmitted. However, according to the conventional 5G NR system, it is difficult for the base station to provide resource information for a plurality of PDSCHs to the terminal through one DCI.

On the other hand, according to the present disclosure, the base station and the terminal may transmit and receive the resource information for the plurality of PDSCHs through one DCI, and accordingly, the base station may schedule the plurality of PDSCHs through the one DCI.

In addition, according to the present disclosure, the base station and the terminal may transmit and receive resource information for a plurality of PDSCHs with low signaling overhead.

It will be appreciated by persons skilled in the art that that the effects that can be achieved through the embodiments of the present disclosure are not limited to those described above and other advantageous effects of the present disclosure will be more clearly understood from the following detailed description. That is, unintended effects according to implementation of the present disclosure may be derived by those skilled in the art from the embodiments of the present disclosure.

BRIEF DESCRIPTION OF THE DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

DETAILED DESCRIPTION

Figure 1:
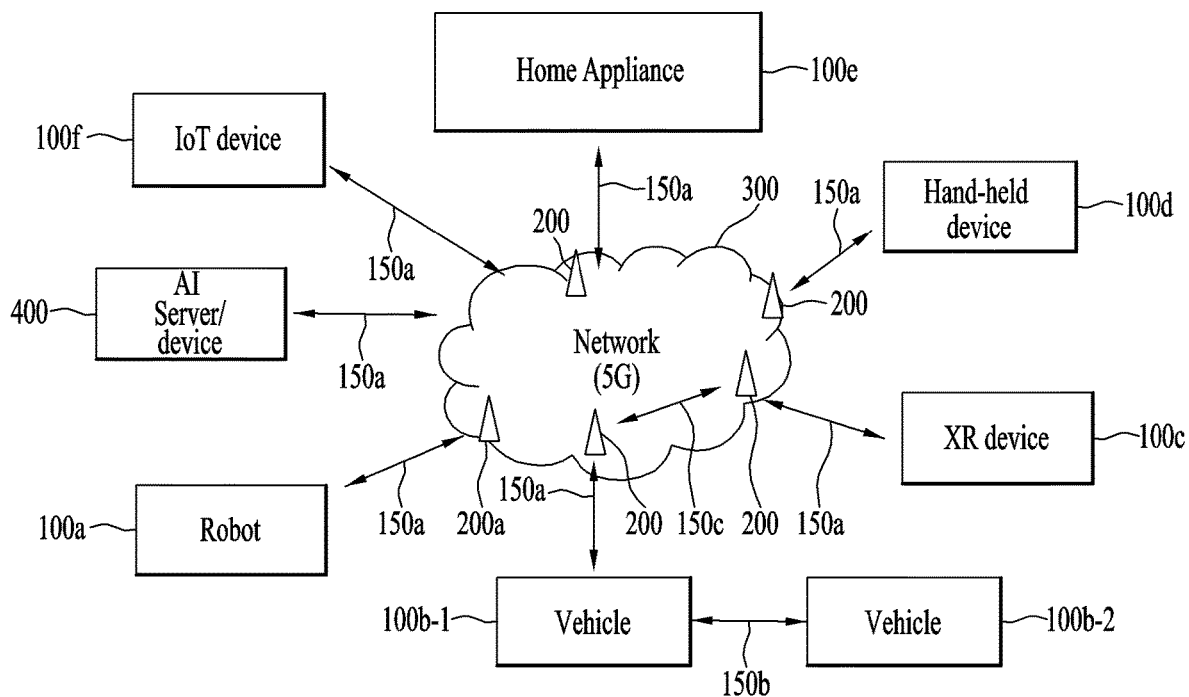
FIG. 1 is a diagram illustrating an exemplary communication system applied to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a UE node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term UE may be replaced with a UE, a Mobile Station (MS), a Subscriber Station (SS), a Mobile Subscriber Station (MSS), a mobile UE, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP NR system is explained, which are examples of wireless access systems.

Technology described below may be applied to various wireless access systems such as code division multiple access (CDMA), frequency division multiple access (FDMA), time division multiple access (TDMA), orthogonal frequency division multiple access (OFDMA), and single carrier frequency division multiple access (SC-FDMA).

To clarify technical features of the present disclosure, embodiments of the present disclosure are described focusing upon a 3GPP NR system. However, the embodiments proposed in the present disclosure may be equally applied to other wireless systems (e.g., 3GPP LTE, IEEE 802.16, and IEEE 802.11).

1. Example of Communication System to Which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 1 illustrates a communication system 1 applied to the present disclosure.

Referring to FIG. 1, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

2. Example of Wireless Device to Which the Present Disclosure is Applied

Figure 2:
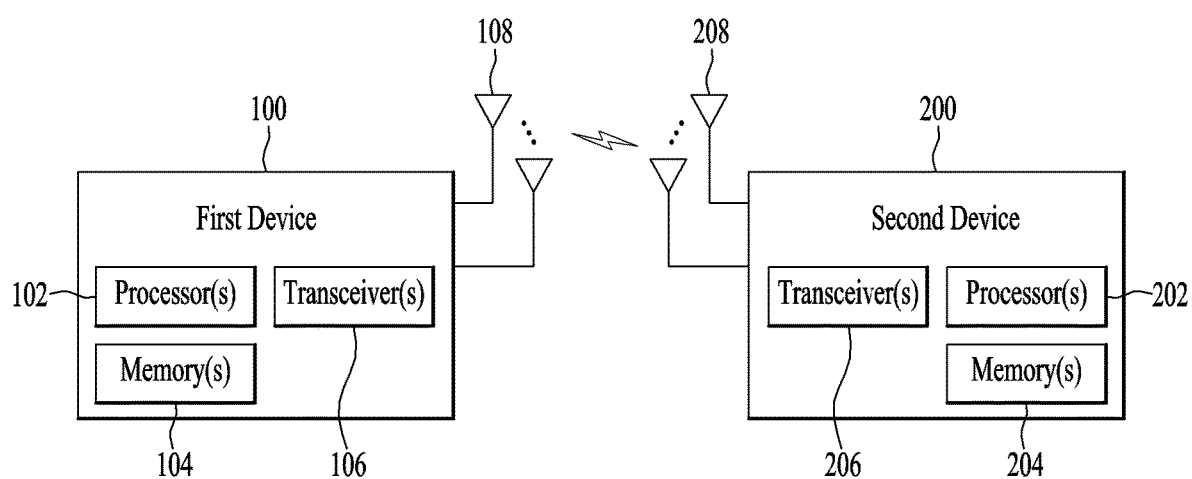
FIG. 2 is a block diagram illustrating an example of wireless devices applied to the present disclosure.

FIG. 2 illustrates wireless devices applicable to the present disclosure.

Referring to FIG. 2, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and obtain the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 3:
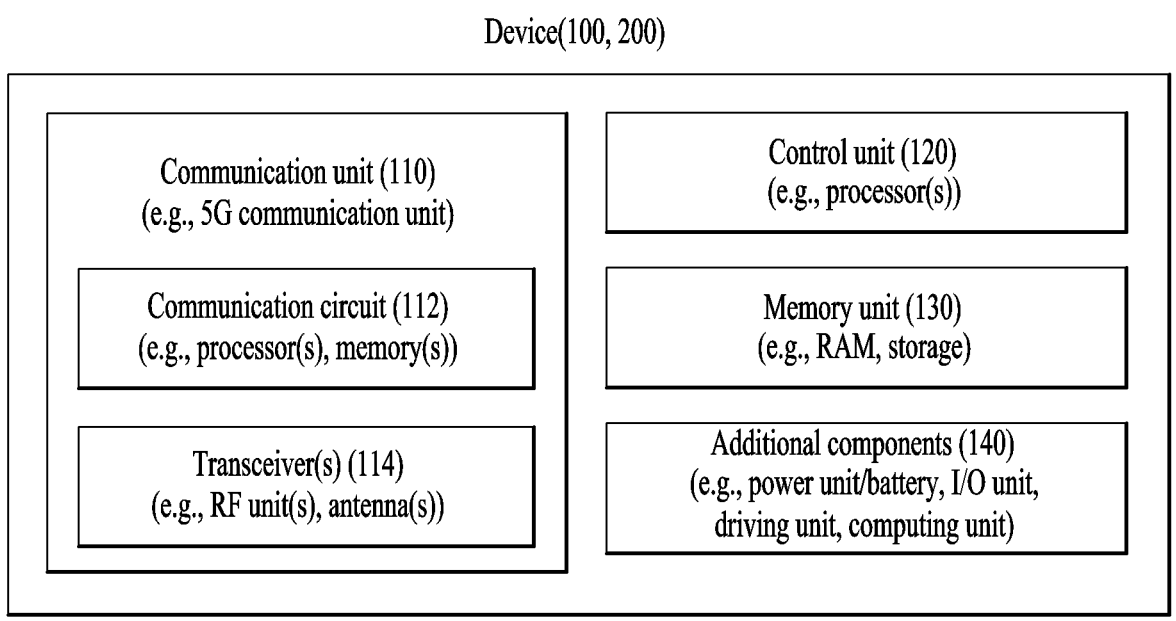
FIG. 3 is a block diagram illustrating another example of wireless devices applied to the present disclosure.

3. Example of Use of Wireless Device to Which the Present Disclosure is Applied FIG. 3 illustrates another example of a wireless device applied to the present disclosure. The wireless device may be implemented in various forms according to a use case/service (refer to FIG. 1).

Referring to FIG. 3, wireless devices 100 and 200 may correspond to the wireless devices 100 and 200 of FIG. 2 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcasting terminal, a hologram device, a public safety device, an MTC device, a medical device, a FinTech device (or a finance device), a security device, a climate/environment device, the AI server/device (400 of FIG. 1), the BSs (200 of FIG. 1), a network node, or the like. The wireless device may be mobile or fixed according to a use case/service.

In FIG. 3, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Hereinafter, an implementation example of FIG. 3 will be described in detail with reference to the drawings.

3.1. Example of Portable Device to Which the Present Disclosure is Applied

Figure 4:
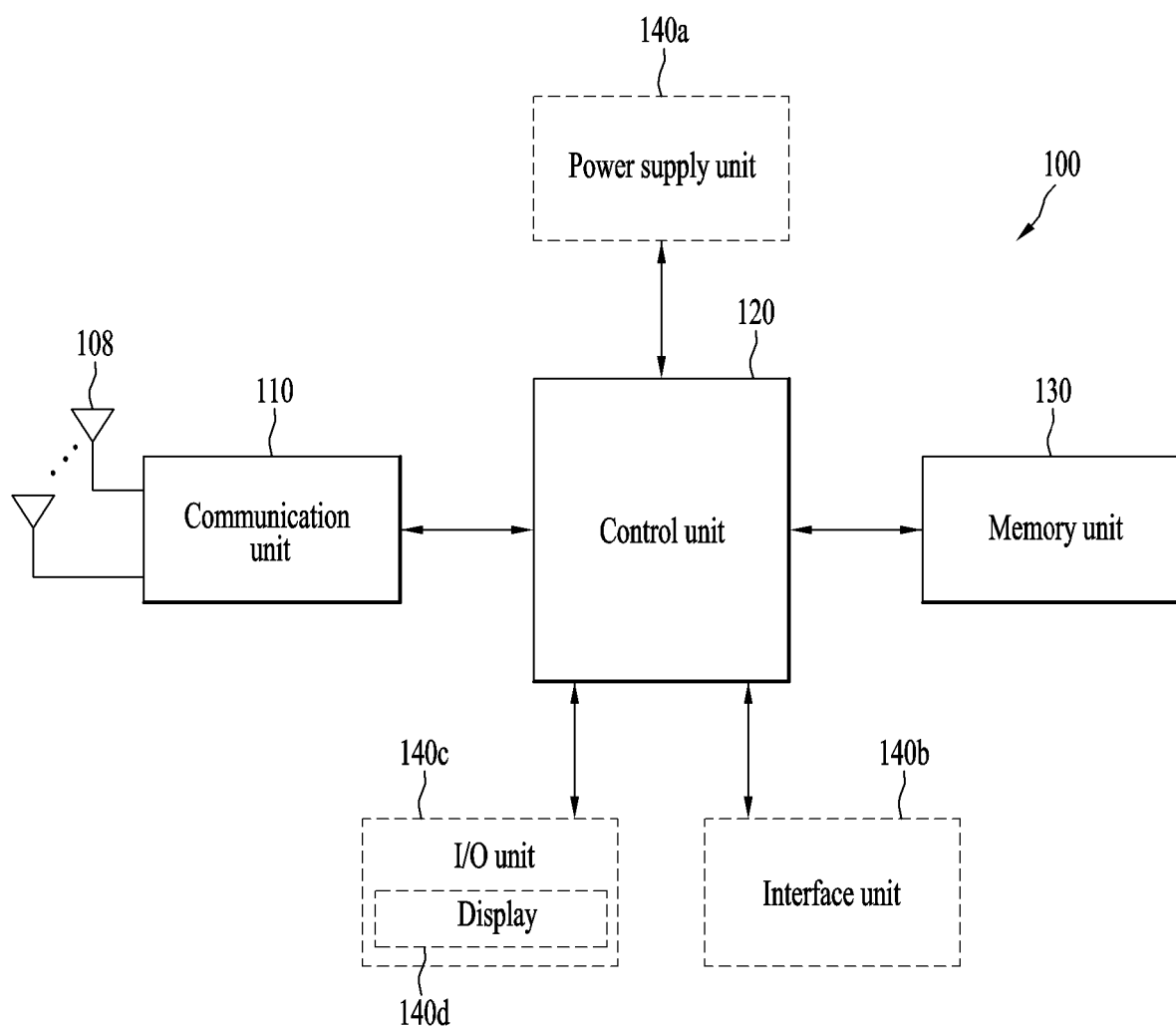
FIG. 4 is a block diagram illustrating a portable device applied to the present disclosure.

FIG. 4 illustrates an exemplary portable device to which the present disclosure is applied. The portable device may be any of a smartphone, a smart pad, a wearable device (e.g., a smart watch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 4, a portable device 100 may include an antenna unit 108, a communication unit 110, a control unit 120, a memory unit 130, a power supply unit 140a, an interface unit 140b, and an input/output (I/O) unit 140c. The antenna unit 108 may be configured as a part of the communication unit 110. Blocks 110 to 130/140a to 140c correspond to the blocks 110 to 130/140 of FIG. 3, respectively.

The communication unit 110 may transmit and receive signals (e.g., data and control signals) to and from other wireless devices or BSs. The control unit 120 may perform various operations by controlling components of the portable device 100. The control unit 120 may include an application processor (AP). The memory unit 130 may store data/parameters/programs/code/instructions needed to drive the portable device 100. Further, the memory unit 130 may store input/output data/information. The power supply unit 140a may supply power to the portable device 100 and include a wired/wireless charging circuit, a battery, and so on. The interface unit 140b may support connection of the portable device 100 to other external devices. The interface unit 140b may include various ports (e.g., an audio I/O port and a video I/O port) for connection to external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

For example, in data communication, the I/O unit 140c may obtain information/signals (e.g., touch, text, voice, images, or video) input by the user, and the stored information/signals may be stored in the memory unit 130. The communication unit 110 may convert the information/signals stored in the memory into radio signals and transmit the radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 5:
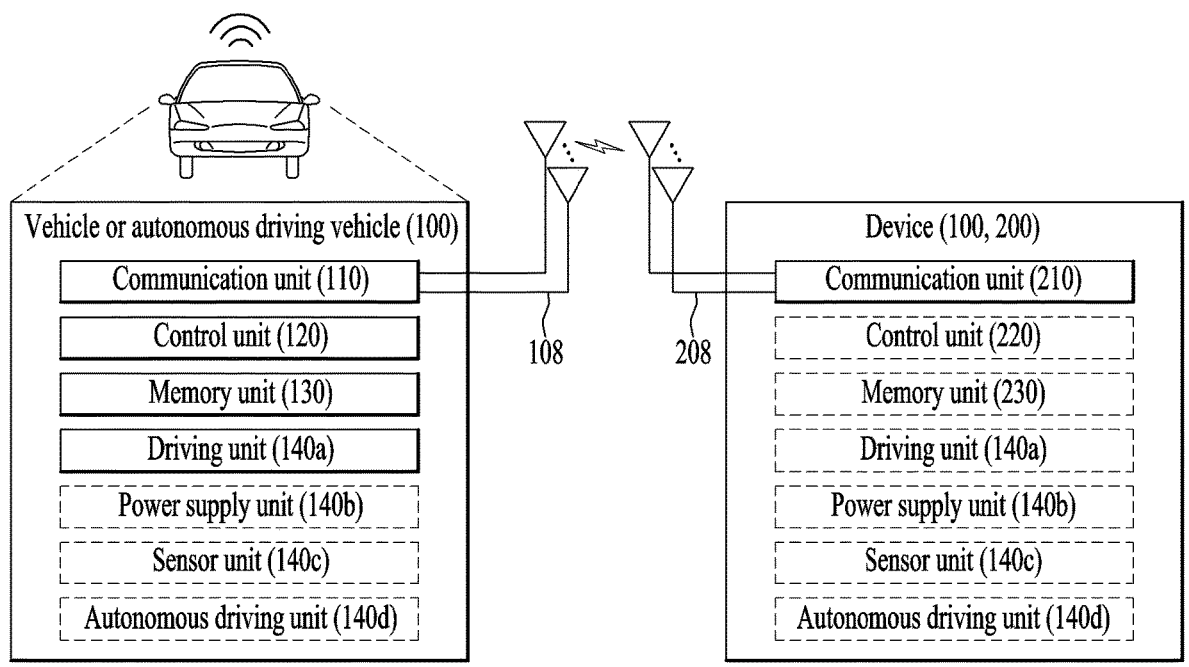
FIG. 5 is a block diagram illustrating a vehicle or autonomous driving vehicle applied to the present disclosure.

3.2. Example of Vehicle or Autonomous Driving Vehicle to which the Present Disclosure is Applied FIG. 5 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 5, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 4, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may obtain information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically obtain recent traffic information data from the external server and obtain surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

4. NR System

4.1. Physical Channels and General Signal Transmission

In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

Figure 6:
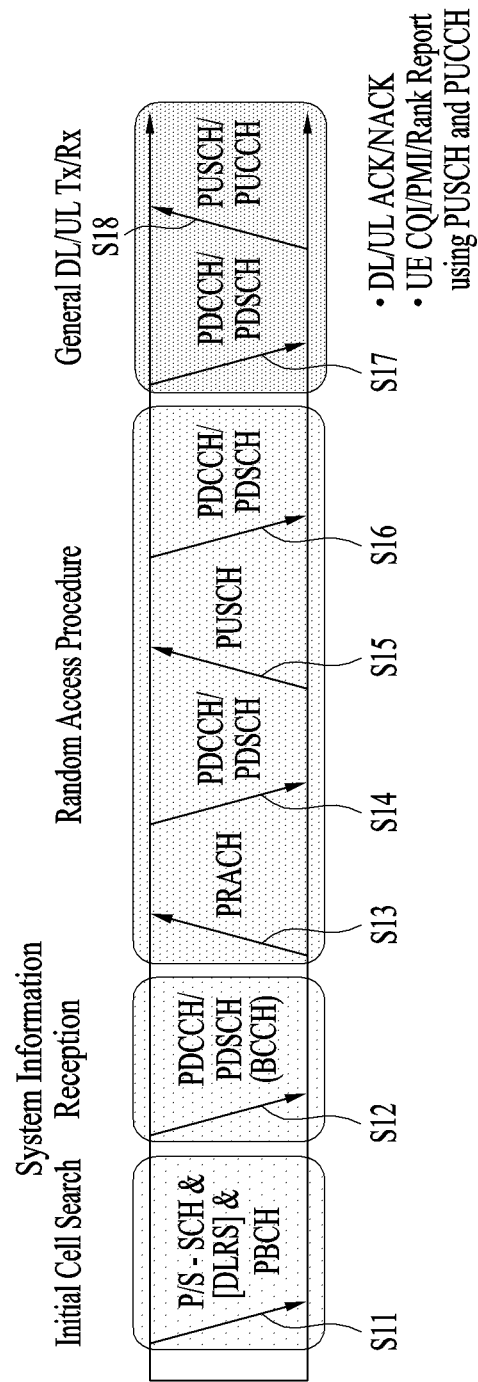
FIG. 6 is a diagram illustrating physical channels and a general signal transmission method using the physical channels.

FIG. 6 illustrates physical channels and a general signal transmission method using the physical channels, which may be used in embodiments of the present disclosure.

A UE performs initial cell search such as synchronization establishment with a BS in step S11 when the UE is powered on or enters a new cell. To this end, the UE may receive a primary synchronization channel (P-SCH) and a secondary synchronization channel (S-SCH) from the BS, establish synchronization with the BS, and acquire information such as a cell identity (ID).

Thereafter, the UE may receive a physical broadcast channel (PBCH) from the BS to acquire broadcast information in the cell.

Meanwhile, the UE may receive a DL reference signal (RS) in the initial cell search step to confirm a DL channel state.

Upon completion of initial cell search, the UE may receive a physical downlink control channel (PDCCH) and a physical downlink shared channel (PDSCH) according to information included in the PDCCH to acquire more detailed system information in step S12.

Next, the UE may perform a random access procedure such as steps S13 to S16 to complete access to the BS. To this end, the UE may transmit a preamble through a physical random access channel (PRACH) (S13) and receive a random access response (RAR) to the preamble through the PDCCH and the PDSCH corresponding to the PDCCH (S14). The UE may transmit a physical uplink shared channel (PUSCH). In the case of contention-based random access, a contention resolution procedure including transmission of a PRACH signal (S15) and reception of a PDCCH signal and a PDSCH signal corresponding to the PDCCH signal (S16) may be additionally performed.

The UE which has performed the above procedures may receive a PDCCH signal and/or a PDSCH signal (S17) and transmit a PUSCH signal and/or a physical uplink control channel (PUCCH) signal (S18) as a general UL/DL signal transmission procedure.

Control information that the UE transmits to the BS is referred to as uplink control information (UCI). The UCI includes a hybrid automatic repeat and request (HARQ) acknowledgement (ACK)/negative ACK (NACK) signal, a scheduling request (SR), a channel quality indicator (CQI), a precoding matrix index (PMI), a rank indicator (RI), or beam indication (BI) information.

In an NR system, the UCI is generally periodically transmitted on the PUCCH. However, according to an embodiment (if control information and traffic data should be transmitted simultaneously), the control information and traffic data may be transmitted on the PUSCH. In addition, the UCI may be transmitted aperiodically on the PUSCH, upon receipt of a request/command from a network.

4.2. Radio Frame Structure

Figure 7:
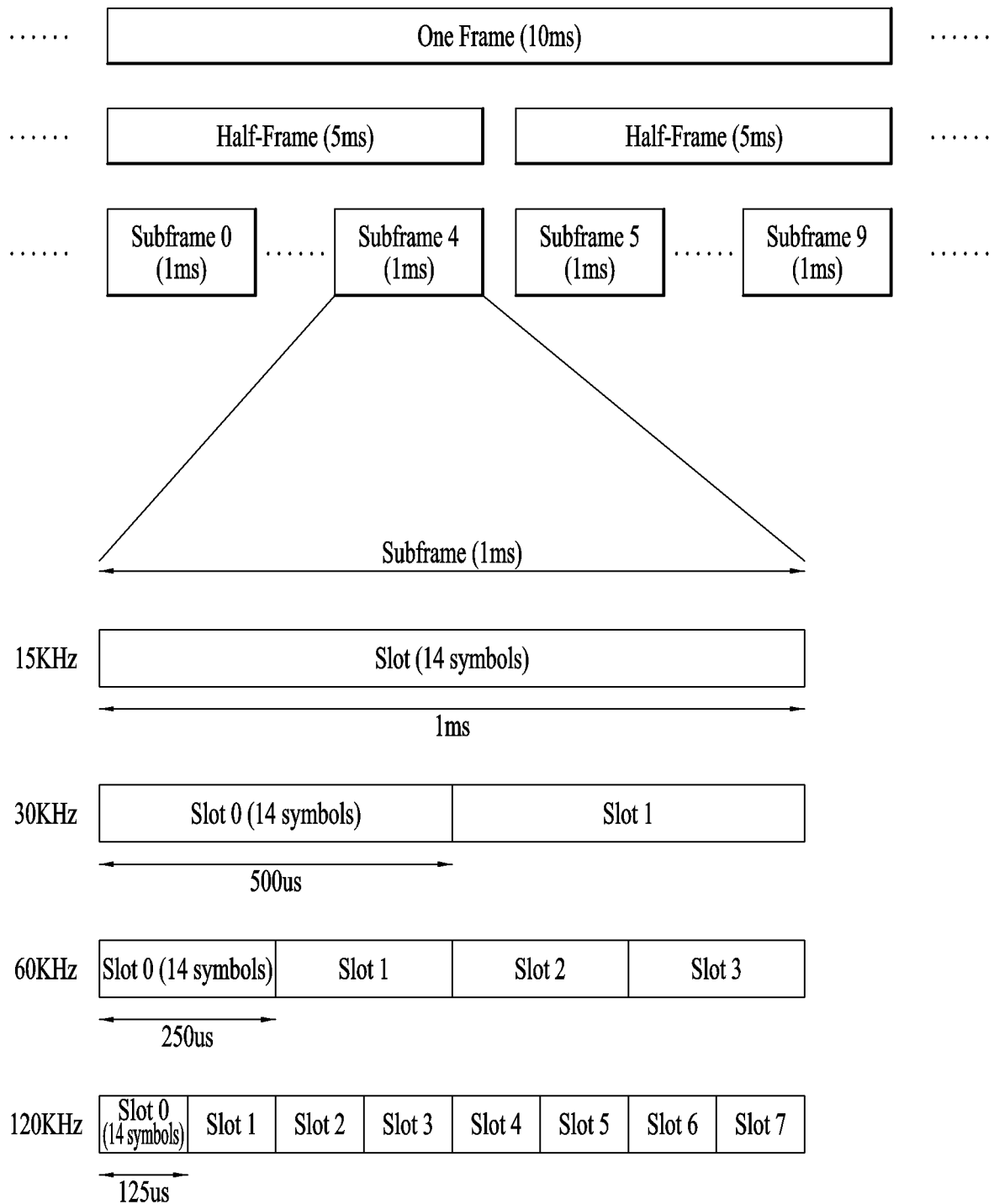
FIG. 7 is a diagram illustrating a radio frame structure in an NR system to which embodiments of the present disclosure are applicable.

FIG. 7 is a diagram illustrating a radio frame structure in an NR system to which embodiments of the present disclosure are applicable.

In the NR system, UL and DL transmissions are based on a frame as illustrated in FIG. 7. One radio frame is 10 ms in duration, defined by two 5-ms half-frames. One half-frame is defined by five 1-ms subframes. One subframe is divided into one or more slots, and the number of slots in a subframe depends on an SCS. Each slot includes 12 or 14 OFDM(A) symbols according to a CP. Each slot includes 14 symbols in a normal CP case, and 12 symbols in an extended CP case. Herein, a symbol may include an OFDM symbol (or a CP-OFDM) symbol and an SC-FDMA symbol (or a DFT-s-OFDM symbol).

Table 1 lists the number of symbols per slot, the number of slots per frame, and the number of slots per subframe in the normal CP case, and Table 2 lists the number of symbols per slot, the number of slots per frame, and the number of slots per subframe in the extended CP case.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, $N_{symb}^{slot}$ denotes the number of symbols in a slot, $N_{slot}^{frame,\mu}$ denotes the number of slots in a frame, and $N_{slot}^{subframe,\mu}$ denotes the number of slots in a subframe.

In the NR system to which the present disclosure is applicable, different OFDM(A) numerologies (e.g., SCSs, CP length, and so on) may be configured for a plurality of cells aggregated for a UE. Therefore, the (absolute) duration of a time resource (e.g., an SF, slot, or TTI) (for the convenience of description, generically referred to as a time unit (TU)) including the same number of symbols may be different between the aggregated cells.

NR supports multiple numerologies (e.g., subcarrier spacings (SCSs)) to support various 5th generation (5G) services. For example, the NR system supports a wide area in conventional cellular bands for an SCS of 15 kHz, a dense urban environment, low latency, and a wide carrier bandwidth for an SCS of 30/60 kHz, and a bandwidth wider than 24.25 GHz to overcome phase noise, for an SCS of 60 kHz or above.

An NR frequency band is defined by two types of frequency ranges, FR1 and FR2. FR1 and FR2 may be configured as described in Table 3 below. FR2 may represent millimeter wave (mmW).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 8:
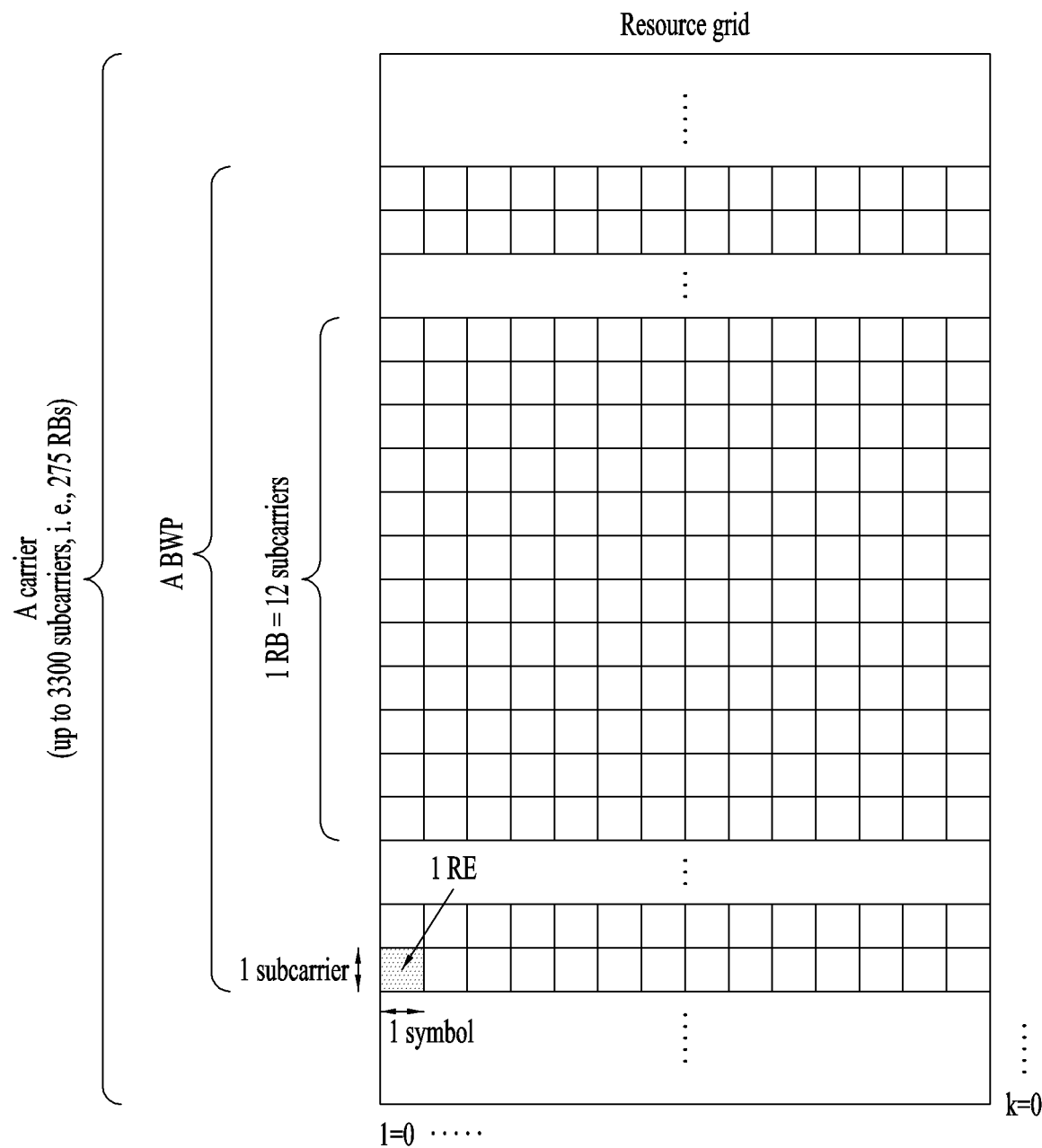
FIG. 8 is a diagram illustrating a slot structure in an NR system to which embodiments of the present disclosure are applicable.

FIG. 8 is a diagram illustrating a slot structure in an NR system to which embodiments of the present disclosure are applicable.

One slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 9:
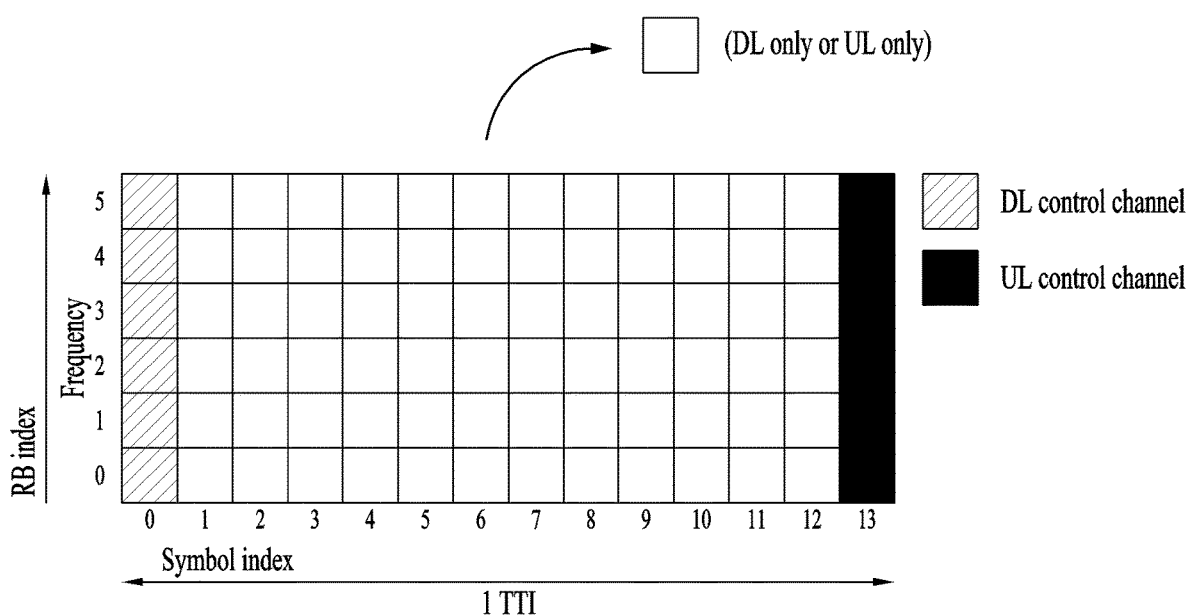
FIG. 9 is a diagram illustrating a self-contained slot structure in an NR system to which embodiments of the present disclosure are applicable.

FIG. 9 is a diagram illustrating a self-contained slot structures in an NR system to which embodiments of the present disclosure are applicable.

In FIG. 9, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a base station and a UE may sequentially perform DL transmission and UL transmission in one slot. That is, the base station and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the base station and UE to switch from transmission mode to reception mode and vice versa. To this end, in the self-contained slot structure, some OFDM symbols at the time of switching from DL to UL may be configured as a guard period (GP).

Although it has been described above that the self-contained slot structure includes both DL and UL control regions, these control regions may be selectively included in the self-contained slot structure. In other words, the self-contained slot structure according to the present disclosure may include either the DL control region or the UL control region as well as both the DL and UL control regions as illustrated in FIG. 9.

Further, the order of the regions in one slot may vary according to embodiments. For example, one slot may be configured in the order of DL control region, DL data region, UL control region, and UL data region, or UL control region, UL data region, DL control region, and DL data region.

A PDCCH may be transmitted in the DL control region, and a PDSCH may be transmitted in the DL data region. A PUCCH may be transmitted in the UL control region, and a PUSCH may be transmitted in the UL data region.

The PDCCH may deliver downlink control information (DCI), for example, DL data scheduling information, UL data scheduling information, and so on. The PUCCH may deliver uplink control information (UCI), for example, an ACK/NACK for DL data, channel state information (CSI), a scheduling request (SR), and so on.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

Figure 10:
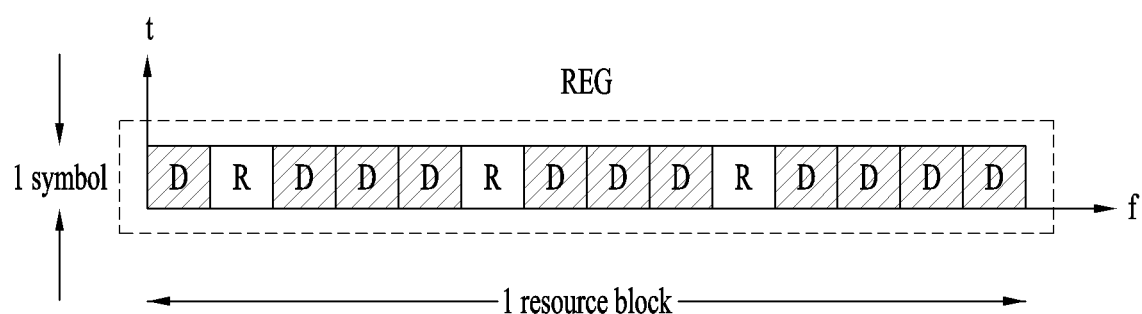
FIG. 10 is a diagram illustrating the structure of one REG in an NR system to which embodiments of the present disclosure are applicable.

FIG. 10 is a diagram illustrating the structure of one REG in an NR system to which embodiments of the present disclosure are applicable.

In FIG. 10, D represents an RE to which DCI is mapped, and R represents an RE to which a DMRS is mapped. The DMRS is mapped to REs #1, #5, and #9 along the frequency axis in one symbol.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSC in the CP-OFDM or DFT-s-OFDM waveform. A PUSCH transmission may be dynamically scheduled by a UL grant in DCI, or semi-statically scheduled by higher-layer (e.g., RRC) signaling (and/or layer 1 (L1) signaling such as a PDCCH) (configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH. Table 3 lists exemplary PUCCH formats.

TABLE 4

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |

TABLE 4-continued

| PUCCH format | Length in OFDM symbols $N_{symb}^{PUCCH}$ | Number of bits | Usage | Etc |
| --- | --- | --- | --- | --- |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the base station by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

4.3. DCI Format

In the NR system to which the present disclosure is applicable, the following DCI formats may be supported. First, the NR system may support DCI format 0_0 and DCI format 0_1 as a DCI format for PUSCH scheduling and support DCI format 1_0 and DCI format 1_1 as a DCI format for PDSCH scheduling. In addition, as DCI formats usable for other purposes, the NR system may additionally support DCI format 2_0, DCI format 2_1, DCI format 2_2, and DCI format 2_3.

Herein, DCI format 0_0 is used to schedule a transmission block (TB)-based (or TB-level) PUSCH. DCI format 0_1 may be used to schedule a TB-based (or TB-level) PUSCH or code block group (CBG)-based (or CBG-level) PUSCH (in the case in which CBG-based signal transmission and reception is configured).

In addition, DCI format 1_0 may be used to schedule TB-based (or TB-level) PDSCH. DCI format 1_1 may be used to schedule TB-based (or TB-level) PDSCH or CBG-based (or CBG-level) PDSCH (in the case in which CBG-based signal transmission and reception is configured).

In addition, DCI format 2_0 may be used to notify UEs of a slot format. DCI format 2_1 may be used to notify UEs of PRB(s) and OFDM symbol(s) in which a specific UE assumes that no transmission is intended therefor. DCI format 2_2 may be used to transmit transmission power control (TPC) commands for a PUCCH and a PUSCH. DCI format 2_3 may be used to transmit a group of TPC commands for SRS transmission by one or more UEs.

More specifically, DCI format 1_1 includes an MCS/new data indicator (NDI)/redundancy version (RV) field for transport block (TB) 1. Only when a higher-layer parameter maxNrofCodeWordsScheduledByDCI in a higher-layer parameter PDSCH-Config is set to n2 (i.e., 2), DCI format 1_1 may further include an MCS/NDI/RV field for TB 2.

Particularly, when the higher-layer parameter maxNrofCodeWordsScheduledByDCI is set to n2 (i.e., 2), it may be determined based on a combination of the MCS field and the RV field whether a TB is actually enabled or disabled. More specifically, when the MCS field is set to 26 and the RV field is set to 1 for a specific TB, the TB may be disabled.

Detailed features of the DCI formats may be supported by 3GPP TS 38.212. That is, obvious steps or parts which are not explained by DCI format-related features may be explained with reference to the above document. In addition, all terms disclosed in the present document may be explained by the above standard document.

4.4. Control Resource Set (CORESET)

One CORESET includes $N^{CORESET}_{RB}$ RBs in the frequency domain and $N^{CORESET}_{symb}$ symbols (having a value of 1, 2, or 3) in the time domain.

One control channel element (CCE) includes 6 resource element groups (REGs) and one REG is equal to one RB in one OFDM symbol. REGs in the CORESET are numbered in a time-first manner. Specifically, the REGs are numbered starting with '0' for the first OFDM symbol and the lowest-numbered RB in the CORESET.

A plurality of CORESETs may be configured for one UE. Each CORESET is related only to one CCE-to-REG mapping.

CCE-to-REG mapping for one CORESET may be interleaved or non-interleaved.

Configuration information for the CORESET may be configured by a higher layer parameter ControlResourceSet IE.

In addition, configuration information for CORESET 0 (e.g., common CORESET) may be configured by a higher layer parameter ControlResourceSetZero IE.

4.5. Antenna Port Quasi Co-Location

One UE may be configured with a list of up to M transmission configuration indicator (TCI) state configurations. The M TCI-state configurations may be configured by a higher layer parameter PDSCH-Config to decode a PDSCH (by the UE) according to a detected PDCCH with DCI intended for the UE and the given serving cell. Herein, M may be determined depending on the capability of the UE.

Each TCI state contains parameters for configuring a quasi co-location (QCL) relationship between one or two DL reference signals and the DMRS ports of the PDSCH. The QCL relationship is configured by the higher layer parameter qcl-Type1 for a first DL RS and a higher layer parameter qcl-Type2 for a second DL RS (if configured). For the case of two DL RSs, the QCL types should not be the same, regardless of whether the RSs are the same DL RS or different DL RSs. The QCL type corresponding to each DL RS is given by a higher layer parameter qcl-Type within a higher layer parameter QCL-Info and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives an activation command used to map up to 8 TCI states to codepoints of a TCI field in the DCI. When a HARQ-ACK signal corresponding to the PDSCH carrying the activation command is transmitted in slot #n, mapping between the TCI states and codepoints of the TCI field in the DCI may be applied starting from slot $\#(n+3*N^{subframe,\mu}_{slot}+1)$. In this case, $N^{subframe,\mu}_{slot}$ is determined based on Table 1 or Table 2 described above. After the UE receives initial higher layer configuration of TCI states and before the UE receives the activation command, the UE assumes that DM-RS port(s) of a PDSCH of a serving cell are quasi co-located with an SS/PBCH block determined in the initial access procedure with respect to 'QCL-TypeA'. Additionally, the UE may assume that the DM-RS port(s) of the PDSCH of the serving cell are quasi co-located with the SS/PBCH block determined in the initial access procedure also with respect to 'QCL-TypeD' at the above timing.

If a higher layer parameter tci-PresentInDCI is set as 'enabled' for a CORESET scheduling the PDSCH, the UE assumes that the TCI field is present in a PDCCH of DCI format 1_1 transmitted on the CORESET. If the higher layer parameter tci-PresentInDCI is not configured for the CORESET scheduling the PDSCH or the PDSCH is scheduled by DCI format 1_0 and if a time offset between the reception of the DL DCI and the reception of the corresponding PDSCH is equal to or greater than a threshold Threshold-Sched-Offset (where the threshold is based on UE capability), for determining PDSCH antenna port QCL, the UE assumes that a TCI state or QCL assumption for the PDSCH is identical to a TCI state or QCL assumption applied to a CORESET used for PDCCH transmission.

If the higher layer parameter tci-PresentInDCI is set as 'enabled', the TCI field in the DCI scheduling a component carrier (CC) points to activated TCI states in the scheduled CC or a DL BW, and the PDSCH is scheduled by DCI format 1_1, the UE uses a TCI-state according to the TCI field in the DCI in a detected PDCCH to determine PDSCH antenna port QCL. The UE may assume that DMRS ports of the PDSCH of a serving cell are quasi co-located with RS(s) in the TCI state with respect to QCL type parameter(s) given by an indicated TCI state if the time offset between the reception of the DL DCI and the reception of the corresponding PDSCH is equal to or greater than the threshold Threshold-Sched-Offset (where the threshold is determined based on reported UE capability). When the UE is configured with a single slot PDSCH, the indicated TCI state should be based on the activated TCI states in a slot with the scheduled PDSCH. When the UE is configured with CORESET associated with a search space set for cross-carrier scheduling, the UE expects that the higher layer parameter tci-PresentInDCI is set as 'enabled' for the CORESET. If one or more of the TCI states configured for the serving cell scheduled by the search space set contains 'QCL-TypeD', the UE expects the time offset between the reception of the detected PDCCH in the search space set and the reception of the corresponding PDSCH is greater than or equal to the threshold Threshold-Sched-Offset.

For both the cases when higher layer parameter tci-PresentInDCI is set to 'enabled' and the higher layer parameter tci-PresentInDCI is not configured in RRC connected mode, if the offset between the reception of the DL DCI and the reception of the corresponding PDSCH is less than the threshold Threshold-Sched-Offset, the UE makes the following assumptions. (i) DM-RS ports of a PDSCH of a serving cell are quasi co-located with the RS(s) in a TCI state with respect to QCL parameter(s). (ii) In this case, the QCL parameter(s) are used for PDCCH QCL indication of the CORESET associated with a monitored search space with the lowest CORESET-ID in the latest slot in which one or more CORESETs within an active BWP of the serving cell are monitored by the UE.

In this case, if the 'QCL-TypeD' of a PDSCH DM-RS is different from 'QCL-TypeD' of a PDCCH DM-RS with which overlapping occurs in at least one symbol, the UE is expected to prioritize the reception of the ePDCCH associated with the corresponding CORESET. This operation may also be applied to an intra-band CA case (when the PDSCH and the CORESET are in different CCs). If none of configured TCI states contains 'QCL-TypeD', the UE obtains the other QCL assumptions from the indicated TCI states for a scheduled PDSCH irrespective of the time offset between the reception of the DL DCI and the reception of the corresponding PDSCH.

For a periodic CSI-RS resource in an NZP-CSI-RS-ResourceSet configured with a higher layer parameter trs-Info, the UE should assume that that a TCI state indicates one of the following QCL type(s):

'QCL-TypeC' with an SS/PBCH block and, when (QCL-TypeD) is applicable, 'QCL-TypeD' with the same SS/PBCH block, or 'QCL-TypeC' with an SS/PBCH block and, when (QCL-TypeD) is applicable, 'QCL-TypeD' with a periodic CSI-RS resource in a higher layer parameter NZP-CSI-RS-ResourceSet configured with higher layer parameter repetition, For a CSI-RS resource in the higher layer parameter NZP-CSI-RS-ResourceSet configured with the higher layer parameter trs-Info and without the higher layer parameter repetition, the UE should assume that a TCI state indicates one of the following QCL type(s):

'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with the same CSI-RS resource, or 'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with an SS/PBCH, or 'QCL-TypeA' with a CSI-RS resource in the higher layer parameter NZP-CSI-RS-ResourceSet configured with the higher layer parameter trs-Info and, when (QCL-TyepD is) applicable, 'QCL-TypeD' with a periodic CSI-RS resource in the higher layer parameter NZP-CSI-RS-ResourceSet configured with the higher layer parameter repetition, or 'QCL-TypeB' with a CSI-RS resource in the higher layer parameter NZP-CSI-RS-ResourceSet configured with the higher layer parameter trs-Info when 'QCL-TypeD' is not applicable.

For a CSI-RS resource in the higher layer parameter NZP-CSI-RS-ResourceSet configured with the higher layer parameter repetition, the UE should assume that a TCI state indicates one of the following QCL type(s):

'QCL-TypeA' with a CSI-RS resource in the higher layer parameter NZP-CSI-RS-ResourceSet configured with the higher layer parameter trs-Info and, when ('QCL-TypeD) is applicable, 'QCL-TypeD' with the same CSI-RS resource, or 'QCL-TypeA' with a CSI-RS resource in the higher layer parameter NZP-CSI-RS-ResourceSet configured with the higher layer parameter trs-Info and, when ('QCL-TypeD' is) applicable, 'QCL-TypeD' with a CSI-RS resource in the higher layer parameter NZP-CSI-RS-ResourceSet configured with higher layer parameter repetition, or 'QCL-TypeC' with an SS/PBCH block and, when (QCL-TypeD) is applicable, 'QCL-TypeD' with the same SS/PBCH block.

For the DM-RS of PDCCH, the UE should assume that a TCI state indicates one of the following QCL type(s):

'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with the same CSI-RS resource, or 'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with a CSI-RS resource in the higher layer parameter NZP-CSI-RS-ResourceSet configured with the higher layer parameter repetition, or 'QCL-TypeA' with a CSI-RS resource in the higher layer parameter NZP-CSI-RS-ResourceSet configured without higher layer parameter trs-Info and without the higher layer parameter repetition and, when (QCL-TypeD) is applicable, 'QCL-TypeD' with the same CSI-RS resource.

For the DM-RS of the PDSCH, the UE should assume that a TCI state indicates one of the following QCL type(s):

'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with the same CSI-RS resource, or 'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with a CSI-RS resource in the higher layer parameter NZP-CSI-RS-ResourceSet configured with the higher layer parameter repetition, or QCL-TypeA' with a CSI-RS resource in the higher layer parameter NZP-CSI-RS-ResourceSet configured without the higher layer parameter trs-Info and without the higher layer parameter repetition and, when (QCL-TypeD) is applicable, 'QCL-TypeD' with the same CSI-RS resource.

In the present disclosure, QCL signaling may include all signaling configurations listed in the following table.

TABLE 5

| QCL linkage for FR2 after RRC | signalling |
|---|---|
| SSB → TRS w.r.t average delay, Doppler shift, spatial RX parameters | QCL type C + D |
| TRS → CSI-RS for BM w.r.t average delay, Doppler shift, delay spread, Doppler spread estimation | QCL type: A + D |
| TRS → CSI-RS for CSI w.r.t. average delay, Doppler shift, delay spread, Doppler spread estimation | QCL type: A |
| TRS → DMRS for PDCCH w.r.t. average delay, Doppler shift, delay spread, Doppler spread estimation | QCL type: A + D |
| TRS → DMRS for PDSCH w.r.t. average delay, Doppler shift, delay spread, Doppler spread estmation | QCL type: A + D |
| SSB → CSI-RS for BM w.r.t average delay, Dopper shift, spatial RX parameters | QCL type: C + D |
| SSB → CSI-RS for CSI w.r.t spatial RX parameters | OCL type: D |
| SSB → CSI-RS for PDCCH (before TRS is configured) w.r.t. average delay, Doppler shift, delay spread, Doppler spread, spatial RX parameters | QCL type: A + D |
| SSB → DMRS for PDSCH (before TRS is configured) w.r.t average delay, Doppler shift, deay spread, Doppler spread, spatial RX parameters | QCL type: A + D |
| CSI-RS for BM → DMRS for PDCCH w.r.t. spatial RX parameters | OCL type: D |
| CSI-RS for BM → DMRS for PDSCH w.r.t. spatial RX parameters | OCL type: D |
| CSI-RS for CSI → DMRS for PDSCH w.r.t. average delay, Doppler shift delay spread, Doppler spread, spatial RX parameters; Note: QCL parameters may not be derived directly from CSI-RS for CSI | QCL type: A + D |
| CSI-RS for BM → CSI-RS for TRS/BM/CSI w.r.t spatial RX parameters | QCL type: D |

In the following tables, if one row in the tables below has the same RS type, it is assumed that the same RS ID may be applied for the row.

In the present disclosure, when a CSI-RS resource is included in the higher layer parameter NZP-CSI-RS-ResourceSet in which the higher layer parameter trs-Info is configured, the UE expects the following two possible configurations for a higher layer parameter TCI-state.

TABLE 6

| Valid TCI state Configuration | DL RS 1 | qcl-Type1 | DL RS 2 (if configured) | qcl-Type2 (if configured) |
|---|---|---|---|---|
| 1* | SS/PBCH Block | QCL-TypeC | SS/PBCH Block | QCL-TypeD |
| 2* | SS/PBCH Block | QCL-TypeC | CSI-RS (BM) | QCL-TypeD |

In Table 6, * represents a case in which QCL type-D is applicable. When QCL type-D is applicable, DL RS 2 and QCL type-2 need to be configured for the UE.

In the present disclosure, when a CSI-RS resource is included in the higher layer parameter NZP-CSI-RS-ResourceSet in which the higher layer parameter trs-Info and the higher layer parameter repetition are not configured, the UE expects the following three possible configurations for the higher layer parameter TCI-state.

TABLE 7

| Valid TCI state Configuration | DL RS 1 | qcl-Type1 | DL RS 2 (if configured) | qcl-Type2 (if configured) |
|---|---|---|---|---|
| 1** | TRS | OCL-TypeA | TRS | QCL-TypeD |
| 2** | TRS | QCL-TypeA | SS/PBCH Block | QCL-TypeD |

TABLE 7-continued

| Valid TCI state Configuration | DL RS 1 | qcl-Type1 | DL RS 2 (if configured) | qcl-Type2 (if configured) |
|---|---|---|---|---|
| 3** | TRS | QCL-TypeA | CSI-RS (BM) | QCL-TypeD |
| 4* | TRS | QCL-TypeB | | |

In Table 7, * represents a case in which QCL type-D is not applicable.

In Table 7, ** represents a case in which QCL type_D is applicable. When QCL type-D is applicable, DL RS 2 and QCL type-2 need to be configured for the UE.

In the present disclosure, when a CSI-RS resource is included in the higher layer parameter NZP-CSI-RS-ResourceSet in which the higher layer parameter repetition is configured, the UE expects the following three possible configurations for the higher layer parameter TCI-state.

TABLE 8

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-Type D |
| 2 | TRS | QCL-TypeA | CSI-RS (BM) | QCL-Type D |
| 3 | SS/PBCH Block | QCL-TypeC | SS/PBCH Block | QCL-Type D |

In Tables 9 and 10 below, if QCL type-D is applicable, DL RS 2 and QLC type-2 need to be configured for the UE except a default case (e.g., the fourth row in Tables 9 and 10). When a TRS for DL is used for QCL type-D, the TRS is a source RS for QCL type-D and thus needs to have an SS/PBCH block or CSI-RS.

For a PDCCH DMRS, the UE expects the following three possible configurations for the higher layer parameter TCI-state. The fourth configuration is a default configuration and valid before the TRS is configured.

TABLE 9

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3** | CSI-RS (CSI) | QCL-TypeA | CSI-RS (CSI) | QCL-TypeD |
| 4* | SS/PBCH Block* | QCL-Type A | SS/PBCH Block* | QCL-TypeD |

In Table 9, * represents a configuration that can be applied before the TRS is configured. In this case, the configuration may be a valid QCL assumption rather than a TCI state.
In Table 9, ** represents that QCL parameters may not be directly derived from CSI-RS(s) (CSI).

For the PDCCH DMRS, the UE may expect only the following three available configurations of the higher-layer parameter TCI-State, while the fourth configuration (in the fourth row in the following two tables) is valid by default, before a TRS is configured.

TABLE 10

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3** | CSI-RS (CSI) | QCL-TypeA | CSI-RS (CSI) | QCL-TypeD |
| 4* | SS/PBCH Block* | QCL-TypeA | SS/PBCH Block* | QCL-TypeD |

In Table 10, * represents a configuration that can be applied before the TRS is configured. In this case, the configuration may correspond to a valid QCL assumption rather than a TCI state.
In Table 10, ** represents that QCL parameters may not be directly derived from CSI-RS(s) (CSI).

For the PDCCH DMRS, the UE may expect only the following three available configurations of the higher-layer parameter TCI-State, while the fourth configuration (in the fourth row in the following two tables) is valid by default, before a TRS is configured.

TABLE 11

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-Type A | CSI-RS (BM) | QCL-TypeD |
| 3** | CSI-RS (CSI) | QCL-TypeA | CSI-RS (CSI) | QCL-TypeD |
| 4* | SS/PBCH Block* | QCL-TypeA | SS/PBCH Block* | QCL-TypeD |

In Table 11, * represents a configuration that can be applied before the TRS is configured. In this case, the configuration may correspond to a valid QCL assumption rather than a TCI state.
In Table 11, ** represents that QCL parameters may not be directly derived from CSI-RS(s) (CSI).

4.6. Channel State Information Reference Signal (CSI-RS)

A mobile communication system according to the present disclosure uses a method for increasing data transmission/reception efficiency by adopting multiple transmission antennas and multiple reception antennas for packet transmission. When data is transmitted/received through multiple input/output antennas, channel states between the transmission antennas and the reception antennas should be detected to accurately receive the signal. Therefore, each transmission antenna may have an individual RS. An RS for CSI feedback may be defined as a CSI-RS.

The CSI-RS includes zero power (ZP) CSI-RS and non-zero power (NZP) CSI-RS. The ZP CSI-RS and the NZP CSI-RS may be defined as follows.

- The NZP CSI-RS may be configured by an NZP-CSI-RS-Resource information element (IE) or a CSI-RS-Resource-Mobility field in a CSI-RS-ResourceConfigMobility IE. The NZP CSI-RS may be defined based on the sequence generation and resource mapping method defined in 3GPP TS 38.211.
- The ZP CSI-RS may be configured by a ZP-CSI-RS-Resource IE. The UE may assume that resources configured for the ZP CSI-RS are not used for PDSCH transmission. The UE performs the same measurement/reception on channels/signals except PDSCHs regardless of whether they collide with the ZP CSI-RS or not Positions at which the CSI-RS is mapped in a slot may be dynamically determined by the number of CSI-RS ports, a CSI-RS density, a code division multiplexing (CDM) type, and a higher-layer parameter (e.g., firstOFDMSymbolInTimeDomain, firstOFDMSymbolInTimeDomain2, and so on).

4.7. Demodulation Reference Signal (DMRS)

In the NR system to which the present disclosure is applicable, a DMRS may be transmitted and received in a front-loaded structure. Alternatively, an additional DMRS may be transmitted and received in addition to the front-loaded DMRS.

The front-loaded DMRS may support fast decoding. The first OFDM symbol in which the front-loaded DMRS is carried may be determined as the third (e.g., 1=2) or fourth (e.g., 1=3) OFDM symbol. The first OFDM symbol position may be indicated by a PBCH.

The number of OFDM symbols in which the front-loaded DMRS is occupied may be indicated by a combination of DCI and radio resource control (RRC) signaling.

The additional DMRS may be configured for a high-speed UE. The additional DMRS may be positioned in the middle/last symbol(s) in a slot. If one front-loaded DMRS is configured, the additional DMRS may be allocated to 0 to 3 OFDM symbols. If two front-loaded DMRS symbols are configured, the additional DMRS may be allocated to 0 to 2 OFDM symbols.

The front-loaded DMRS may be divided into two types and one of the two types may be indicated through higher layer signaling (e.g., RRC signaling).

In the present disclosure, two DMRS configuration types may be applied. Among of the two DMRS configuration types, a DMRS configuration type that is actually configured for a UE may be indicated by higher layer signaling (e.g., RRC signaling).

DMRS configuration type 1 may be subdivided as follows depending on the number of OFDM symbols allocated for the front-loaded DMRS.

DMRS configuration type 1 and number of OFDM symbols to which the front-loaded DMRS is allocated=1

Up to 4 ports (e.g., P0 to P3) may be multiplexed based on length-2 frequency code division multiplexing (F-CDM) and frequency division multiplexing (FDM) schemes. RS density may be set to 6 REs per port in a resource block (RB).

DMRS configuration type 1 and number of OFDM symbols to which the front-loaded DMRS is allocated=2

Up to 8 ports (e.g., P0 to P7) may be multiplexed based on length-2 F-CDM, length-2 time CDM (T-CDM), and FDM schemes. If presence of a PT-RS is configured by higher layer signaling, T-CDM may be fixed to [11]. RS density may be set to 12 REs per port in the RB.

DMRS configuration type 2 may be classified as follows according to the number of OFDM symbols to which the front-loaded DMRS is allocated.

DMRS configuration type 2 and number of OFDM symbols to which the front-loaded DMRS is allocated=1

Up to 6 ports (e.g., P0 to P5) may be multiplexed based on length-2 F-CDM and FDM schemes. RS density may be set to 4 REs per port in the RB.

DMRS configuration type 2 and number of OFDM symbols to which the front-loaded DMRS is allocated=2

Up to 12 ports (e.g., P0 to P11) may be multiplexed based on length-2 F-CDM, length-2 T-CDM, and FDM schemes. If presence of the PT-RS is configured by higher layer signaling, T-CDM may be fixed to [1 1]. RS density may be set to 8 REs per port in the RB.

Figure 11:
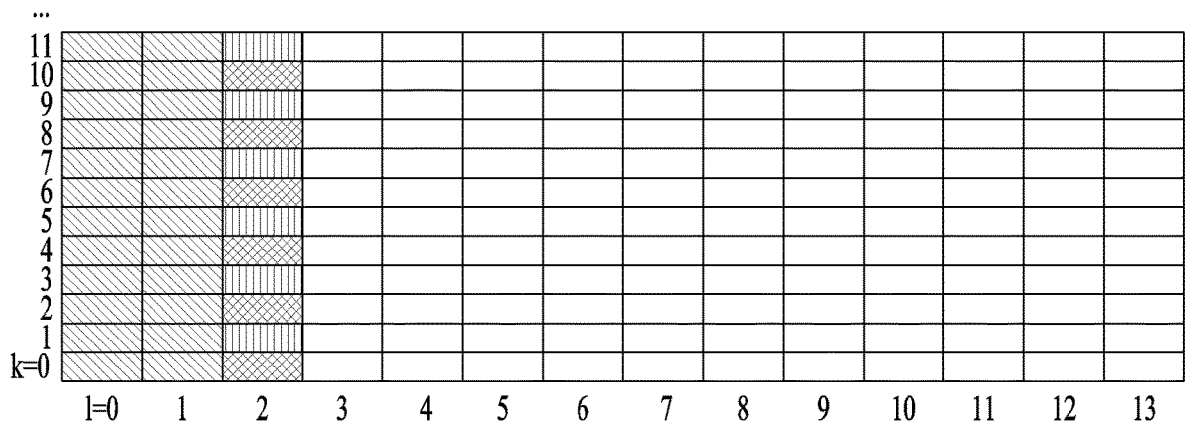
FIG. 11 is a diagram schematically illustrating an example of a front loaded DMRS of a first DMRS configuration type applicable to the present disclosure.
Figure 11:
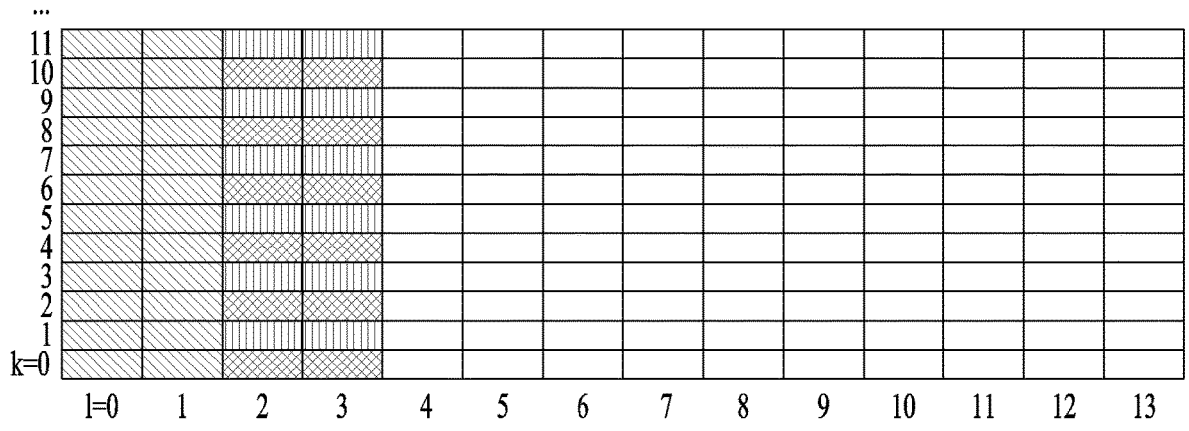

FIG. 11 is a diagram schematically illustrating an example of a front loaded DMRS of a first DMRS configuration type applicable to the present disclosure.

More specifically, FIG. 11(a) illustrates a front-loaded DMRS with one symbol and FIG. 11(b) illustrates a front-loaded DMRS with two symbols.

In FIG. 11, $\Delta$ represents a DMRS offset value on the frequency axis. In this case, DMRS ports having the same DMRS offset $\Delta$ may be subjected to code division multiplexing in the frequency domain (CDM-F) or code division multiplexing in the time domain (CDM-T). In addition, DMRS ports having different DMRS offsets $\Delta$ may be subjected to CDM-F.

According to the present disclosure, CDM-F may be applied based on $w_f(k')$ of the following table, and CDM-T may be applied based on $w_t(l')$ of the following table. k' and l' are parameters that determine the index of a subcarrier to which the DMRS is mapped, which may have a value 0 or 1. DMRSs corresponding to respective DMRS ports may be grouped into CDM groups listed in the following table.

Table 12 lists parameters for a first DMRS configuration type for the PDSCH, and Table 13 lists parameters for a second DMRS configuration type for the PDSCH.

TABLE 12

| p | CDM group $\lambda$ | $\Delta$ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 13

| p | CDM group $\lambda$ | $\Delta$ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

The UE may obtain DMRS port configuration information configured by the BS from DCI. For example, the UE may obtain the DMRS port configuration information from an antenna ports field of DCI format 1_1 based on a DMRS configuration type configured for the UE (e.g., a first DMRS configuration type (dmrs-Type=1) or a second DMRS configuration type (dmrs-Type=2)), and the maximum number of OFDM symbols for a DL front loaded DMRS (e.g., maxLength=1 or maxLength=2). More specifically, Table 14 illustrates DMRS port configuration information according to the value of the antenna ports field, when (dmrs-Type=1 and maxLength=1) is configured for the UE, and Table 15 illustrates DMRS port configuration information according to the value of the antenna ports field, when (dmrs-Type=1 and maxLength=2) is configured for the UE. Table 16 illustrates DMRS port configuration information according to the value of the antenna ports field, when (dmrs-Type=2 and maxLength=1) is configured for the UE, and Table 17 illustrates DMRS port configuration information according to the value of the antenna ports field, when (dmrs-Type=2 and maxLength=2) is configured for the UE.

TABLE 14

| | One Codeword: Codeword 0 enabled, Codeword 1 disabled | |
|---|---|---|
| Value | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 15

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS ports(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 5 | 2 | | | | |
| 31 | Reserved | Reserved | Reserved | | | | |

TABLE 16

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) Without data | DMR port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |

TABLE 16-continued

| One codeword: Codeword 0 enabled, Codeword 1 disabled | | | Two codewords: Codeword 0 enabled, Codeword 1 enabled | | |
|---|---|---|---|---|---|
| Value | Number of DMRS CDM group(s) without data | DMRS port(s) | Value | Number of DMRS CDM group(s) Without data | DMR port(s) |
| 21 | 3 | 3-5 | | | |
| 22 | 3 | 0-3 | | | |
| | | | 23 | 2 | 0, 2 |
| | | | 24-31 | Rerserved | Reserved |

TABLE 17

| One codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-53 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |

TABLE 17-continued

| | One codeword: Codeword 0 enabled, Codeword 1 disabled | | | | Two Codewords: Codeword 0 enabled, Codeword 1 enabled | | |
| --- | --- | --- | --- | --- | --- | --- | --- |
| Value | Number of DMRS CDM group(s) without data | DMRS port(s) | Number of front-load symbols | Value | Number of DMRS CDM group(s) without data | DMRS port(s) | Number of front-load symbols |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

The UE may receive the DMRS according to a condition as follows.

For DMRS configuration type 1,
when one codeword is scheduled for the UE, and DCI indicating one of {2, 9, 10, 11, 30} as an index related to antenna port mapping (e.g., an index in Table 14 or Table 15) is allocated to the UE, or
when two codewords are scheduled for the UE,
the UE may receive the DMRS on the assumption that none of the remaining orthogonal antenna ports are associated with a PDSCH transmission to another UE.

For DMRS configuration type 2,
when one codeword is scheduled for the UE, and DCI indicating one of {2, 10, 23} as an index related to antenna port mapping (e.g., an index in Table 14 or Table 15) is allocated to the UE, or
when two codewords are scheduled for the UE,
the UE may receive the DMRS on the assumption that none of the remaining orthogonal antenna ports are associated with a PDSCH transmission to another UE.

4.8. Codeword

In the present disclosure, the BS may configure the maximum number of codewords scheduled by one DCI for the UE by higher-layer signaling. For example, the BS may set the maximum number of codewords scheduled by one DCI to 1 or 2 for the UE based on the higher-layer parameter maxNrofCodeWordsScheduledByDCI (having a value n1 or n2). The higher-layer parameter maxNrofCodeWordsScheduledByDCImay be included in the higher-layer parameter PDSCH-Config.

Referring to Rel-15 TS 38.212, DCI format 1_1 may be configured as described in the following table according to the higher-layer parameter maxNrofCodeWordsScheduledByDCL.

TABLE 18

For transport block 1:
   Modulation and coding scheme - 5 bits
   New data indicator - 1 bit
   Redundancy version - 2 bits
For transport block 2 (only present if maxNrofCodeWordsScheduledByDCI equals2):
   Modulation and coding scheme - 5 bits
   New data indicator - 1 bit
   Redundancy version - 2 bits Therefore, the NDI, MCS, and RV of CW #0 may be configured/indicated based on the NDI, MCS, and RV for TB 1 in the DCI. Likewise, the NDI, MCS, and RV of CW #1 may be configured/indicated based on the NDI, MCS, and RV for TB 2 in the DCI.

Additionally, when (i) a bandwidth part indicator field indicates a bandwidth part other than an active bandwidth part, (ii) the higher-layer parameter maxNrofCodeWordsScheduledByDCI for the indicated bandwidth part is set to 2, and (iii) the higher-layer parameter maxNrofCodeWordsScheduledByDCI for the active bandwidth part is set to 1, the UE may assume that the MCS, NDI, and RV fields of TB 2 are zero-padded in interpreting the MCS, NDI, and RV fields of TB 2. In this case, the UE may ignore the MCS, NDI, and RV fields of TB 2 for the indicated bandwidth part.

Further, when the higher-layer parameter maxNrofCodeWordsScheduledByDCI indicates that a 2-codeword transmission is enabled, one of two TBs (or codewords) may be enabled or disabled in the following method.

More specifically, when the higher-layer parameter maxNrofCodeWordsScheduledByDCIindicates that a 2-codeword transmission is enabled, one of the two TBs may be disabled, when for a RB corresponding to DCI format 1_1, (i) the MCS value is 26 (i.e., IMCS=26) and (ii) the RV value is 1 (i.e., rvid=1). When both of the TBs are enabled, TB 1 and TB 2 may be mapped to codeword 0 and codeword 1, respectively. When only one TB is enabled, the active TB may always be mapped to the first codeword (i.e., codeword 0).

4.9. Time/Frequency Resource Allocation Cases Applicable to the Present Disclosure In the present disclosure, time/frequency (T/F) resources of PDSCHs (e.g., PDSCH #0 and PDSCH #1) transmitted from different transmission and reception points (TRPs) (beams or panels) may overlap with each other in various manners. Cases in which T/F resources are overlapped may include all five cases illustrated in FIG. 7.

Figure 12:
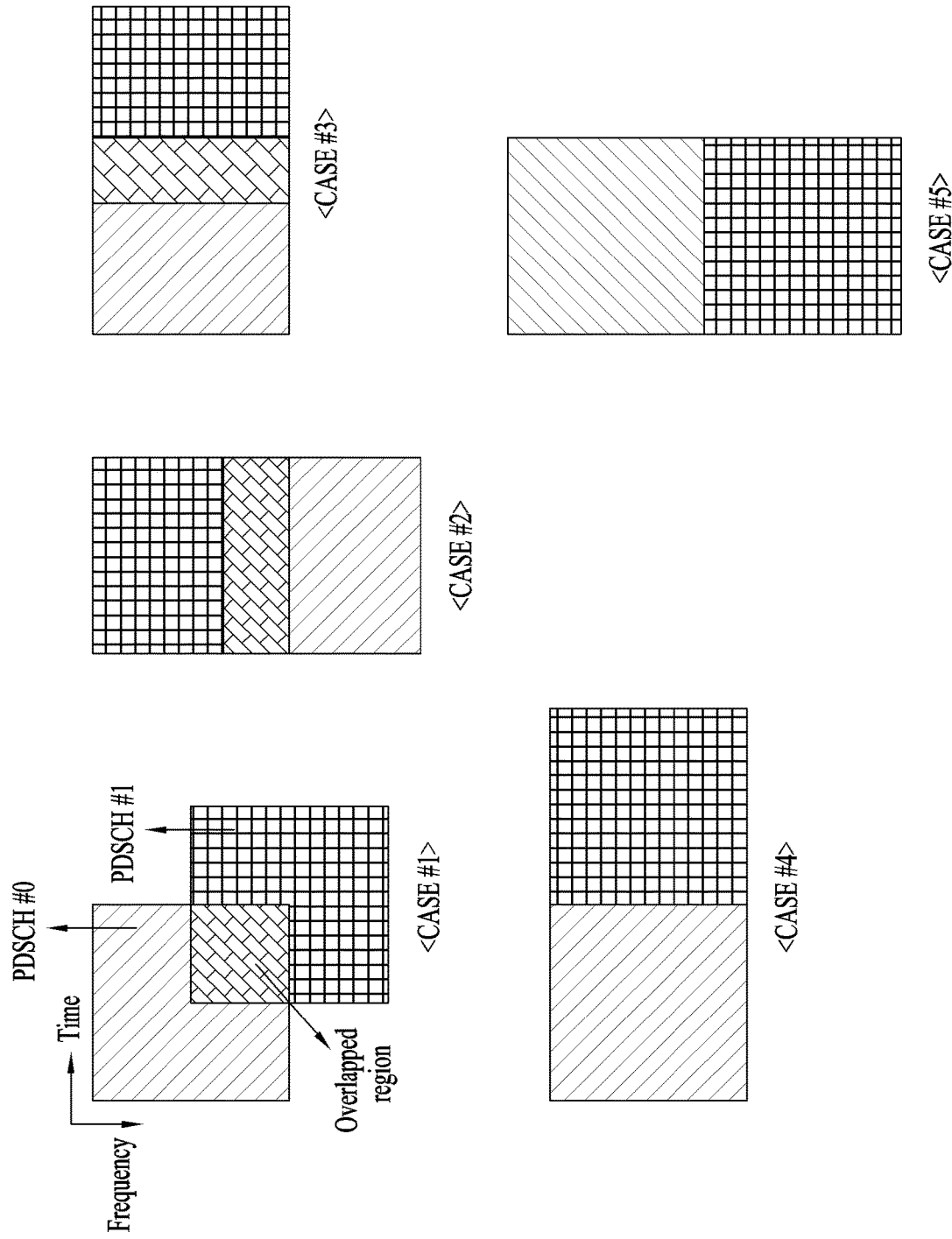
FIG. 12 is a diagram illustrating exemplary cases in which two physical downlink shared channels (PDSCHs) overlap with each other in time and/or frequency resources, which are applicable to the present disclosure.

FIG. 12 is a diagram illustrating exemplary cases in which two PDSCHs are overlapped with each other in time and/or frequency resources, which are applicable to the present disclosure.

As illustrated in FIG. 12, two PDSCHs may be partially overlapped with each other (e.g., case #1 to case #3) or may be overlapped with each other in one of the time domain and the frequency domain (e.g., case #4 and case #5). In case #1/#2/#3 of FIG. 12, the two PDSCHs are (partially) overlapped with each other in both time and frequency. In case #4 of FIG. 12, the two PDSCHs are not overlapped only on the time axis. In case #5 of FIG. 12, the two PDSCHs are overlapped on the time axis but not on the frequency axis.

4.10. Single PDCCH System

Figure 13:
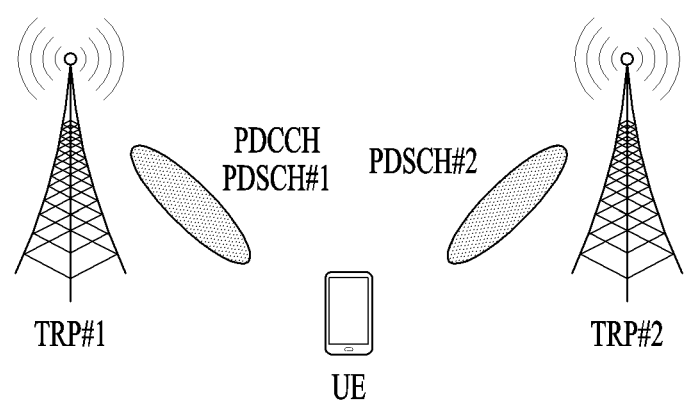
FIG. 13 is a simplified diagram illustrating a single physical downlink control channel (PDCCH) system operation applicable to the present disclosure.

FIG. 13 is a simplified diagram illustrating a single PDCCH system operation applicable to the present disclosure.

In FIG. 13, it is assumed that two TRPs TRP #1 and TRP #2 transmit PDSCH #1 and PDSCH #2 to one UE, respectively. In the following description, an operation of scheduling a plurality of PDSCHs by one PDCCH is referred to as a single PDCCH system or a single PDCCH operation, as illustrated in FIG. 13. In other words, a single PDCCH may mean a PDCCH that schedules a plurality of PDSCHs (for different TRPs).

While the following description is given in the context of two TRPs as an example of a plurality of TRPs, for convenience, the same operation may be equally applied to three or more TRPs according to some embodiments. In other words, a single PDCCH may include a PDCCH that schedules PDSCHs for three or more TRPs in the present disclosure.

According to the single PDCCH system, even though the UE receives PDSCHs from different TRPs, the UE may obtain scheduling information for the plurality of PDSCHs by receiving one PDCCH. Accordingly, the PDCCH reception complexity of the UE may be lowered.

Compared to the single PDCCH system, the UE may receive two PDSCHs only when receiving two PDCCHs in a multi-PDCCH system or multi-PDCCH operation in which two TRPs transmit the PDCCHs, each scheduling one of the PDSCHs, PDSCH #1 and PDSCH #2. In the single PDCCH system or single PDCCH operation, the UE may receive two PDSCHs by successfully receiving only one PDCCH, thereby minimizing performance degradation caused by PDCCH miss detection.

In FIG. 13, TRP #1 and/or TRP #2 may transmit the PDCCH that schedules PDSCH #1 and PDSCH #2 to the UE.

4.11. Non-Coherent Joint Transmission (NC-JT)

In the present disclosure, a signal transmission method based on (partial) overlap between the time resources of PDSCHs transmitted by different TRPs (or beams) (case #5 in FIG. 7) or (partial) overlap between the time and frequency resources of PDSCHs transmitted by different TRPs (or beams) (cases #1, #2, and #3 in FIG. 7) is referred to as NC-JT.

In the present disclosure, a single DCI-based NC-JT may refer to an NC-JT operation when PDSCHs transmitted from different TRPs (or beams) are scheduled by one DCI. For example, the single DCI-based NC-JT may include an NC-JT operation when both of PDSCH #1 and PDSCH #2 are scheduled by DCI #1.

In the present disclosure, multi-DCI-based NC-JT is an NC-JT operation when each of PDSCHs transmitted from different TRPs (or beams) is scheduled by one DCI. For example, the multi-DCI-based NC-JT may include an NC-JT operation when PDSCH #1 and PDSCH #2 are simultaneously scheduled by DCI #1 and DCI #2, respectively.

In the present disclosure, two types of NC-JT may be defined depending on whether different TRPs transmit independent layers or common layers.

In the present disclosure, when it is said that "layers are independent", this may imply that when TRP #A transmits a signal in three layers and TRP #B transmits a signal in four layers, the UE expects to receive signals in seven layers in total.

On the other hand, in the present disclosure, when it is said that "layers are common", this may imply that when TRP #A transmits a signal in three layers and TRP #B transmits a signal in three layers, the UE expects to receive signals in three layers in total.

In the present disclosure, to distinguish the above two operations, NC-JT based on the former operation is referred to as "NC-JT with independent layer (IL)", and NC-JT based on the latter operation is referred to as "NC-JT with common layer (CL)".

While various operation examples are described based on the "NC-JT with IL" operation (or mode) in the present disclosure, the operation examples may be extended to operation examples based on the "NC-JT with CL" operation (or mode).

4.12. HARQ Process

DCI transmitted from the BS to the UE may include an "HARQ process number" field configured in 4 bits. Based on an HARQ process number indicated by the "HARQ process number" field in the DCI, the UE may distinguish/identify a PDSCH among previously transmitted PDSCHs, for which a PDSCH scheduled by the DCI is a retransmission.

4.13. Determination of Modulation Order and Target Code Rate

In the present disclosure, a PDSCH may be scheduled by a PDCCH (e.g., DCI format 1_0 or DCI format 1_1) having a cyclic redundancy check (CRC) scrambled with a cell radio network temporary identifier (C-RNTI), a modulation coding scheme cell RNTI (MCS-C-RNTI), a temporary cell RNTI (TC-RNTI), a configured scheduling RNTI (CS-RNTI), a system information RNTI (SI-RNTI), a random access RNTI (RA-RNTI), or a paging RNTI (P-RNTI). Alternatively, the PDSCH may be scheduled based on a PDSCH configuration (SPS-config) provided by a higher layer, without transmission of a corresponding PDCCH. A modulation order and a target code rate for the PDSCH may be determined/configured as follows.

(1) When (i) a higher-layer parameter mcs-Table provided by PDSCH-Config is set to "qam256" and (ii) the PDSCH is scheduled by (a PDCCH including) DCI format 1_1 with a CRC scrambled with a C-RNTI, the UE may determine a modulation order $Q_m$ and a target code rate R for the PDSCH based on an MCS value (e.g., $I_{MCS}$) and Table 20.

(2) Or when (i) an MCS-C-RNTI is not configured for the UE, (ii) the higher-layer parameter mcs-Table provided by PDSCH-Config is set to "qam64LowSw", and (iii) the PDSCH is scheduled by a PDCCH with a CRC scrambled with a C-RNTI in a UE-specific search space, the UE may determine a modulation order Qm and a target code rate R for the PDSCH based on an MCS value (e.g., $I_{MCS}$) and Table 21.

(3) Or when (i) an MCS-C-RNTI is configured for the UE and (ii) the PDSCH is scheduled by a PDCCH with a CRC scrambled with the MCS-C-RNTI, the UE may determine a modulation order $Q_m$ and a target code rate R for the PDSCH based on an MCS value (e.g., $I_{MCS}$) and Table 21.

(4) Or when (i) the higher-layer parameter mcs-Table provided by SPS-Config is not configured for the UE, and (ii) the higher-layer parameter mcs-Table provided by PDSCH-Config is set to "qam265", when the PDSCH is scheduled by (a PDCCH including) DCI format 1_1 with a CRC scrambled with a CS-RNTI, or when the PDSCH is scheduled by SPS-config without transmission of a corresponding PDCCH,
    the UE may determine a modulation order $Q_m$ and a target code rate R for the PDSCH based on an MCS value (e.g., $I_{MCS}$) and Table 20.
(5) Or when (i) the higher-layer parameter mcs-Table provided by SPS-Config is set to "qam64LowSE",
    when the PDSCH is scheduled by a PDCCH with a CRC scrambled with a CS-RNTI, or
    when the PDSCH is scheduled by SPS-config without transmission of a corresponding PDCCH,
    the UE may determine a modulation order $Q_m$ and a target code rate R for the PDSCH based on an MCS value (e.g., $I_{MCS}$) and Table 21.
(6) Or the UE may determine a modulation order $Q_m$ and a target code rate R for the PDSCH based on an MCS value (e.g., $I_{MCS}$) and Table 19.

TABLE 19

| MCS Index $I_{MCS}$ | Modulation Order $Q_m$ | Target code Rate R × [1024] | Spectral efficiency |
|---|---|---|---|
| 0 | 2 | 120 | 0.2344 |
| 2 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4083 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 5 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 20

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 21

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

4.14. Transport Block Size Determination

Based on section 5.1.3.2 in the standard specification 3GPP TS 38.214, the size of a transport block between the UE and the BS according to the present disclosure may be determined. More specifically, the transport block size may be determined as follows.

When the higher layer parameter maxNrofCodeWordsScheduledByDCI indicates that transmission of two codewords is enabled, if (i) the value of $I_{MCS}$ is 26 and (ii) the value of $rv_{id}$ is 1 for the corresponding transport block, the corresponding transport block may be disabled by DCI format 1_1. When both transport blocks are enabled, transport block 1 and transport block 2 may be mapped to codeword 0 and codeword 1, respectively. When only one transport block is enabled, the enabled transport block may always be mapped to the first codeword (e.g., codeword 0).

For the FDSCH allocated by DCI format 1_0 or DCI format 1_1 (or a PDCCH including the same) CRC scrambled by C-RNTI, MCS-C-RNTI, TC-RNTI, CS-RNTI or SI-RNTI, when (i) Table 19 is used and $I_{MCS}$ is greater than or equal to 0 and less than or equal to 27, or (ii) Table 18 or Table 20 is used and $I_{MCS}$ is greater than or equal to 0 and less than or equal to 27, the UE may determine the transport block size (TBS) as follows, except for the case the transport block in DCI format 1_1 is disabled.

(1) The UE first determines the number of REs (e.g., $N_{RE}$) in the slot.

The UE first determines the number of REs (e.g., $N'_{RE}$) allocated for the PDSCH in the PRB, based on the following equation.

$$N'_{RE}=N_{sc}^{RB} \cdot N_{symb}^{sh} - N_{DMRS}^{PRB} N'_{RE}=N_{sc}^{RB} \cdot N_{symb}^{sh} - N_{DMRS}^{PRB} - N_{oh}^{PRB}$$ [Equation 1]

In the equation above, $N_{sc}^{RB}=12 N_{sc}^{RB}=12$ denotes the number of subcarriers in a PRB, $N_{symb}^{sh} N_{symb}^{sh}$ denotes the number of symbols included in the PDSCH allocation in the slot, $N_{DMRS}^{PRB} N_{DMRS}^{PRB}$ denotes the number of REs for DMRS for each PRB in a scheduled interval including the overhead of the DMRS CDM group without data, as indicated by DCI format 1_1 or determined according to characteristics of DCI format 1_0, and $N_{oh}^{PRB} N_{oh}^{RPB}$ denotes the overhead set by the higher layer parameter xOverhead in the higher layer parameter PDSCH-ServingCellConfig. When the higher layer parameter xOverhead is not configured in the higher layer parameter PDSCH-ServingCellConfig (the corresponding value may be set to 0, 6, 12 or 18), $N_{oh}^{PRB} N_{oh}^{PRB}$ is set to 0. When the PDSCH is scheduled by the PDCCH CRC scrambled by SI-RNTI, RA-RNTI or P-RNTI, $N_{oh}^{PRB} N_{oh}^{PRB}$ may be assumed to be 0.

The UE may determine $N_{RE}$, the total number of REs allocated for the PDSCH, based on the following equation.

$$N_{RE}=\min(156, N'_{RE}) \cdot n_{PRB} N_{RE}=\min(156, N'_{RE}) \cdot n_{PRB}$$ [Equation 2]

In the equation above, $nP_{RB}$ denotes the total number of PRBs allocated for the UE.

(2) $N_{info}$, the intermediate number of information bits may be acquired based on the following equation.

$$N_{info}=N_{RE} \cdot R \cdot Q_m \cdot v N_{info}=N_{RE} \cdot R \cdot Q_m \cdot v$$ [Equation 3]

In the equation above, R denotes a target code rate determined by the MCS field, $Q_m$ denotes a modulation order determined by the MCS field, and v denotes the number of layers.

When the size of $N_{info}$ is less than or equal to 3824, step 3 may be used as a next step in determining the TBS. Conversely, when the size of $N_{info}$ is greater than 3824, step 4 may be used as a next step in determining the TBS.

(3) If the size of $N_{info}$ is 3824 or less, TBS may be determined as follows:

$N'_{info}$, which is a quantized intermediate number of information bits, may be set to satisfy the following equation.

$$N'_{info} = \max\left(24, 2^n \cdot \left\lfloor \frac{N_{info}}{2^n} \right\rfloor\right) N'_{info} = \max\left(24, 2^n \cdot \left\lfloor \frac{N_{info}}{2^n} \right\rfloor\right)$$ [Equation 4]

In the equation above, n may satisfy $n=\max(3, \lfloor \log_2(N_{info}) \rfloor - 6)$ $n=\max(3, \lfloor \log_2(N_{info}) \rfloor - 6)$.

Based on the table below, the nearest TBS that is not less than $N'_{info}$ is found.

TABLE 22

| Index | TBS |
| --- | --- |
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |

TABLE 22-continued

| Index | TBS |
|---|---|
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

(4) When the size of $N_{info}$ exceeds 3824, the TBS may be determined as follows:

$N'_{info}$, which is a quantized intermediate number of information bits, may be set to satisfy the following equation.

$$N'_{info} = \max\left(3840, 2^n \times \text{round}\left(\frac{N_{info} - 24}{2^n}\right)\right) N'_{info} = \max\left(3840, 2^n \times \text{round}\left(\frac{N_{info} - 24}{2^n}\right)\right)$$ [Equation 5]

In the equation above, n may satisfy $n = \lfloor \log_2 (N_{info} - 24) \rfloor - 5 = [\log_2 (N_{info} - 24)] - 5$.

When R is less than or equal to ¼, the TBS may be determined to satisfy the following equation.

$$TBS = 8 \cdot C \cdot \left\lceil \frac{N'_{info} + 24}{8 \cdot C} \right\rceil - 24 \, TBS = 8 \cdot C \cdot \left\lceil \frac{N'_{info} + 24}{8 \cdot C} \right\rceil - 24$$ [Equation 6]

In the equation above, C may be set to satisfy $$C = \left\lceil \frac{N'_{info} + 24}{3816} \right\rceil C = \left\lceil \frac{N'_{info} + 24}{3816} \right\rceil.$$

Alternatively, when R is greater than ¼ and $N'_{info}$ is greater than 8424, the TBS may be determined to satisfy the following equation.

$$TBS = 8 \cdot C \cdot \left\lceil \frac{N'_{info} + 24}{8 \cdot C} \right\rceil - 24 \, TBS = 8 \cdot C \cdot \left\lceil \frac{N'_{info} + 24}{8 \cdot C} \right\rceil - 24$$ [Equation 7]

In the equation above, C may be set to satisfy $$C = \left\lceil \frac{N'_{info} + 24}{8424} \right\rceil. C = \left\lceil \frac{N'_{info} + 24}{8424} \right\rceil.$$

Alternatively, the TBS may be determined to satisfy the following equation.

$$TBS = 8 \cdot \left\lceil \frac{N'_{info} + 24}{8} \right\rceil - 24 \, TBS = 8 \cdot \left\lceil \frac{N'_{info} + 24}{8} \right\rceil - 24$$ [Equation 8]

Unlike the foregoing, when Table 19 is used, and $I_{MCS}$ is greater than or equal to 28 and less than or equal to 31, the TBS may be determined as follows.

More specifically, in the above case, it may be assumed that the TBS is determined from the DCI transmitted on the latest PDCCH for an identical transport block using $I_{MCS}$ having a value of 0 to 27. When (i) there is no identical transport blocks using $I_{MCS}$ having a value of 0 to 27, and (ii) the initial PDSCH for the identical transport block is semi-persistently scheduled, the TBS may be determined from the latest semi-persistent scheduling (SPS) allocation PDCCH.

Alternatively, it may be assumed that the TBS is determined from the DCI transmitted on the latest PDCCH for the identical transport block using $I_{MCS}$ having a value of 0 to 28. When (i) there is no identical transport blocks using $I_{MCS}$ having a value of 0 to 28, and (ii) the initial PDSCH for the identical transport block is semi-persistently scheduled, the TBS may be determined from the latest SPS allocation PDCCH.

The UE may not expect that the PDSCH allocated by the PDCCH CRC scrambled by SI-RNTI has a TBS exceeding the size of 2976 bits.

For the PDSCH allocated by DCI format 1_0 (or a PDCCH including the same) CRC scrambled by P-RNTI or RA-RNTI, the TBS determination may follow steps 1 to 4 above with the following modification applied in step 2: In calculating $N_{info}$, scaling that satisfies the following equation is applied to $N_{info}$. Here, the scaling factor is determined based on the TB scaling field in DCI disclosed in the table below.

$$N_{info} = S \cdot N_{RE} \cdot R \cdot Q_m \cdot v N_{info} = S \cdot N_{RE} \cdot R \cdot Q_m \cdot v$$ [Equation 9]

TABLE 23

| TB scaling field | Scaling factor S |
|---|---|
| 00 | 1 |
| 01 | 0.5 |
| 10 | 0.25 |
| 11 | |

In addition to the NDI and HARQ process ID signaled on the PDCCH, the TBS determined as described above may be reported to a higher layer (in the UE).

5. Example of Operations of UE and BS in the Present Disclosure

5.0. Definition

In the present disclosure, terms used to describe the present disclosure may be defined as follows.

In the present disclosure, higher-layer signaling may include radio resource control (RRC) signaling and/or a medium access control (MAC)-control element (CE).

In the present disclosure, TRP (Transmission Reception Point) may be replaced with beam.

In the present disclosure, the term "PDSCH repetition" may include (i) simultaneous transmission of PDSCHs in the same frequency resources of the same OFDM symbol(s)

from a plurality of TRPs/beam(s), (ii) simultaneous transmission of PDSCHs in frequency resources partially overlapped in the same OFDM symbol(s) from a plurality of TRPs/beam(s), or (iii) simultaneous transmission of PDSCHs in different frequency resources of the same OFDM symbol(s) from a plurality of TRPs/beam(s) (e.g., cases #2 and #5 of FIG. 7). The term "PDSCH repetition" may further include (iv) transmission of PDSCHs in partially overlapping OFDM symbols from a plurality of TRP/beam(s) or (v) alternative PDSCH transmissions in different OFDM symbols from a plurality of TRP/beam(s) (e.g., cases #1, #3, and #4 of FIG. 7).

In the present disclosure, a precoding resource block group (PRG) may correspond to a resource block group (RBG) or an RB.

In the present disclosure, a plurality of codewords (CWs) generated from the same information sequence may be replaced with "a plurality of CWs generated from the same TB". In this case, CW #0 and CW #1 may correspond to the same TB. However, DCI for CW #0 and CW #1 may include NDIs, MCSs, and RVs which are different for each of TBs (e.g., TB #1 and TB #2). In this regard, based on the indexes CW #0 and CW #1, (i) the NDI, MCS, and RV for CW #0 in the DCI may indicate the NDI, MCS, and RV of TB 1, and (ii) the NDI, MCS, and RV for CW #1 in the DCI may indicate the NDI, MCS, and RV of TB 2.

In the present disclosure, to indicate a plurality of TRPs/beams to the UE by DCI, the BS may use a TCI state including a plurality of RS sets (e.g., a TCI state including two RS sets to indicate two TRPs/beams). In this case, the RS sets may correspond to the TRPs/beams one to one.

Alternatively, to indicate a plurality of TRPs/beams to the UE by DCI, the BS may allocate/configure a plurality of TCI states to/for the UE. Each TCI state may include one RS set. In this case, the TCI states may correspond to the TRPs/beams one to one.

Accordingly, a method for indicating a plurality of TRPs/beams to a UE by a BS may refer to not only (i) a method for indicating a TCI state including two RS sets to a UE by a BS (even though specifically not mentioned) but also (ii) a method for indicating two different TCI states each including one RS set to a UE by a BS.

In the present disclosure, a beam may be replaced with a resource.

In the present disclosure, the NDI, and/or RV, and/or MCS of CW #1 (or TB #2) may represent the NDI of CW #1 (or TB #2), and/or the RV of CW #1 (or TB #2), and/or the MCS of CW #1 (or TB #2).

Further, the BS and the UE proposed in the present disclosure may perform the above-described operation examples alone or in combination.

In the following description, each operation example may be performed in the same manner for a DL signal transmission and a UL signal transmission. In other words, PDSCH may be replaced by PUSCH, TRP or BS may be replaced by UE as a signal transmission entity, and UE may be replaced by TRP or BS as a signal reception entity in the following description.

5.1. Specific Example of Operations of UE and BS to Configure PDSCH Repetition from Multiple TRPs Based on Single PDCCH FIG. 14 is a simplified diagram illustrating a configuration for receiving PDSCHs from two TRPs/beam(s) by a UE.

Figure 14:
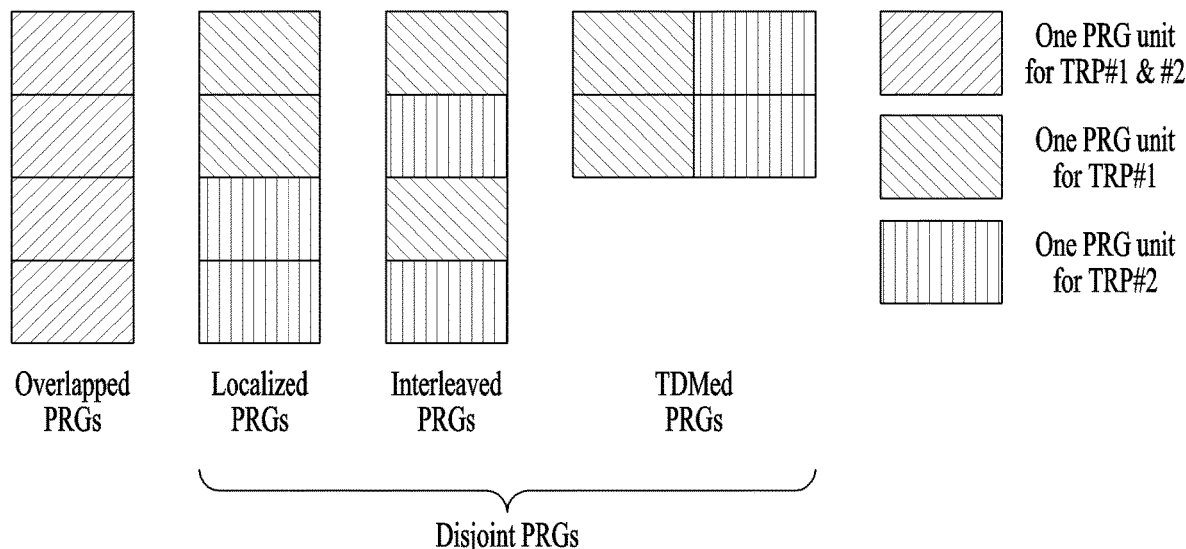
FIG. 14 is a simplified diagram illustrating a configuration in which a user equipment (UE) receives PDSCHs through two transmission and reception points (TRPs)/beam(s).
Figure 15:
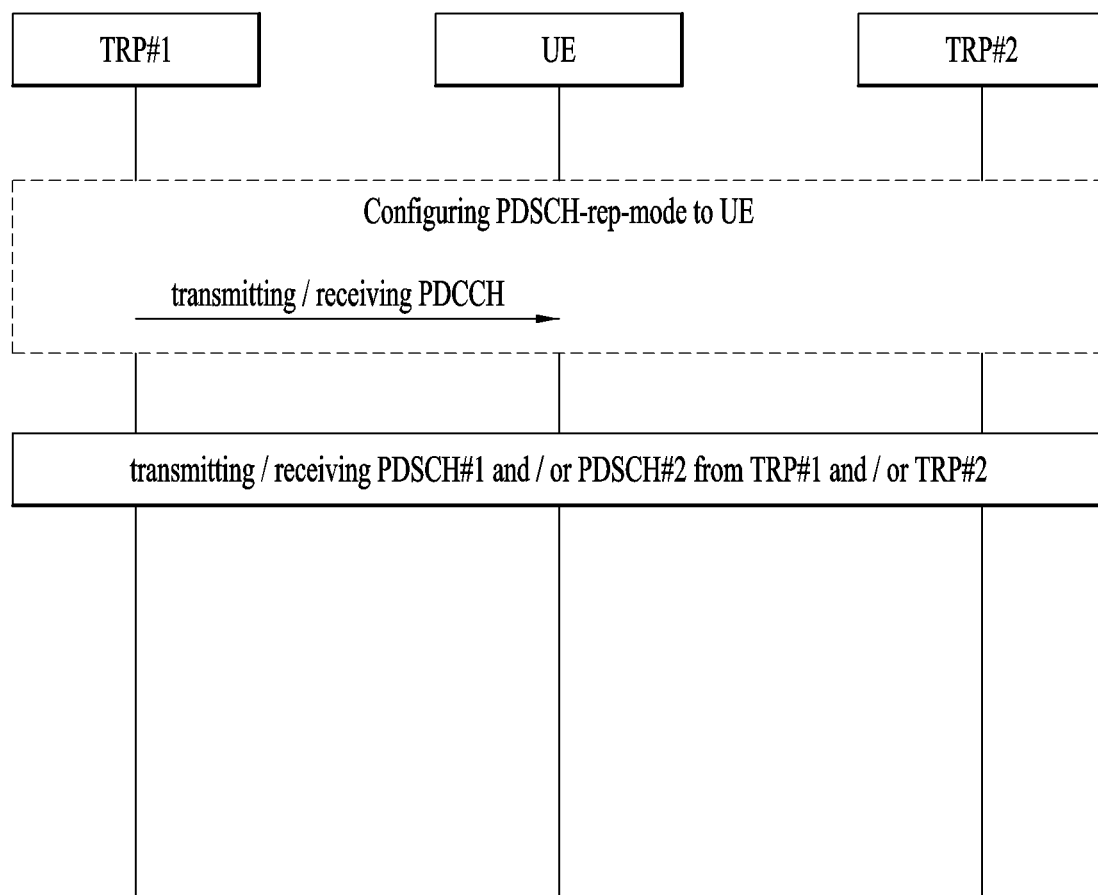
FIG. 15 is a simplified diagram illustrating exemplary operations of a UE and a base station (BS) (e.g., an entity including TRP #1 and TRP #2) applicable to the present disclosure.

In FIG. 14, when two CWs transmitted from two TRPs have been generated from the same information sequence, the UE may soft-combine the two CWs to remarkably increase a reception success rate.

In FIG. 14, the two TRPs may transmit the signals in the same T/F resources (e.g., overlapped PRGs) or in disjointed T/F resources (e.g., disjoint PRGs).

The overlapped PRGs scheme may be advantageous in terms of throughput because a spatial multiplexing gain is maximized. However, because the UE should simultaneously receive the total sum of layers transmitted from the two TRPs, the receiver complexity of the UE may increase. Moreover, interference between different layers may degrade the reception performance of the UE. When the UE reports CSI, interference between different TRPs should be additionally considered for the CSI report.

In the disjoint PRGs scheme, two TRPs transmit PDSCHs in different resources, thereby reducing a spatial multiplexing gain. Nonetheless, the UE may have reduced receiver complexity and increased reception performance.

In FIG. 14, one block may refer to one PRG unit. The disjoint PRGs scheme may include the following three schemes illustrated in FIG. 144.

Localized PRGs: Each of two TRPs may transmit a PDSCH in a (roughly) half of a bandwidth that the BS has indicated/allocated to the UE by DCI. In this method, when the BS has knowledge of CSI between each TRP and the UE, the BS may control each TRP to transmit a PDSCH to the UE in optimal resources by using the CSI.

Interleaved PRGs: Each of two TRPs may transmit a PDSCH by using PRGs in an interleaved manner in a bandwidth that the BS has indicated/allocated to the UE by DCI. In this method, when the BS has no knowledge or inaccurate knowledge of CSI between each TRP and the UE, the BS may maximize frequency diversity by controlling each TRP to transmit a PDSCH by distributing the PDSCH as much as possible within a given bandwidth.

TDMed PRGs: Two TRPs may transmit PDSCHs in different resources which are multiplexed in time division multiplexing (TDM). In this case, both of the TRPs may transmit the PDSCHs based on the same bandwidth.

Now, a detailed description will be given of, when CWs generated from the same information sequence are transmitted by a plurality of TRPs/beam(s) as described above, a configuration method for supporting the transmission mode and a method for operating a UE/BS based on the configuration method.

5.1.1. Method for Configuring PDSCH Repetition Mode

5.1.1.1. First method for configuring PDSCH repetition mode

The BS may configure a PDSCH repetition mode (e.g., a mode in which CWs generated from the same information sequence are transmitted by a plurality of TRPs/beam(s)) for the UE by higher-layer signaling (e.g., RRC signaling or a MAC-CE). For convenience of description, the PDSCH repetition mode is referred to as "PDSCH-rep-mode".

5.1.1.2. Second Method for Configuring PDSCH Repetition Mode

The UE may expect configuration of the PDSCH-rep-mode based on determination that at least one of the following conditions is satisfied.

The BS transmits/indicates DCI including a CRC scrambled with an RNTI for the PDSCH-rep-mode to the UE.

DCI that the BS has transmitted/indicated to the UE configures/indicates (i) a TCI state including two RS sets or (ii) two TCI states each including one RS set.

The BS configures the PDSCH-rep-mode for the UE by higher-layer signaling.

In the present disclosure, the RNTI for the PDSCH-rep-mode may be newly defined or an RNTI defined in a legacy system (e.g., MCS-C-RNTI).

More specifically, the MCS-C-RNTI may be used for robust PDSCH transmission. The UE may consider an MCS table designed to be relatively robust, based on the MCS-C-RNTI. When the MCS-C-RNTI defined in the legacy system is used as the RNTI for the PDSCH-rep-mode, the BS may perform (robust) PDSCH transmission to the UE in the PDSCH-rep-mode.

In a specific example, when the BS indicates/configures a TCI state including two RS sets to/for the UE, the UE may expect that PDSCHs will be transmitted by different TRPs/beam(s). As a consequence, when (i) a TCI state including two RS sets and (ii) the RNTI for the PDSCH-rep-mode (e.g., MCS-C-RNTI) are simultaneously indicated/configured, the UE may expect that the PDSC-rep-mode will be configured.

In another specific example, when a TCI state including two RS sets is indicated/configured to/for the UE configured with the PDSCH-rep-mode by higher-layer signaling (e.g., RRC signaling), the UE may expect that the PDSCH-rep-mode will be configured.

5.1.2. Method for Dynamically Configuring Enable/Disable of PDSCH-Rep-Mode

5.1.2.1. First Method for Configuring Enable/Disable of PDSCH-Rep-Mode

The UE configured with the PDSCH-rep-mode may expect that two CWs generated from the same information sequence will be transmitted by different TRPs/beam(s), based on determination that two CWs are enabled by DCI received from the BS. When a TCI state indicates/configures a plurality of RS sets, the UE may expect that the RS sets are mapped to the CWs in order.

For example, it is assumed that TCI state={RS set #0, RS set #1} and CW #0 and CW #1 are indicated/configured to/for the UE configured with the PDSCH-rep-mode. In this case, the UE may expect to receive CW #0 on a beam indicated by RS set #0 and CW #1 on a beam indicated by RS set #1. Herein, beam may be replaced by resource.

5.1.2.2. Second Method for Configuring Enable/Disable of PDSCH-Rep-Mode

The UE configured with the PDSCH-rep-mode may expect that only one TRP/beam transmits one CW based on determination that only one CW is enabled by DCI received from the BS. Alternatively, the UE configured with the PDSCH-rep-mode may not expect that CWs generated from the same information sequence are transmitted by a plurality of TRPs/beam(s), based on determination that only one CW is enabled by DCI received from the BS.

The method described above may be applied even to a UE for which an operation mode (e.g., a general PDSCH transmission mode for, for example, a PDSCH scheduled by DCI including CRC scrambled with C-RNTI) other than the PDSCH-rep-mode is configured.

5.1.3. Method for Dynamically Configuring Mapping Relationship Between Two CWs and Two RS Sets

5.1.3.1. First Method for Configuring Mapping Relationship

The UE configured with the PDSCH-rep-mode may determine/assume a mapping relationship between two CWs and two RS sets, based on fields (e.g., NDI, MCS, and RV) for TB #2 (or transport block 2) in received DCI.

When the BS is capable of dynamically indicating/configuring a relationship between two CWs and two RS sets to/for the UE, fields (e.g., at least one of the NDI, MCS, or RV field) for TB #2 may be used for other purposes (not for TB #2).

5.1.3.2. Second Method for Configuring Mapping Relationship

The UE configured with the PDSCH-rep-mode may expect to receive a PDSCH through one of TRPs/beams corresponding to two RS sets, respectively, based on a specific inactive CW (e.g., CW #0 or CW #1). Herein, a valid RS set may be determined based on (i) an active TB, (ii) DCI fields (e.g., NDI, MCS, and RV) for the inactive TB, or (iii) DCI fields (e.g., NDI, MCS, and RV) for TB #2 (or TB #1).

The above configuration method may configure which RS set transmits one valid CW in the method for dynamically configuring enable/disable of PDSCH-rep-mode described in section 2.1.2. Additionally, the method described above may be applied even to a UE for which an operation mode (e.g., a general PDSCH transmission mode for, for example, a PDSCH scheduled by DCI including CRC scrambled with C-RNTI) other than the PDSCH-rep-mode is configured.

In a specific example, it is assumed that the BS configures/indicates TCI state={RS set #0, RS set #1} for/to the UE. The UE may assume/expect that CW #0 and CW #1 are received through beams/TRPs indicated by RS set #0 and RS set #1, respectively.

On the above assumption, when CW #1 is disabled (i.e., the MCS field for CW #1 (or TB #2) is set to 26 and the RV field for CW #1 (or TB #2) is set to 1), CS #0 may be transmitted through a beam indicated by RS set #0. In contrast, CW #1 may not be transmitted through a beam indicated by RS set #1.

On the contrary, when CW #0 is disabled, CW #1 may be transmitted through the beam indicated by RS set #1, and CW #0 may not be transmitted through the beam indicated by RS set #0.

In another specific example, it is assumed that the BS indicates/configures TCI state={RS set #0, RS set #1} to/for the UE and CW #1 is disabled. When the NDI field for CW #1 (or TB #2) is set to 0, CW #0 may be transmitted through the beam indicated by RS set #0. On the other hand, the UE may not expect a DL signal to be transmitted in RS set #1.

When the NDI field is set to 1, CW #0 may be transmitted through the beam indicated by RS set #1. On the other hand, the UE may not expect a DL signal to be transmitted in RS set #0.

According to the above examples, using a TCI state including two RS sets, the BS may indicate/configure so that only TRP/beam corresponding to a specific RS set, such as dynamic point selection (DPS), transmits a PDSCH. For example, when TCI state #0={RS set #01 and TCI state #1={RS set #1}, and TCI state #2={RS set #0, RS set #1}, the BS may configure only TCI state #2 for the UE. Subsequently, the BS may implement TCI state #0 and TCI state #1 by enabling or disabling a CW (or TB) indicated/configured to/for the UE. Accordingly, the total number of TCI states that the BS may configure for the UE may be decreased.

However, according to the 5G system, when the rank of a beam indicated by one RS set is 5 or greater, two CWs should be transmitted in the single RS set. According to the above examples, it may be difficult to configure/indicate this case for/to the UE. That is, to implement this case, the total TC states that the BS may configure for the UE should include all of TCI state #0={RS set #0}, TCI state #1={RS set #1}, and TCI state #2={RS set #0, RS set #1}.

5.1.3.3. Third Method for Configuring Mapping Relationship

The UE configured with the PDSCH-rep-mode may expect that CW #0 (or TB #1) is always enabled, and CW #1 (or TB #2) is enabled or disabled.

When CW #1 is disabled, the UE may expect that a PDSCH is transmitted only through one of TRPs/beams corresponding to two RS sets. An RS set corresponding to the TRP/beam through which the PDSCH (CW #0 or TB #1) is transmitted may be determined based on DCI fields (e.g., NDI, MCS, and RV) corresponding to CW #1 (or TB #2).

In a specific example, it is assumed that the BS indicates/configures TCI state={RS set #0, RS set #1} to/for the UE, and CW #1 is disabled. When the NDI field corresponding to CW #1 has a value of 0, CW #0 may be transmitted through a beam indicated by RS set #0. Then, the UE may not expect that a DL signal may be transmitted in RS set #1 in the above case.

5.1.4. Method for Configuring Association Between RV Fields for Two CWs

5.1.4.1. First Method for Configuring Association Between RV Fields for Two CWs The UE configured with the PDSCH-rep-mode may determine the RV value of CW #1 based on (i) the RV of CW #0 and/or a higher-layer configuration (e.g., RRC or a MAC-CE). RV values available for CW #0 and CW #1 may be configured to satisfy at least one of the following conditions. For example, the RV values that CW #0 and CW #1 may have may be configured to one of a plurality of combinations to satisfy at least one condition to be described later. Two combination groups may be configured, and each combination group may be configured to satisfy Alt #1 and Alt #2.

Alt #1: Two CWs indicated/allocated by one DCI are mapped to self-decodable RVs (e.g., RV #0 and RV #3) and non-self-decodable RVs (e.g. RV #1 and RV #2), respectively. For example, Alt #1 may correspond to a case in which an RRC parameter value is 0 in the following embodiment.

Alt #2: Two CWs indicated/allocated by one DCI are mapped commonly to self-decodable RVs (e.g., RV #0 and RV #3) or non-self-decodable RVs (e.g. RV #1 and RV #2). For example, Alt #2 may correspond to a case in which the RRC parameter value is 1 in the following embodiment.

One combination group may include both a specific RV combination and an RV combination in a completely exclusive relationship with the specific RV combination. For example, the specific combination group may include both of {CW #0 with RV #0, CW #1 with RV #2} and {CW #0 with RV #3, CW #1 with RV #1}.

One combination group may include both a specific combination and a combination symmetrical to the specific combination. For example, the specific combination group may include both of {CW #0 with RV #0, CW #1 with RV #2} and {CW #0 with RV #2, CW #1 with RV #0}.

As described above, CW #1 may be generated from the same information sequence as CW #0. Accordingly, the RV value of CW #1 may be determined based on the RV value of CW #0.

When two CWs are configured for a specific UE, DCI fields provided to the UE by the BS may include DCI fields for two TBs (e.g., TB #1 and TB #2) as illustrated in the following table. When the two CWs are generated from the same information sequence, an NDI field for a second CW (or TB #2) may be unnecessary. Further, when the RV of the second CW (or TB #2) is determined based on the RV of a first CW (or TB #1) as described above, the RV field for the second CW (or TB #2) may be unnecessary.

TABLE 24

For tansport block 1:
  Modulation and coding scheme - 5 bits
  New data indicator - 1 bit
  Redundancy version - 2 bits
For transport block 2 (only present if maxNrofCodeWordsScheduledByDCI equals 2):
  Modulation and coding scheme - 5 bits
  New data indicator - 1 bit
  Redundancy version - 2 bits In this case, according to the present disclosure, the BS and the UE may operate according to various embodiments as follows. Various embodiments of the BS and the UE may be implemented based on Table 25 below.

TABLE 25

| RRC parameter | {CW#0, CW#1} | {CW#0, CW#1} | {CW#0, CW#1} | {CW#0, CW#1} |
|---|---|---|---|---|
| 0 | {RV#0, RV#2} | {RV#3, RV#1} | {RV#2, RV#0} | {RV#1, RV#3} |
| 1 | (RV#0, RV#3} | {RV#2, RV#1} | {RV#3, RV#0} | {RV#1, RV#2} |

For example, when the RRC parameter value is 0 and the RV value of CW #0 is 0 in Table 23, the RV value of CW #1 may be determined to be 2. As such, RV #0 and RV #2 generally have a low correlation between the two CWs, and thus, the receiver may obtain a larger coding gain.

Subsequently, when the RV value of CW #0 is set to 3 for retransmission of a specific signal, the RV value of CW #1 may be determined to be 1. In this case, the UE may receive all of RVs #0, #1, #2, and #3 corresponding to a specific information sequence from the BS in one retransmission. Accordingly, the receiver of the UE may obtain the largest coding gain.

In another example, it may be noted from Table 25 that the fourth column is symmetrical to the second column. For a detailed description, it is assumed that when the RRC parameter value is set to 0, the UE successfully receives CW #1 with RV #2, but fails to receive CW #0 with RV #0. In this case, since most of systematic codes are missing, there and the RV value of CW #0, or a pairing index may be indicated/configured based on DCI and/or RRC as illustrated in Table 26 below. In the present disclosure, a pairing index may refer to an index indicating a configuration in which {RV value for CW #0, RV value for CW #1} are paired with each other.

In the following table, 2 bits in DCI and 1 bit in RRC signaling may be required. For example, for 2-bit information in DCI, the RV field for CW #0 (or CW #1) may be used.

TABLE 26

| RRC parameter | DCI field | | | |
|---|---|---|---|---|
| | 00 {CW#0, CW#1} | 01 {CW#0, CW#1} | 10 {CW#0, CW#1} | 11 {CW#0, CW#1} |
| 0 | {RV#0, RV#2} | {RV#3, RV#1} | {RV#2, RV#0} | {RV#1, RV#3} |
| 1 | {RV#0, RV#3} | {RV#2, RV#1} | {RV#3, RV#0} | {RV#1, RV#2} | is a high possibility that the UE fails to decode the received signal.

However, when the corresponding signal is retransmitted and CW #1 with RV #0 is indicated for the retransmission, a signal corresponding to RV #0 may be received from a different TRP from the previous TRP. As far as blockage does not occur simultaneously between the two TRPs and the UE within a predetermined time, reception of a self-decodable CW may be guaranteed with one retransmission.

As a result, spatial/beam diversity may be provided for a self-decodable code. In addition, even when the RRC parameter value is set to 1, spatial/beam diversity may be provided for the same self-decodable code (e.g., {CW #0 with RV #0, CW #1 with RV #31 & {CW #0 with RV #3, CW #1 with RV #0})

In another example, when the RRC parameter value is 1 and the RV value of CW #0 is 0 in Table 25, the RV value of CW #1 may be determined to be 3. Since RV #0 and RV #3 almost share a systematic code technically, performance may decrease in terms of a coding gain. However, even though the UE receives only one CW, the CW may be self-decodable. Therefore, if blockage does not occur between the two TRPs and the UE, the UE may always receive a self-decodable CW.

When a specific signal is retransmitted and the RV value of CW #0 is set to 2 for the retransmission, the RV value of CW #1 may be determined to be 1. Thus, the UE may obtain all of RVs #0, #1, #2, and #3 of the specific signal (or information sequence) with one retransmission, and thus may obtain the largest coding gain.

According to the above-described method, the BS does not need to separately define the RV bit (or field) of CW #1 in DCI. As a result, the BS may reduce the size of bits signaled in the DCI or use the corresponding bit field for other purposes.

Additionally, compared to the above-described example, the BS may indicate/configure one of the rows of the following table by an RRC parameter and/or a DCI field. For example, when the BS indicates/configures, to/for the UE, one of the rows of the following table by the DCI field, the BS may indicate/configure one row (e.g., 0 or 1 may be indicated/configured) by one or more of an NDI field for a second TB defined in the DCI and/or an RV field for the second TB and/or an MCS field for the second TB.

Further, as in the above-described example, the RV value of CW #1 may be determined based on the RRC parameter 5.1.4.2. Second Method for Configuring Association Between RV Fields of Two CWs The UE configured with the PDSCH-rep-mode may not expect that the RV field (or RV value) of CW #1 (or TB #2) is indicated/configured. In other words, for the UE configured with the PDSCH-rep-mode, the BS may not separately indicate/configure the RV field (or RV value) of CW #1 (or TB #2). However, the UE may expect that the starting point of CW #1 corresponds to a point immediately after the ending point of CW #0.

The PDSCH-rep-mode may be interpreted as two CWs being configured/indicated from the perspective of signaling. However, the two CWs are generated substantially from the same information sequence, and the PDSCH-rep-mode may be interpreted as one CW being configured/indicated under circumstances. For example, since two CWs are generated from the same information sequence, when CW #0 is a self-decodable CW (e.g., RV #0 or RV #3), even when CW #1 simply includes only redundant bits, the CWs are decodable from the viewpoint of the UE. In this case, when CW #1 includes coded bits starting immediately after the end of CW #0, the UE may maximize a coding gain. In this case, since the BS does not need to separately define an RV for CW #1, signaling overhead may be reduced.

FIG. 14 is a simplified diagram illustrating an example of operations of a UE and a BS (e.g., an entity including TRP #1 and TRP #2) applicable to the present disclosure.

First, the UE may be configured with the PDSCH-rep-mode by the BS. As described before in section 5.1.1, the configuration may be performed in one or more of the following methods.

1) The PDSCH-rep-mode is configured by higher-layer signaling (e.g., RRC signaling and/or a MAC-CE) from the BS.
2) When (i) DCI including a CRC scrambled with an RNTI for the PDSCH-rep-mode is indicated to the UE and/or (ii) the BS indicates a TCI state including two RS sets (or two TCI states) to the UE by the DCI and/or (iii) the PDSCH-rep-mode is configured for the UE by higher-layer signaling, the PDSCH-rep-mode is configured.

In other words, when the PDSCH-rep-mode is configured based on 1) in the above-described methods, the UE may additionally receive a PDCCH that schedules PDSCH #1 and/or PDSCH #2 from TRP #1 or TRP #2.

Alternatively, when the PDSCH-rep-mode is configured based on 2) among the afore-described methods, the UE may be configured with the PDSCH-rep-mode based on determination that (i) DCI included in a PDCCH that schedules PDSCH #1 and/or PDSCH #2 received from TRP #1 or TRP #2 includes a CRC scrambled with the RNTI for the PDSCH-rep-mode, and/or (ii) the DCI indicates a TCI state including two RS sets (or two TCI states).

In addition, based on at least one of the above-described methods in sections 5.1.2 to 5.1.4, the UE may receive PDSCH #1 (or CW #0 or TB #1) and/or PDSCH #2 (or CW #1 or TB #2) from TRP #1 and/or TRP #2.

For a more specific method, the methods described in sections 5.1.2 to 5.1.4 may be applied.

In the present disclosure, the operation of transmitting CWs generated from the same information sequence to a UE by two different TRPs may corresponds to an operation for an ultra-reliable low latency communication (URLLC) system. In other words, for the URLLC service, the BS may transmit TBs (CWs or PDSCHs) having the same information to one UE through different TRPs. On the contrary, the operation of transmitting CWs generated from different information sequences to a UE by two different TRPs may corresponds to an operation for an enhanced mobile broadband (eMBB) system.

Based on the above description, the BS may signal to the UE whether the URLLC service (signals transmitted from two TRPs have the same information) or the eMBB service (signals transmitted from two TRPs have different information) is supported. A specific method for the signaling may be performed using RRC signaling, an RNTI, and so on.

When the BS supports the URLLC service, TB fields in DCI transmitted for scheduling by the BS may provide TB information (e.g., an MCS, a code rate, an RV, and so on) for a signal transmitted from each TRP, as is done conventionally.

When the BS supports the URLLC service, the UE may interpret fields for two TBs in the DCI according to various methods of the present disclosure. For example, the UE may obtain only code rate information from some bit information of fields for a second TB.

Further, as described before, RV information about each signal may be explicitly signaled as in the examples of the present disclosure or determined based on an implicit rule.

In the present disclosure, schemes for multi-TRP-based URLLC, scheduled by a single DCI may include the following schemes.

(1) Scheme 1 (SDM)

n (n⇐Ns) TCI states in a single slot may be configured along with overlapped time and frequency resource allocations.

(1-1) Scheme 1a

Each transmission occasion may be a layer or a set of layers of the same TB, with each layer or layer set associated with one TCI and one set of DMRS port(s).

A single codeword with one RV may be used across all spatial layers or layer sets. From the perspective of the UE, different coded bits may be mapped to different layers or layer sets with the same mapping rule.

(1-2) Scheme 1b

Each transmission occasion may be a layer or a set of layers of the same TB, with each layer or layer set associated with one TCI and one set of DMRS port(s).

A single codeword with one RV may be used for each spatial layer or layer set. The RVs corresponding to each spatial layer or layer set may be the same or different.

When the total number of layers is equal to or less than 4, codeword-to-layer mapping may be applied.

(1-3) Scheme 1c

One transmission occasion may be (i) one layer of the same TB with one DMRS port associated with multiple TCI state indices, or (ii) one layer of the same TB with multiple DMRS ports associated with multiple TCI state indices one to one.

For scheme 1, applying different MCSs/modulation orders for different layers or layer sets may be considered.

(2) Scheme 2 (FDM)

n (n⇐$N_f$) TCI states in a single slot may be configured along with non-overlapped frequency resource allocations.

For scheme 2, each non-overlapped frequency resource allocation may be associated with one TCI state.

For scheme 2, the same single/multiple DMRS port(s) may be associated with all non-overlapped frequency resource allocations.

(2-1) Scheme 2a

A single codeword with one RV may be used across full resource allocations. From the perspective of the UE, common RB mapping (codeword-to-layer mapping) may be applied across full resource allocations.

(2-2) Scheme 2b

A single codeword with one RV may be used for each non-overlapped frequency resource allocation. The RVs corresponding to the non-overlapped frequency resource allocations may be the same or different.

For scheme 2, applying different MCSs/modulation orders for different non-overlapped frequency resource allocations may be considered.

For example, for RV sequences applied to RBs sequentially associated with two TCI states, $RV_{id}$ indicated by DCI may be used to select one of four RV sequence candidates in single DCI-based multi-TRP (e.g., M-TRP) URLLC.

In another example, in single DCI-based multi-TRP (e.g., M-TRP) URLLC, the following RV sequence candidates may be supported: (0, 2), (2, 3), (3, 1), and (1, 0).

(3) Scheme 3 (TDM)

n (n⇐$N_{t1}$) TCI states in a single slot may be configured along with non-overlapped time resource allocations.

For scheme 3, each transmission occasion of a TB may have one TCI and one RV with a time granularity of a mini-slot.

For scheme 3, all transmission occasion(s) within the slot may use a common MCS with the same single/multiple DMRS port(s).

For example, for RV sequences applied to RBs sequentially associated with two TCI states, $RV_{id}$ indicated by DCI may be used to select one of four RV sequence candidates in single DCI-based multi-TRP (e.g., M-TRP) URLLC.

In another example, in single DCI-based multi-TRP (e.g., M-TRP) URLLC, the following RV sequence candidates may be supported: (0, 2), (2, 3), (3, 1), and (1, 0).

The RV/TCI state may be the same or different among transmission occasions.

For scheme 3, channel estimation interpolation may be applied across mini-slots with the same TCI index.

(4) Scheme 4 (TDM)

n (n⇐$N_{t2}$) TCI states may be configured in K (n⇐K) different slots.

For scheme 4, each transmission occasion of a TB may have one TCI and one RV.

For scheme 4, all transmission occasion(s) across K slots may use a common MCS with the same single/multiple DMRS port(s).

The RV/TCI state may be the same or different among transmission occasions.

For scheme 4, channel estimation interpolation may be applied across slots with the same TCI index.

In the present disclosure, M-TRP/panel-based URLLC schemes may be compared in terms of (i) improved reliability, (ii) efficiency, and (iii) specification impact.

Support of the number of layers per TRP may be discussed later.

In the present disclosure, Ns, $N_f$, $N_{t,i}$, and $N_{t2}$ are values set by the BS. These values may be determined/set by higher-layer signaling and/or DCI.

Based on the above disclosure, the multi-TRP-based URLLC, scheduled by a single DCI may support the following.

For example, the multi-TRP based URLLC, scheduled by single DCI may support an operation based on scheme 1a.

In another example, the multi-TRP-based URLLC scheduled by single DCI may support at least one of scheme 2a or scheme 2b. For this purpose, system level simulator (SLS) and link level simulator (LLS) simulation results may be considered.

Figure 16:
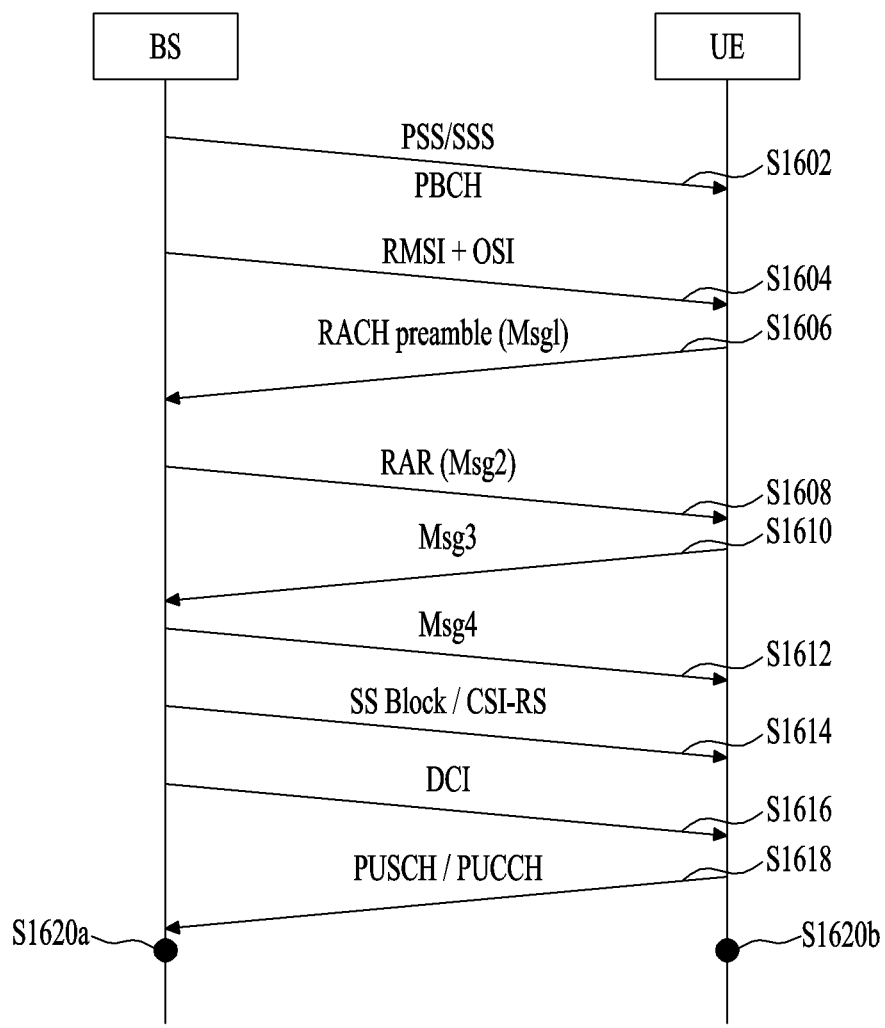
FIG. 16 is a diagram schematically illustrating a procure of network connection and communication between a UE and a BS applicable to the present disclosure.

FIG. 16 is a diagram schematically illustrating a procedure of network connection and communication between a UE and a BS applicable to the present disclosure.

The UE may perform a network access procedure to perform the procedures and/or methods described/proposed above. For example, while accessing a network (e.g., a BS), the UE may receive system information and configuration information required to perform the procedures and/or methods described/proposed above and store the same in a memory. The configuration information required for the present disclosure may be received through higher layer (e.g., RRC layer, medium access control (MAC) layer, etc.) signaling.

In the NR system, a physical channel and a reference signal may be transmitted using beamforming. When beamforming-based signal transmission is supported, a beam management procedure may be involved in order to align beams between the BS and the UE. In addition, the signal proposed in the present disclosure may be transmitted/received using beamforming. In the radio resource control (RRC) IDLE mode, beam alignment may be performed based on a sync signal block (SSB). On the other hand, in the RRC CONNECTED mode, beam alignment may be performed based on CSI-RS (in DL) and SRS (in UL). When beamforming-based signal transmission is not supported, operations related to a beam may be skipped in the following description.

Referring to FIG. 16, a base station (BS) may periodically transmit an SSB (S1602). Here, the SSB includes PSS/SSS/PBCH. The SSB may be transmitted using beam sweeping. Thereafter, the BS may transmit remaining minimum system information (RMSI) and other system information (OSI) (S1604). The RMSI may include information (e.g., PRACH configuration information) necessary for the UE to initially access the BS. After performing SSB detection, the UE identifies the best SSB. Thereafter, the UE may transmit a RACH preamble (Message 1 (Msg1)) to the BS using a PRACH resource linked/corresponding to the index (i.e., the beam) of the best SSB (S1606). The beam direction of the RACH preamble is associated with the PRACH resource. The association between the PRACH resource (and/or the RACH preamble) and the SSB (index) may be configured through system information (e.g., RMSI). Thereafter, as part of the RACH procedure, the BS may transmit a random access response (RAR) (Msg2) in response to the RACH preamble (S1608), and the UE may transmit Msg3 (e.g., an RRC connection request) using the UL grant in the RAR (S1610). The BS may transmit a contention resolution message (Msg4) (S1612). Msg4 may include RRC connection setup.

When an RRC connection is established between the BS and the UE through the RACH procedure, subsequent beam alignment may be performed based on the SSB/CSI-RS (in DL) and the SRS (in UL). For example, the UE may receive an SSB/CSI-RS (S1614). The SSB/CSI-RS may be used by the UE in generating a beam/CSI report. The BS may make a request for a beam/CSI report to the UE through DCI (S1616). In this case, the UE may generate a beam/CSI report based on the SSB/CSI-RS, and transmit the generated beam/CSI report to the BS on the PUSCH/PUCCH (S1618). The beam/CSI report may include a beam measurement result and information about a preferred beam. The BS and the UE may perform beam switching based on the beam/CSI report (S1620a, S1620b).

Thereafter, the UE and the BS may perform the procedures and/or methods described/proposed above. For example, the UE and the BS process the information in the memory according to the proposal in the present disclosure based on the configuration information obtained in the network access procedure (e.g., system information acquisition, RRC connection through RACH, etc.), or may process the received radio signal and store the same in the memory. Here, the radio signal may include at least one of a PDCCH, a PDSCH, or an RS in the case of the downlink, and may include at least one of a PUCCH, a PUSCH, or an SRS in the case of the uplink.

Figure 17:
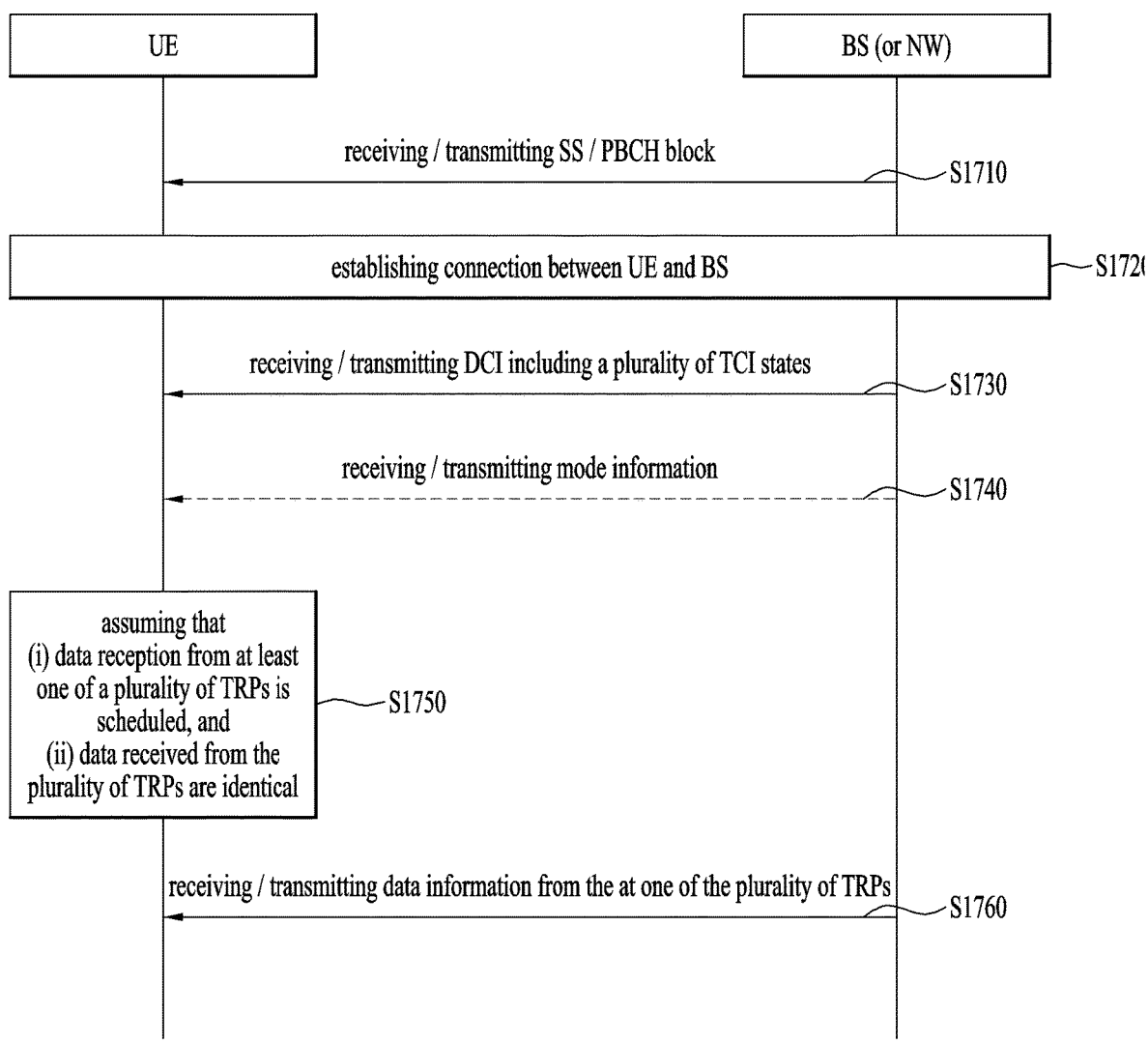
FIG. 17 is a simplified diagram illustrating operations of a UE and a BS according to an example of the present disclosure.
Figure 18:
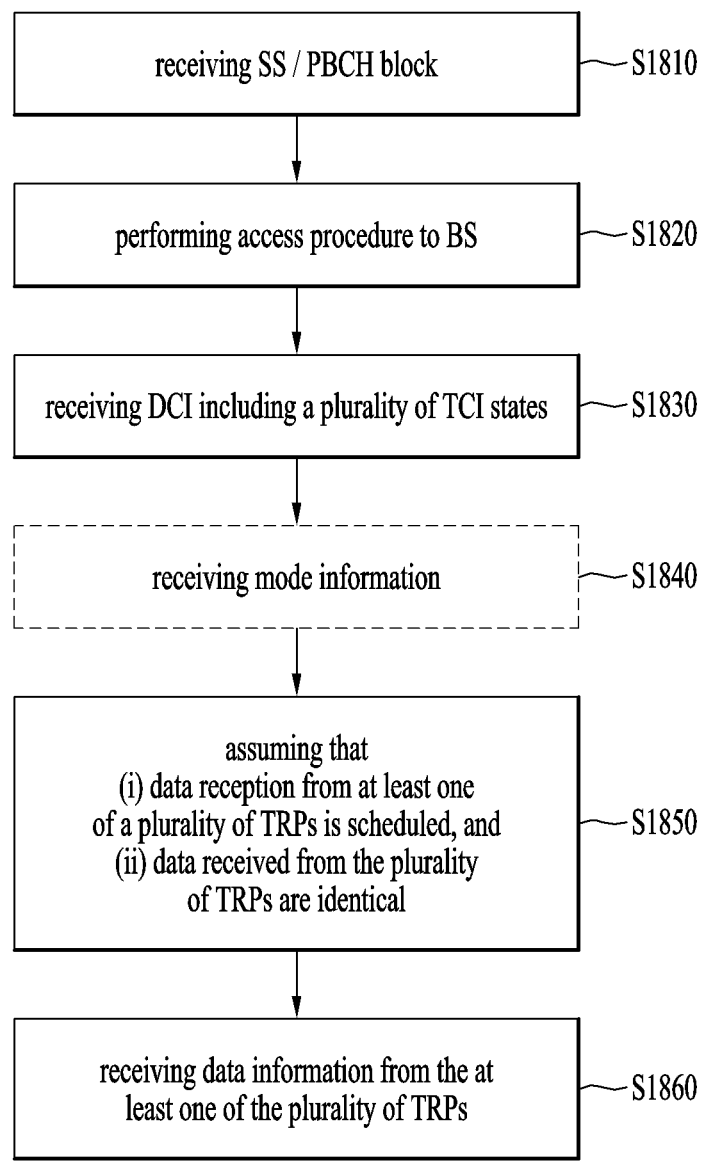
FIG. 18 is a flowchart illustrating a UE operation according to an example of the present disclosure.
Figure 19:
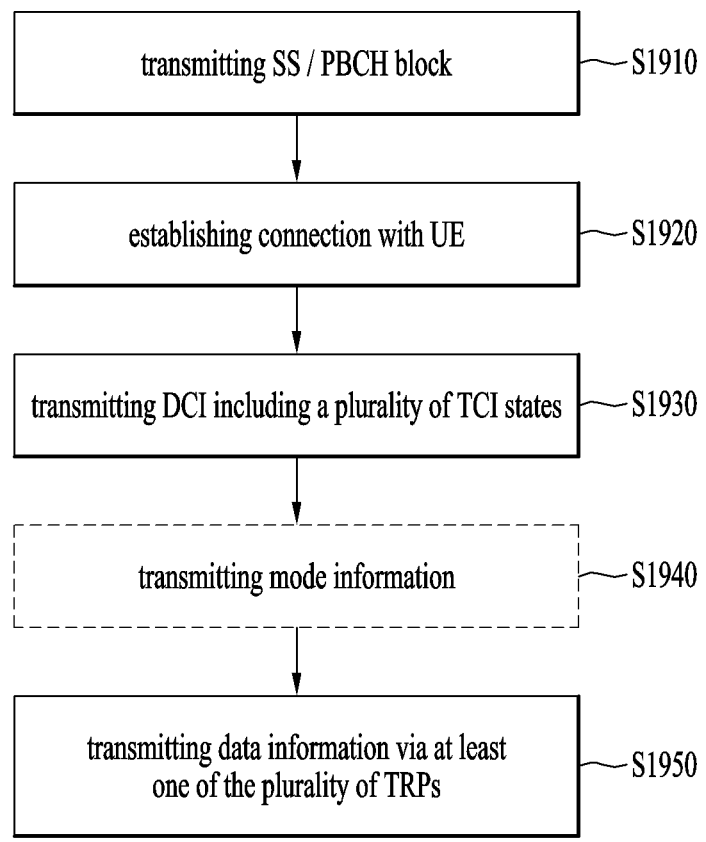
FIG. 19 is a flowchart illustrating a BS operation according to an example of the present disclosure.
Figure 20:
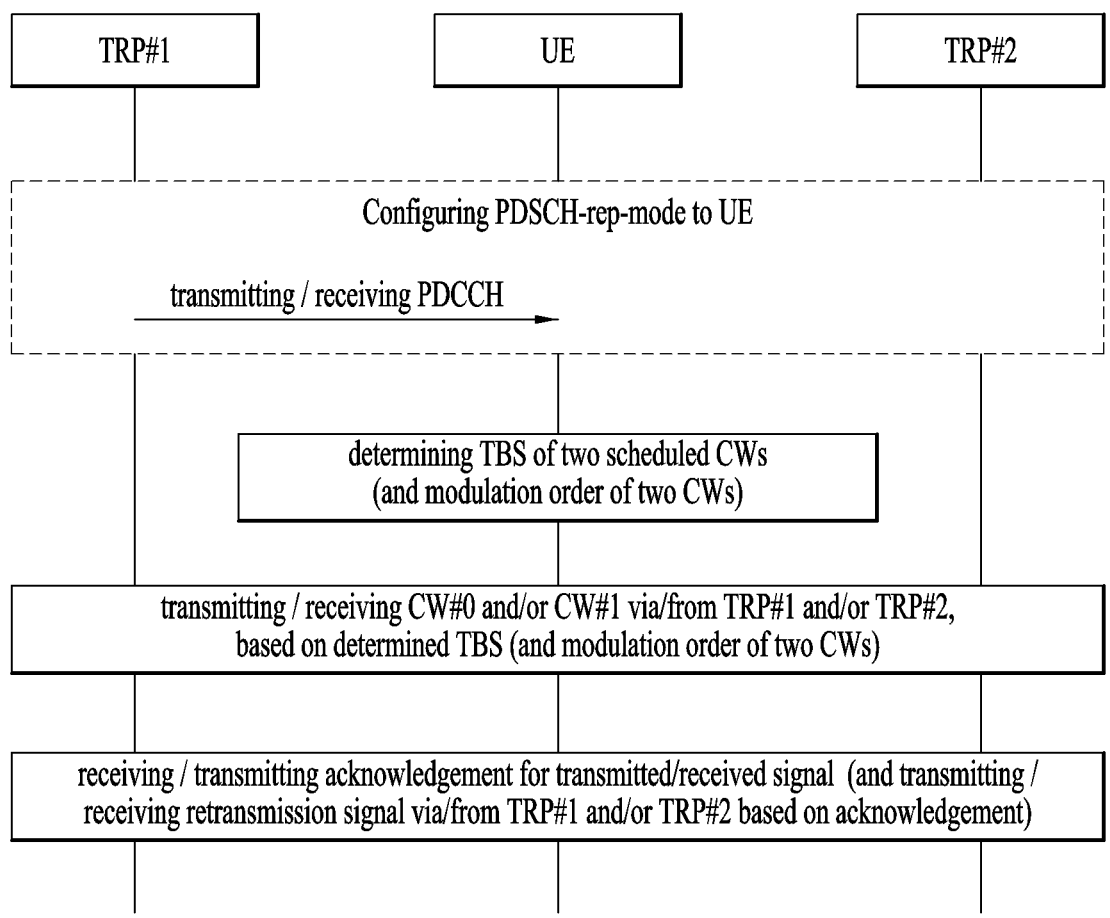
FIG. 20 is a diagram schematically illustrating an exemplary operation of a UE and a base station (e.g., an object including TRP #1 and TRP #2) applicable to the present disclosure.

FIG. 17 is a simplified diagram illustrating operations of a UE and a BS according to an example of the present disclosure, FIG. 18 is a flowchart illustrating a UE operation according to an example of the present disclosure, and FIG. 19 is a flowchart illustrating a BS operation according to an example of the present disclosure.

In an example applicable to the present disclosure, the UE may receive a synch signal/physical broadcast channel (SS/PBCH) block including an SS and a PBCH from the BS (S1710 and S1810). In a corresponding operation, the BS may transmit the SS/PBCH block to the UE (S1710 and S1910).

Based on the received SS/PBCH block, the UE may perform a procedure of access to the BS including transmission of a random access channel (RACH) preamble (S1720 and S1820). In response, the BS may establish a connection with the UE (S1720 and S1920).

In addition, the UE and the BS between which the connection is established based on the above-described procedure may operate as follows.

Specifically, the UE may receive DCI including a plurality of TCI states from the BS (S1730 and S1830). The BS may transmit the DCI to the UE (S1730 and S1830).

In the present disclosure, the DCI may include information about two TBs corresponding to two CWs, respectively. For example, the DCI may include information described in Table 22.

In the present disclosure, each of the plurality of TCI states may be associated with one RS set.

The UE may obtain, from the BS, mode information related to a first mode in which a plurality of data based on the same information are transmitted.

In an example applicable to the present disclosure, the first mode may include a multi-TRP-based URLLC mode. In another example, the mode information may be related to the first mode or a second mode including a multi-TRP-based eMBB mode.

In an example applicable to the present disclosure, the UE may receive the mode information by higher-layer signaling including RRC signaling (S1740 and S1840). The BS may transmit the mode information to the UE by the higher-layer signaling (S1740 and S1840). Transmission and reception of the mode information may precede or follow transmission and reception of the DCI in the time domain.

Alternatively, in another example applicable to the present disclosure, the UE may obtain the mode information based on DCI including a CRC scrambled with an RNTI related to the first mode. In other words, the UE may obtain the mode information related to the first mode without additional scheduling.

The UE may assume based on the DCI and the mode information that (i) data reception is scheduled by at least one of a plurality of TRPs related to the DCI, and (ii) data received from the plurality of TRPs are based on the same information (S1750 and S1850).

Subsequently, the UE may obtain data information from at least one of the plurality of TRPs based on the assumption (S1760 and S1860). The BS may transmit the data information through the at least one of the plurality of TRPs in the DCI, based on the DCI and the mode information (S1760 and S1860).

In a specific example, the UE may obtain the data information in each PDSCH occasion related to two TRPs among the plurality of TRPs based on (i) DCI indicating enable of two CWs and (ii) the assumption. In the present disclosure, a PDSCH occasion may mean a PDSCH (or PDSCH candidate) associated with the same information (e.g., the same TB) related to a plurality of TCI states (e.g., two TCI states).

For example, RV information for the two PDSCH occasions may be determined based on one of (i) an RV combination for the two PDSCH occasions being determined based on RV information related to a first CW, included in the DCI or (ii) RV information related to a second codeword being determined based on the RV information related to the first CW in the RV information for the two PDSCH occasions.

In another example, the RV information for the two PDSCH occasions may be configured/indicated as one of {RV #0, RV #2}, {RV #1, RV #3}, {RV #2, RV #0}, and {RV #3, RV #1}.

In another specific example, the UE may obtain the data information in a PDSCH occasion related to one of the plurality of TRPs based on (i) the DCI indicating enable of one of two codewords and the assumption.

The PDSCH occasion may be associated with one TCI state determined based on the DCI among the plurality of TCI states.

5.2. Single PDCCH Based Signaling and UE Behaviors for PDSCH Repetition

5.2.1. Method for determination of TB size from two CWs

5.2.1.1. First TBS Determination Method

A UE configured with the PDSCH-rep-mode may determine the TB size based on at least one of the MCS of a CW having a self-decodable RV (e.g., RV #0, RV #3), resource allocation, or the number of layers.

In this case, when the RVs of two CWs are the same, the UE may determine the TB size based on at least one of the MCS of CW #0 (or CW #1), the number of available REs, or the number of layers.

Alternatively, when the RVs of the two CWs are RV #0 and RV #3, the UE may determine the TB size based on at least one of the MCS of the CW having RV #0 (or RV #3), the number of available REs, or the number of layers.

In this case, a more specific TBS determination method may be based on the above-described TBS determination method. In addition, the UE may calculate the number of available REs based on the resources allocated to the UE. The UE may determine the number of layers based on the number of DMRS ports having an association with the corresponding CW.

In the present disclosure, two CWs may differ from each other in terms of at least one of the MCS, the number of layers, or the number of available REs. In this case, the TB size corresponding may be determined differently according to each CW. However, according to the PDSCH-rep-mode described in the present disclosure, the two CWs are generated based on the same TB, and accordingly it may be unclear the CW forming the basis of determination of the TB size by the UE.

To address this issue, when one of the two CWs has a self-decodable RV value, the UE should be allowed to perform decoding with only the CW. Accordingly, in selecting a CW for determining the TB size, the UE according to the present disclosure may preferentially select a self-decodable RV value. In addition, since RV #0 generally exhibits better performance than RV #3, the UE may select RV #0 in preference to RV #3.

5.2.1.2. Second TBS Determination Method

A UE configured with the PDSCH-rep-mode may determine the TB size based on at least one of the MCS of CW #0 (or CW #1), resource allocation, or the number of layers.

According to this exemplary operation, the UE may select a TB related to a specific CW without separate signaling. Accordingly, signaling overhead may be reduced, and overall system complexity may be lowered.

However, when (i) CW #0 and CW #1 correspond to RS set #0 and RS set #1 of the TCI state, respectively, and (ii) the TB size is determined based on CW #0, the UE may determine the TB size based on the beam indicated by RS set #0.

However, according to this method, when the state of the beam indicated by set #1 is better than the state of the beam indicated by RS set #0, loss may occur in terms of throughput because the UE should determine the TB size based on the state of the beam indicated by RS set #0.

5.2.1.3. Third TBS Determination Method

A UE configured with the PDSCH-rep-mode may determine each TB size based on at least one of an MCS corresponding to each of the indicated two CWs, resource allocation, and the number of layers. Subsequently, the UE may select a larger one of the calculated TB sizes corresponding to the two CWs as a (representative) TB size.

For example, when the TB size of CW #0 is larger than the TB size of CW #1, the UE may select the TB size of CW #0. This example may be advantageous in terms of throughput as the BS may transmit more information to the UE through one transmission.

5.2.1.4. Fourth TBS Determination Method

A UE configured with the PDSCH-rep-mode may determine the TB size corresponding to the CW indicated by DCI and/or higher layer signaling (e.g., RRC or MCA-CE, etc.).

As a specific example, when the NDI for the second TB of the DCI is 0, the UE may select the TB corresponding to CW #0 as a (representative) TB. On the other hand, when the NDI for the second TB of the DCI is 1, the UE may select the TB corresponding to CW #1 as a (representative) TB.

In the example above, the NDI field for the second TB of the DCI may be replaced with an RV field for the second TB of the DCI or a specific field of a higher layer parameter.

5.2.1.5. Fifth TBS Determination Method

A UE configured with the PDSCH-rep-mode may determine the TB size based on CW #0 (or TB #1). In addition, the UE may determine/assume a CW-to-RS set mapping relationship based on the NDI, and/or RV, and/or MCS fields of CW #1 (or TB #2). In other words, the BS may indicate/configure the CW-to-RS set mapping relationship to the UE based on the NDI, and/or RV, and/or MCS fields of CW #1 (or TB #2).

In the example above, the remaining bit information in the DCI may be reserved as a specific value. In this case, the reserved specific value may be determined/set based on a configuration value for disabling the CW.

Alternatively, in the example above, the UE may determine the TB size based on CW1 (or TB #2) rather than CW #0.

Alternatively, the remaining bit information in the DCI may not be defined separately. Accordingly, the UE may not expect that the remaining bit information in the DCI is configured. In this case, the BS may save bits in the DCI.

When two CWs are scheduled by a single PDCCH (e.g., Single PDCCH with 2CW), the BS may configure only one frequency domain resource assignment (FRA) to the UE. At this time, when the FRA bit field is divided into two parts to indicate the frequency positions of CW #0 and CW #1, the UE may assume that the most significant bit (MSB) of the FRA and the least significant bit (LSB) of the FRA indicates/allocates the frequency positions of CW #0 and CW #1, respectively.

As a specific example, the UE may determine the TB size based on CW #0. In this case, the LSB (3bits) and RV (2bits) fields of the MCS for CW #1 (or TB #2) excluding the NDI field for CW #1 (or TB #2) may be set to 0 (the MSB (2 bits) of the MCS may be used to indicate the modulation order of CW #1). In this case, the 3bits of the LSB and the 2bits of the RV of the MCS are known bits, and accordingly the UE may improve decoding performance of the PDCCH using the same. When the NDI for CW #1 (or TB #2) is equal to 0, the UE may expect that CW #0/#1 are mapped to RS set #0/#1, respectively. On the other hand, when the NDI for CW #1 (or TB #2) is equal to 1, the UE may expect that CW #0/#1 are mapped to RS set #1/#0, respectively.

As another specific example, in determining the LSB and RV bits of the MCS, the UE may consider a disable option of the CW (e.g., even when the TCI state is configured with two RS sets, only specific one RS set is set to be valid, using a CW disable option). For example, MCS=26 (11010) and RV=1 (01) may be set as signaling values for the CW disable option. In consideration of the binary values, '010' and '01' may be set as the default values of the LSB and RV of the MCS. When the demodulation order of CW #1 is indicated/set by LSB 2bits of MCS, the MSB 3bits and RV 2bits of MCS may be determined as/set to '110' and '01', respectively.

As another specific example, in the above-described example, the RV field may indicate the modulation order of CW #1 instead of the MCS field. In this case, all 5 bits of the MCS field may be reserved as '11010'. However, when RV='01' and MCS='11010', CW #1 may be disabled, and therefore a value other than '11010' may be set as a default value of the MCS field. However, in order to indicate disabling of CW #1, the MCS field may have a value of '11010'.

According to the above-described method, since the UE may determine the positions of known bits (e.g., 5 bits) before decoding the signal, it may use the known bits in decoding the signal. In addition, the BS may dynamically switch the CW-to-RS set relationship through NDI. Accordingly, flexibility allowing a TB to be selected according to the beam state may be provided.

However, in order to improve the PDCCH decoding performance of the UE according to the above-described method, the UE should assume that the PDSCH-rep-mode is configured before decoding the PDCCH. If the UE needs to determine whether or not the PDSCH-rep-mode is configured through the TCI state and MCS-C-RNTI check, the UE should perform decoding of the PDCCH based on two hypotheses including the case where the PDSCH-rep-mode is configured and the case where the PDSCH-rep-mode is not configured. Accordingly, in this case, obtaining performance improvement may require cause increase in the complexity of PDCCH decoding of the UE.

5.2.2. Signaling Methods Using MCS of CW which is not Related to Selected TB (or CW #1)

5.2.2.1. First Signaling Method Using MCS

A UE configured with the PDSCH-rep-mode may determine the modulation order of a CW not used for TBS determination based on some bits (e.g., MSB, LSB) of the MCS field and/or the RV field for the CW (not used for TBS determination). In this case, the remaining bit information in the MCS field may be fixed to a specific value (e.g., reserve).

When the TB size is determined based on at least one of the MCS, RV, and resource allocation for CW #0 for the UE for which the PDSCH-rep-mode is configured, a code-rate other than the demodulation order may not be needed in the MCS field for CW #1 (TB #2) in the DCI transmitted from the BS to the UE. In other words, in this case, the BS may indicate/configure only the modulation order to the UE using only some bits of the MCS field (e.g., 5 bits) in the DCI.

In Table 27 below, it is assumed that the MCS field has a size of 5 bits, and that a part marked "XXX" may be set to any bits. This is because the part marked "XXX" does not affect the modulation order. As such, based on Table 27 below, the UE may determine the modulation order based only on the MSB of the MCS field of the CW that is not used in TBS determination.

TABLE 27

| MCS field | Modulation Order |
| --- | --- |
| 00XXX | QPSK |
| 01XXX | 16 QAM |
| 10XXX | 64 QAM |
| 11XXX | 256 QAM |

Here, when the part marked "XXX" is fixed to a specific value (e.g., "000"), the UE may perform PDCCH decoding by processing this value as a known bit in PDCCH decoding. As a result, the UE may improve the PDCCH decoding performance.

Alternatively, the part marked "XXX" may not be defined separately. Thereby, the BS may minimize the bit information in the DCI (bit saving). Alternatively, the BS may use the bit information for a purpose different from the conventional one.

5.2.2.2. Second Signaling Method Using MCS

A UE configured with the PDSCH-rep-mode may determine the modulation order of CW #1 based on the NDI for TB #2, and/or some bits (e.g., MSB, LSB) of the MCS for TB #2, and/or the RV field for TB #2. In this case, the remaining bits of the MCS field may be fixed to a specific value or reserved.

According to this method, the UE may determine the modulation order of CW #1 based on the DCI field corresponding to TB #2. The BS may fix the remaining bit information (e.g., unused bit information in the MCS field) to a specific value. Accordingly, the UE may operate more simply.

In a specific example, the MCS field corresponding to TB #2 may be redefined as shown in the table below. In this case, the UE may determine the modulation order of CW #1 based on the MSB 2bits of the MCS field.

TABLE 28

| MCS field of TB#2 | Modulation Order |
| --- | --- |
| 00XXX | QPSK |
| 01XXX | 16 QAM |
| 10XXX | 64 QAM |
| 11XXX | 256 QAM |

Alternatively, the UE may determine the modulation order of CW #1 based on the RV for TB #2 in the DCI based on Table 29 below.

TABLE 29

| RV field of TB#2 | Modulation Order |
| --- | --- |
| 00 | QPSK |
| 01 | 16 QAM |

TABLE 29-continued

| RV field of TB#2 | Modulation Order |
| --- | --- |
| 10 | 64 QAM |
| 11 | 256 QAM |

5.2.3. ACK/NACK Feedback

5.2.3.1. First ACK/NACK Feedback

When two enabled CWs are indicated/configured by a BS to a UE configured with the PDSCH-rep-mode, the UE may feed back only a single ACK/NACK to the BS.

As described above, CW #0 and CW #1 may be generated from the same information sequence (or from the same TB). Accordingly, even when two CWs are indicated/configured to the UE, the UE may feed back only a single ACK/NACK. Alternatively, in the case above, the BS may define only one ACK/NACK for the UE.

5.2.3.2. Second ACK/NACK Feedback

The UE receiving the PDSCH through the PDSCH-rep-mode may determine whether to re-receive the PDSCH, based on the HARQ process number and/or the NDI field related to CW #0 (or CW #1).

Specifically, the UE receiving the PDSCH through the PDSCH-rep-mode may receive one TB through the 2CW-based DCI. In this case, the size of the TB may be determined based on CW #0. Accordingly, when retransmission is performed, the BS may not toggle the NDI field related to CW #0, but indicate the same value as before, and informs the UE of the HARQ process number, thereby configuring, to the UE, whether to retransmit a specific PDSCH.

FIG. 14 is a diagram schematically illustrating an exemplary operation of a UE and a BS (e.g., an object including TRP #1 and TRP #2) applicable to the present disclosure.

First, the PDSCH-rep-mode may be configured for the UE by the BS. As described above in section 5.1.1, the configuration may be established through one or more of the following methods.

1) Establishing the configuration through higher layer signaling (e.g., RRC and/or MAC-CE, etc.) of the BS; and
2) (i) DCI including CRC scrambled with RNTI for PDSCH-rep-mode is indicated to the UE, and/or (ii) the BS indicates a TCI state (or two TCI states) having the DCI including two RS sets to the UE, and/or (iii) the PDSCH-rep-mode is configured for the UE by higher layer signaling.

In other words, when the PDSCH-rep-mode is configured based on method 1) between the above-described methods, the UE may additionally receive a PDCCH for scheduling PDSCH #1 and/or PDSCH #2 from TRP #1 or TRP #2.

Alternatively, when the PDSCH-rep-mode is to be configured based on method 2) between the above-described methods, the PDSCH-rep-mode may be configured for the UE based on the determination that (i) the DCI included in a PDCCH for scheduling PDSCH #1 and/or PDSCH #2 received from TRP #1 or TRP #2 includes a CRC scrambled with an RNTI for the PDSCH-rep-mode, and/or (ii) a TCI state (or two TCI states) including two RS sets is indicated.

In addition, based on at least one of the methods according to sections 5.1.2 to 5.1.4 or 5.2.1 to 5.2.3 above, the UE may receive PDSCH #1 (or CW #0 or TB #1) and/or PDSCH #2 (or CW #1 or TB #2) transmitted from TRP #1 and/or TRP #2.

Unlike the example of FIG. 14, the technical configuration according to the present disclosure may be applied even to a configuration in which the UE receives PDSCH #1 and PDSCH #2 from the BS (without distinction between TRPs). In other words, the features may be applied to (i) an operation of the UE of receiving the respective PDSCHs (e.g., PDSCH #1 and PDSCH #2) through different TRPs, or (ii) an operation of the UE of receiving the respective PDSCHs (e.g., PDSCH #1 and PDSCH #2) through the same TRP.

In this case, PDSCH #1 (or CW #0 or TB #1) may be related to a first TCI state among a plurality of TCI states, and PDSCH #2 (or CW #1 or TB #2) may be related to a second TCI state among the plurality of TCI states.

Accordingly, as an example applicable to the present disclosure, RBs allocated to the PDSCH associated with the first TCI state in the TCI code point may be used for TBS determination with single MCS indication, while same TBS and modulation order can be assumed for the RBs allocated to PDSCH related to the second TCI state.

As another example, the UE may determine a TB size related to two CWs scheduled by a single PDCCH, based on various methods disclosed in section 5.2.1. In addition, the UE may determine the modulation order for a CW not related to the TB size determination described above, based on the various methods disclosed in section 2.2.2. Accordingly, the UE may receive the two CWs based on the determined TB size and modulation order.

In addition, the UE may receive ACK/NACK feedback related to the two CWs scheduled by a single PDCCH based on various methods disclosed in section 5.2.3 and receive a retransmitted signal based thereon.

As more specific methods, the methods disclosed in sections 5.1.2 to 5.1.4, and 5.2 above may be applied.

Figure 21:
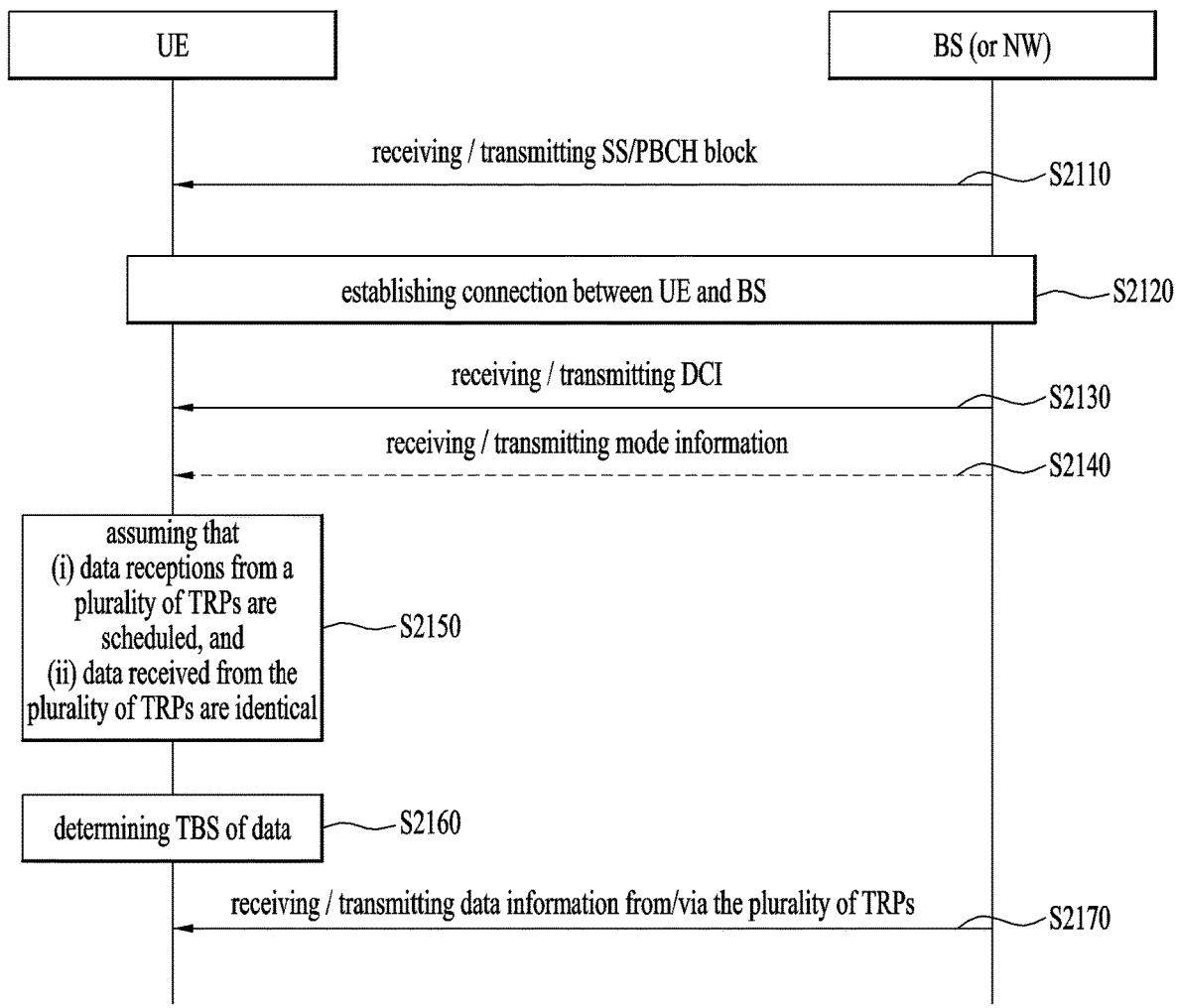
FIG. 21 is a diagram schematically illustrating the operation of a UE and a base station according to an example of the present disclosure.
Figure 22:
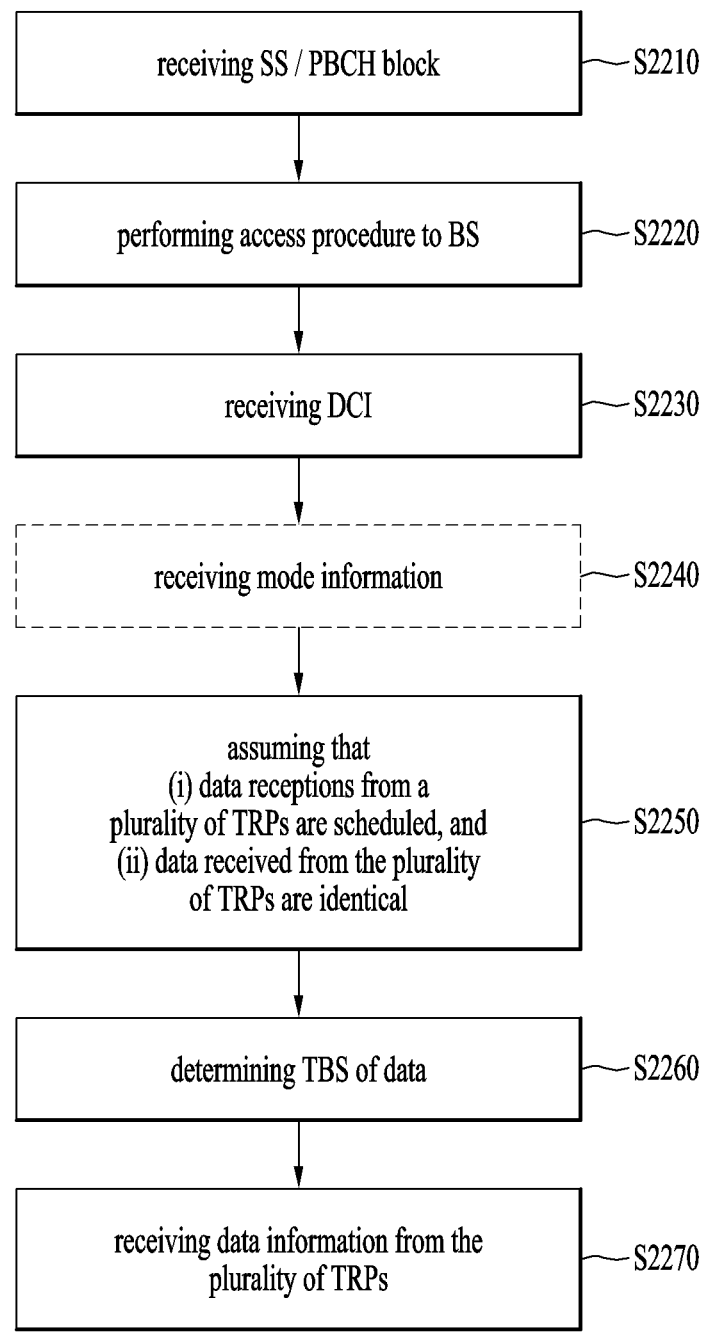
FIG. 22 is a flowchart of an operation of the UE according to an example of the present disclosure.
Figure 23:
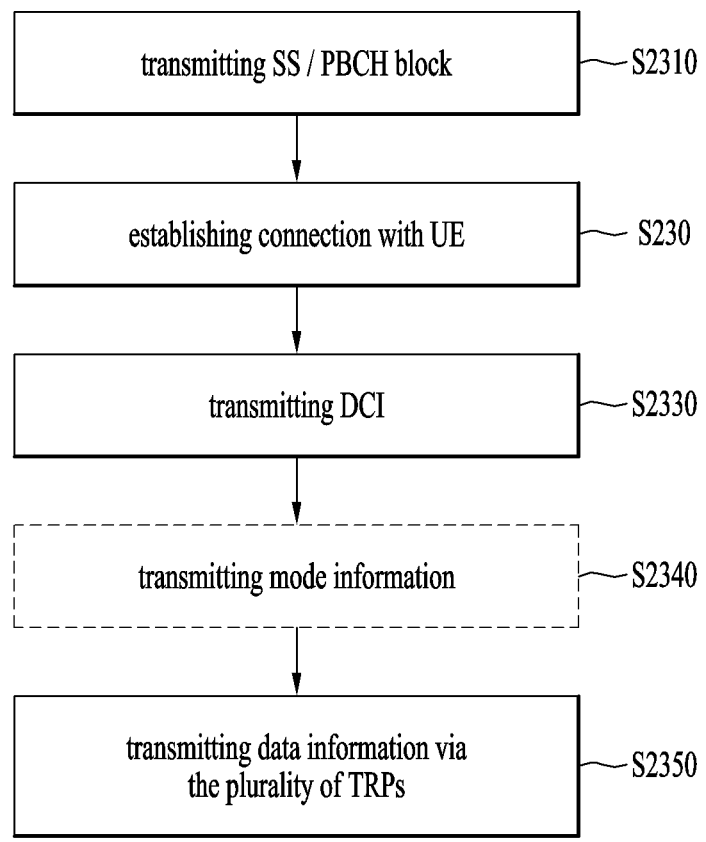
FIG. 23 is a flowchart of an operation of the base station according to an example of the present disclosure.

FIG. 21 is a diagram schematically illustrating the operation of a UE and a BS according to an example of the present disclosure, FIG. 22 is a flowchart of an operation of the UE according to an example of the present disclosure, and FIG. 23 is a flowchart of an operation of the BS according to an example of the present disclosure.

In an example applicable to the present disclosure, the UE may receive a synch signal/physical broadcast channel (SS/PBCH) block including an SS and a PBCH from the BS (S2110 and S2210). In a corresponding operation, the BS may transmit the SS/PBCH block to the UE (S2110 and S2310).

Based on the received SS/PBCH block, the UE may perform a procedure of access to the BS including transmission of a random access channel (RACH) preamble (S2120 and S2220). In response, the BS may establish a connection with the UE (S2120 and S2320).

In addition, the UE and the BS between which the connection is established based on the above-described procedure may operate as follows.

Specifically, the UE may receive, from the BS, DCI including (i) a plurality of TCI states and (ii) information for two TBs (S2130, S2230). In a corresponding operation, the BS may transmit the DCI to the UE (S2130, S2230).

In the present disclosure, each of the plurality of TCI states may be related to one RS set.

The UE may obtain, from the BS, mode information related to a first mode in which a plurality of data based on the same information is transmitted.

As an example applicable to the present disclosure, the first mode may include a multi-TRP-based URLLLC (ultra-reliable low latency communication) mode. As another example, the mode information may be related to one of the first mode or a second mode including a multi-TRP-based eMBB (enhanced mobile broadband) mode.

As an example applicable to the present disclosure, the UE may receive the mode information through higher layer signaling including RRC signaling (S2140, S2240). In a corresponding operation, the BS may transmit the mode information to the UE through higher layer signaling (S2140, S2240). In this case, the transmission and reception of the mode information may be performed before or after the transmission and reception of the above-described DCI in the time domain.

Alternatively, as another example applicable to the present disclosure, the UE may obtain the information based on DCI including a cyclic redundancy check (CRC) scrambled with a radio network temporary identifier (RNTI) related to the first mode. In other words, the UE may obtain the mode information related to the first mode without additional signaling.

Based on the DCI and the mode information, the UE may assume that (i) data reception is scheduled from a plurality of TRPs by the DCI, and (ii) data received from the plurality of TRPs is based on the same information (S2150, S2250).

Subsequently, based on the assumption, the UE may determine a transport block size (TBS) related to the data based on information related to one of the two TBs related to the DCI (S2160 and S2260).

As an example applicable to the present disclosure, the information related to the one TB may be information related to a TB related to a codeword having self-decodable redundancy version (RV) information between the two codewords related to the DCI.

Here, the self-decodable RV information may include information related to RV index 0 or RV index 3.

As another example applicable to the present disclosure, the information related to the one TB may be information related to a codeword having a first codeword index between the two codewords related to the DCI.

As another example applicable to the present disclosure, the information related to the one TB may be information related to a PDSCH related to a first TCI state among a plurality of TCI states related to the DCI.

As another example applicable to the present disclosure, the information related to the one TB may be information related to a codeword having a large TBS related to the two codewords related to the DCI.

As another example applicable to the present disclosure, the information related to the one TB may be information related to one codeword indicated by the BS between the two codewords related to the DCI.

Here, the one codeword indicated by the BS may be determined based on new data indicator (NDI) information related to a second TB in the information for the two TBs in the DCI.

In the present disclosure, a modulation order of the one TB may be determined based on the information related to the one TB, and the modulation order of the other one of the two TBs may be determined based on the information related to the other one of the TBs.

Here, the information related to the other TB may include at least one of the followings:

At least one bit information of NDI information related to the other TB;

At least one bit information of MCS (modulation and coding scheme) information related to the other TB; and RV information related to the other TB.

Subsequently, the UE may obtain data information from the plurality of TRPs based on the TBS (S2170, S2270).

In a corresponding operation, the BS may transmit the data information to the UE through a plurality of TRPs based on the DCI and the mode information (S2170, S2350). In this case, the TBS related to the data information may be related to information related to one of the two TBs related to the DCI.

In the present disclosure, the UE may additionally transmit one acknowledgment to the BS in response to the data information obtained from the plurality of TRPs.

5.3. Configuration of Resource Allocation and DMRS Port Indication Using DCI Fields of the Second TB for CoMP

5.3.1. Method for Dynamically or Statically Indicating Localized PRGs or Interleaved PRGs

5.3.1.1. First PRG Indication Method

A UE configured with the PDSCH-rep-mode may expect that Y PRG modes (where Y is a value of 1 to 4) are preconfigured among a plurality of PRG modes via from higher layer signaling (e.g., RRC, MAC-CE, etc.). Here, the plurality of PRG modes may include the following modes: overlapped PRGs, localized PRGs, interleaved PRGs, or TDMed PRGs.

In addition, the UE configured with the PDSCH-rep-mode may expect that one of the Y PRG modes is indicated based on at least one of the new data indicator (NDI) field for the second TB, and/or the redundancy version (RV) field for the second TB, and/or the MCS field for the second TB. However, when one PRG mode is configured/determined by higher layer signaling, the DCI fields may not be used for this purpose.

Here, the PRG modes may be defined based on FIG. 12.

In another embodiment, Y PRG modes may be defined according to a standard specification without higher layer signaling. For example, when only the localized PRG mode (localized PRGs) or the interleaved PRG mode (interleaved PRGs) is supported, the UE may expect that one of the two PRG modes is indicated based on at least one of the NDI field for the second TB, and/or the RV field for the second TB, and/or MCS field for the second TB, without higher layer signaling.

5.3.1.2. Second PRG Indication Method

A UE configured with the PDSCH-rep-mode may expect localized PRGs based on higher layer signaling related to PRB bundling for wideband. As a specific example, when PRB bundling is configured as a wideband PRB for the UE through higher layer parameters (e.g., prb-BundlingType, dynamicBundling, etc.), the UE may expect localized PRGs.

Table 30 below shows higher layer parameters related to the PRB bundling.

TABLE 30

| | |
|---|---|
| prb-BundlingType | CHOICE { |
| staticBundling | SEQUENCE { |
| bundleSize | ENUMERATED { n4, wideband } |
| OPTIONAL -- Need S | |
| }, | |
| dynamicBundling | SEQUENCE { |
| bundleSizeSet1 | ENUMERATED { n4, wideband, n2-wideband, n4-wideband } OPTIONAL, -- Need S |
| bundleSizeSet2 | ENUMERATED { n4, wideband } |
| OPTIONAL -- Need S | |
| } | |
| }, | |

In the table above, prb-bundlingType may be related to (or may indicate) a PRB bundle type and bundle size(s). When 'dynamic' is selected, the actual bundleSizeSet1 or bundleSizeSet2 to be used may be indicated through DCI. Constraints on the bundleSize(Set) setting may be based on vrb-ToPRB-Interleaver and rbg-Size settings. When the value of bundleSize(Set) is absent, the UE may apply the value of n2 (e.g., 2).

Based on the higher layer parameters, the UE may perform an operation based on the table below.

More specifically, when the UE receives PDSCH scheduled by PDCCH with DCI format 1_1 with CRC scrambled by C-RNTI, MCS-C-RNTI or CS-RNTI, if the higher layer parameter prb-BundlingType is set to 'dynamicBundling', (i) the higher layer parameters bundleSizeSet1 and bundleSizeSet2 may configure two sets of $P'_{BWP,i}P'_{BWP,i}$ values, wherein (ii) the first set may take one or more $P'_{BWP,i}P'_{BWP,i}$ values among {2, 4, wideband}, and (iii) the second set may take one $P'_{BWP,i}P'_{BWP,i}$ value among {2, 4, wideband}.

If the PRB bundling size indicator signaled in DCI format 1_1 is set to '0', the UE may use a $P'_{BWP,i}P'_{BWP,i}$ value from the second set of $P'_{BWP,i}P'_{BWP,i}$ values when receiving PDSCH scheduled by the same DCI. If the PRB bundling size indicator signaled in DCI format 1_1 is set to '1' and one value is configured for the first set of $P'_{BWP,i}P'_{BWP,i}$ values, the UE may use the $P'_{BWP,i}P'_{BWP,i}$ value when receiving PDSCH scheduled by the same DCI. If the PRB bundling size indicator signaled in DCI format 1_1 is set to '1' and two values are configured for the first set of $P'_{BWP,i}P'_{BWP,i}$ values as 'n2-wideband' (corresponding to two $P'_{BWP,i}P'_{BWP,i}$ values of 2 and wideband) or 'n4-wideband' (corresponding to two $P'_{BWP,i}P'_{BWP,i}$ values of 4 and wideband), the UE may use the value when receiving PDSCH scheduled by the same DCI as follows: (i) if the scheduled PRBs are contiguous and the size of the scheduled PRBs is larger than $N_{BWP,i}^{size}/2N_{BWP,i}^{size}/2$, $P'_{BWP,i}P'_{BWP,i}$ may be the same as the scheduled bandwidth; (ii) otherwise, $P'_{BWP,i}P'_{BWP,i}$ may be set to the remaining configured values of 2 or 4.

When the UE receives PDSCH scheduled by PDCCH with DCI format 1_1 with CRC scrambled by C-RNTI, MCS-C-RNTI or CS-RNTI, if the higher layer parameter prb-BundlingType is set to 'staticBundling', the $P'_{BWP,i}P'_{BWP,i}$ value may be configured with a single value indicated by the higher layer parameter bundleSize.

(i) When a UE is configured with nominal RBG size P=2 for a specific bandwidth part (BWP), or (ii) when a UE is configured with an interleaving unit of 2 for VRB-to-PRB mapping by the higher layer parameter vrb-ToPRB-Interleaver in PDSCH-Config for a specific BWP, the UE may not be expected to be configured with $P'_{BWP,i}P'_{BWP,i}=4$.

TABLE 31

When receiving PDSCH scheduled by PDCCH with DCI format 1_1 with CRC scrambled by C-RNTI, MCS-C-RNTI, or CS-RNTI, if the higher layer parameter prb-BundlingType is set to 'dynamicBundling', the higher layer parameters bundleSizeSet1 and bundleSizeSet2 configure two sets of $P'_{BWP,i}$ values, the first set cm take one or two $P'_{BWP,i}$ values among {2, 4, wideband}, and the second set can take one $P'_{BWP,i}$ value among {2, 4, wideband}.
If the PRB bundling size indicator signalled in DCL format 1_1 as defined TS 38.212,
   is set to '0', the UE shall use the $P'_{BWP,i}$ value from the second set of $P'_{BWP,i}$ values when receiving
   PDSCH scheduled by the same DCI.
   is set to '1' and one value is configured for the first set of $P'_{BWP,i}$ values, the UE shall use this $P'_{BWP,i}$
   value when receiving PDSCH scheduled by the same DCI
   is set to '1' and two values are configured for the first set of $P'_{BWP,i}$ values as 'n2-wideband'
   (corresponding to two $P'_{BWP,i}$ values 2 and wideband) or 'n4-wideband' (corresponding to two $P'_{BWP,i}$
   values 4 and wideband) the UE shall use the value when receiving PDSCH scheduled by the same DCI
   as follows:
      If the scheduled PRBs are contiguous and the size of the scheduled PRBs is larger than $N_{BWP,i}^{size}/2$,
      $P'_{BWP,i}$ is the same as the scheduled bandwidth, otherwise $P'_{BWP,i}$ is set to the remaining configured
      value of 2 or 4, respectively.
When receiving PDSCH scheduled by PDCCH with DCI format 1_1 with CRC scrambled by C-RNTI. MCS-C-RNTI, or CS-RNTI, if the higher layer parameter prb-BundlingType is set to 'staticBundling', the $P'_{BWP,i}$ value is configured with the single value indicated by the higher layer parameter bundleSize.
When a UE is configured with nominal RBG size P =2 for bandwidth part i. or when a UE is configured with interleaving unit of 2 for VRB to PRB mapping provided by the higher layer parameter vrb-ToPRB-Interleaver given by PDSCH-Config for bandwidth part i, the UE is not expected to be configured with $P'_{BWP,i}$ = 4.

When the PRB bundling is in a wideband, the UE may improve the channel estimation performance. That is, when all the RBs are adjacent, the UE may improve the channel estimation and lower the related UE complexity. Accordingly, based on the PRB bundling being set to wideband, the UE may expect localized PRGs. Alternatively, based on the PRB bundling being set to 2 or 4 instead of wideband, the UE may expect interleaved PRGs.

5.3.2. Method for Allocating RBs for Localized PRGs or Interleaved PRGs Dynamically

5.3.2.1. First RB Allocation Method

A UE configured with the PDSCH-rep-mode may determine the frequency position and/or BW at which each CW is transmitted, based on the frequency domain resource assignment (FRA), and/or the NDI of the second TB, and/or the RV of the second TB, and/or the MCS field(s) of the second TB.

In the following disclosure, unless otherwise stated, it may be assumed for simplicity that the size of the PRG and the size of the RBG are the same. Alternatively, depending on the application example, the operations described below may be applied even in the case where the size of the PRG is different from the size of the RBG.

In a first example, it is assumed that the BS allocates 16 RBGs to the UE through the FRA. In this case, it is assumed that both the RBG and PRG sizes are 4.

In this case, when "localized PRGs" are indicated/configured to the UE by the BS, the two CWs may be transmitted on the upper 8 RBGs and the lower 8 RBGs on a frequency basis, respectively. In this case, the UE may determine whether CW #0 is transmitted on the upper 8 RBGs or the lower 8 RBGs, based on the NDI, and/or RV, and/or MCS of the second TB. CW #1 may be transmitted on other RBGs on which CW #0 is not transmitted.

Figure 24:
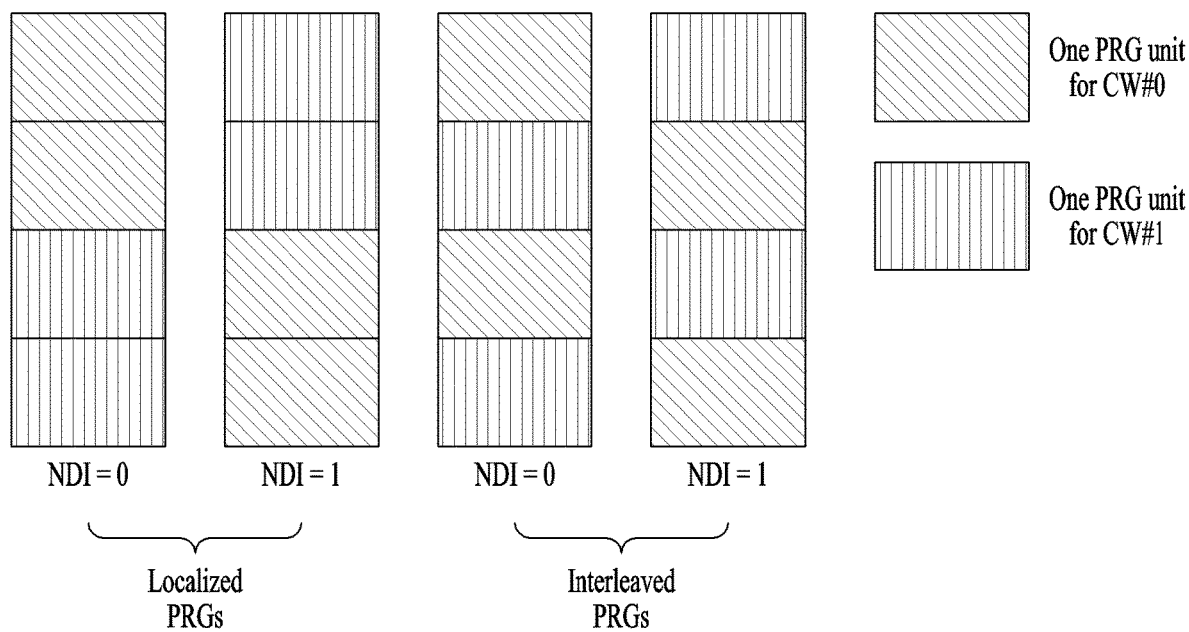
FIGS. 24 to 28 are diagrams illustrating examples of PRGs for respective codewords according to the present disclosure.

FIG. 24 is a diagram illustrating an example of a PRG for each codeword according to the present disclosure.

The left part (localized PRGs) of FIG. 24 shows the positions of RBGs included in the localized PRG through which CW #0/#1 is transmitted according to the values of NDI. The right part (interleaved PRGs) of FIG. 24 shows the positions of RBGs included in the interleaved PRG through which CW #0/#1 is transmitted according to the values of NDI.

As shown in FIG. 24, as a resource unit in which CW is interleaved (or alternated), not only the PRG but also the RBG may be applied. As a specific example, when RBG is applied as the resource unit, and the RBG and PRG sizes are 4 and 2, respectively, the interleaved RB unit may be 4 RBs. For reference, FIG. 24 shows a structure in which RBG-wise or PRG-wise interleaving is performed.

In a second example, it is assumed that the BS allocates 17 RBGs to the UE through the FRA.

In this case, it is difficult to divide the 17 RBGs into exactly two groups. Accordingly, a specific CW may be transmitted/received through a resource having one more RBG than the other CW.

In this case, a resource having one more RBG may be allocated to a CW having a higher MCS than the other CW. In this case, more coding bits may be transmitted/received than in the opposite case (e.g., a case where a resource having one more RBG is allocated to the CW having a lower MCS than the other CW.

Accordingly, according to the second example of the present disclosure, 9 RBGs may be allocated to a CW having a higher MCS, and 8 RBGs may be allocated to a CW having a (relatively) low MCS.

Figure 25:
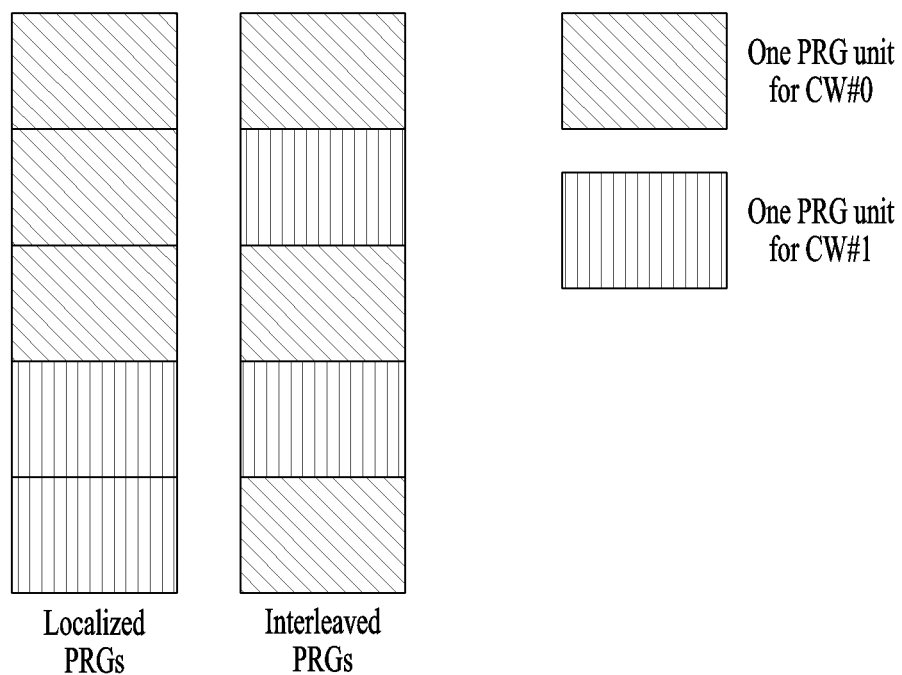

FIG. 25 is a diagram illustrating another example of a PRG for each codeword according to the present disclosure.

In FIG. 25, it is assumed that 5 PRGs are indicated/allocated to the UE, and that the MCS of CW #1 is higher than the MCS of CW #0. Unlike the example of FIG. 25, when the MCSs of the two CWs are the same, more RBGs may be allocated to CW #0 (or CW #1).

In a third example, as a method for minimizing retransmissions when blockage occurs in one of two TRPs, each CW may be configured to be self-decodable. For a CW having a low MCS, the number of coding bits that may be transmitted may be smaller than that for a CW having a high MCS. Accordingly, from the viewpoint that each CW must be self-decodable, an additional RB may be allocated to a CW having a lower MCS to transmit coding bits.

To this end, 8 RBGs may be allocated for a CW having a higher MCS, and 9 RBGs may be allocated for a lower CW.

Figure 26:
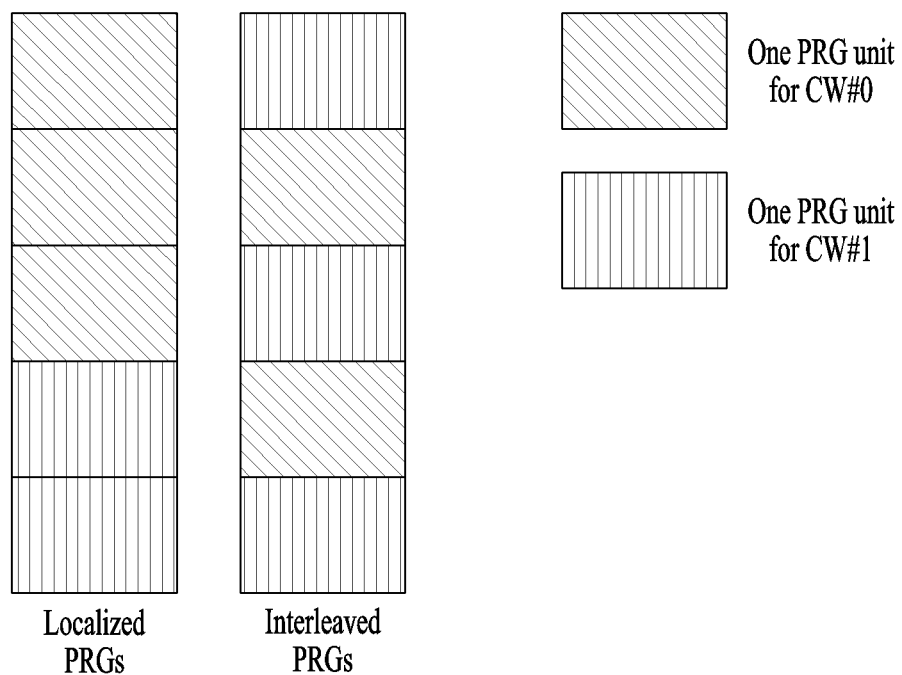

FIG. 26 is a diagram illustrating another example of a PRG for each codeword according to the present disclosure.

In FIG. 26, it is assumed that 5 PRGs are indicated/allocated to the UE, and that the MCS of CW #1 is higher than the MCS of CW #0. Unlike the example of FIG. 26, when the MCSs of the two CWs are the same, more RBGs may be allocated to CW #0 (or CW #1).

According to a fourth example, in the 'interleaved PRGs' of the second/third example described above, a CW to which a relatively large number of RBGs are allocated may be signaled based on the method proposed in the first example (e.g., the signaling method based on the value of the NDI (and/or RV) field of TB #2). As an example, the CW to which a relatively large number of RBGs are allocated may be signaled by signaling a CW to be positioned at the top (in the frequency domain) according to the method proposed in the first example.

Figure 27:
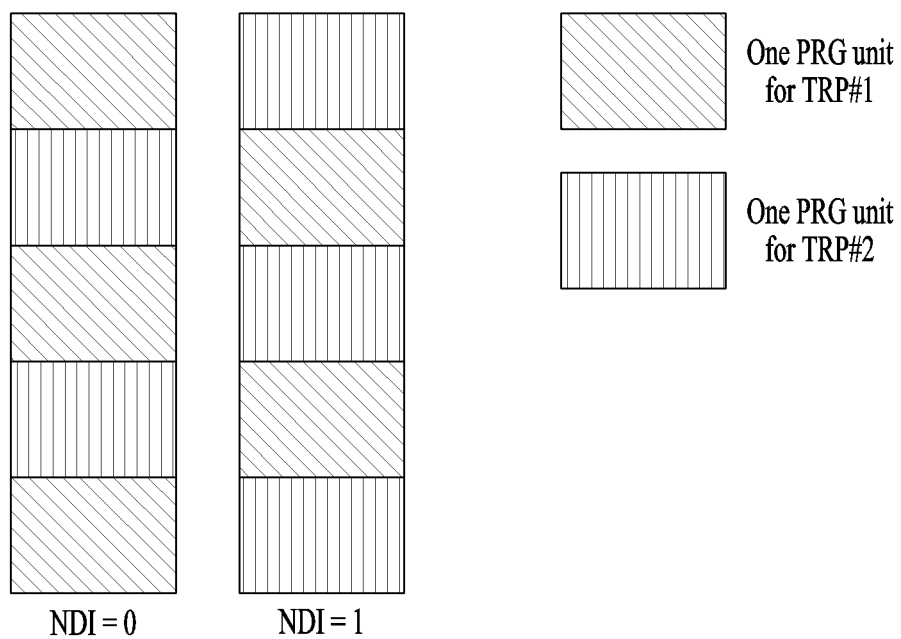

FIG. 27 is a diagram illustrating another example of a PRG for each codeword according to the present disclosure.

According to the example shown in FIG. 27, in the case of the interleaved PRGs, an implicit rule based on MCS does not need to be separately defined unlike in the second/third examples described above.

According to the various examples described above, two CWs may be transmitted from different TRPs, respectively. In this case, the preferred RB position may differ between the TRPs according to the channel gain or multiplexing with other UEs. In this case, according to the above-described examples, the BS may dynamically configure/indicate, to the UE, the RB/RBG/PRG position at which the CW is transmitted through each TRP. As a result, according to the above-described examples, system throughput may be improved.

Additionally, in the first example described above, based on the NDI having the value of 0, the position of the frequency resource (e.g., the position of the PRG or RGB having the highest index) for CW #0 may be determined to be higher (or greater) than the position of the frequency resource (e.g., the position of the PRG or RGB having the highest index) for CW #1. Alternatively, based on the NDI having the value of 0, the position of the frequency resource (e.g., the position of the PRG or RGB having the highest index) for CW #0 may be determined to be lower (or less) than the position of the frequency resource (e.g., the position of the PRG or RGB having the highest index) for CW #1.

In the second/third examples described above, the RBG and PRG sizes may be 4 and 2, respectively, and one RBG may be divided into two PRGs. In this case, the two CWs may be assigned the same number (or the same size) of BWs.

Figure 28:
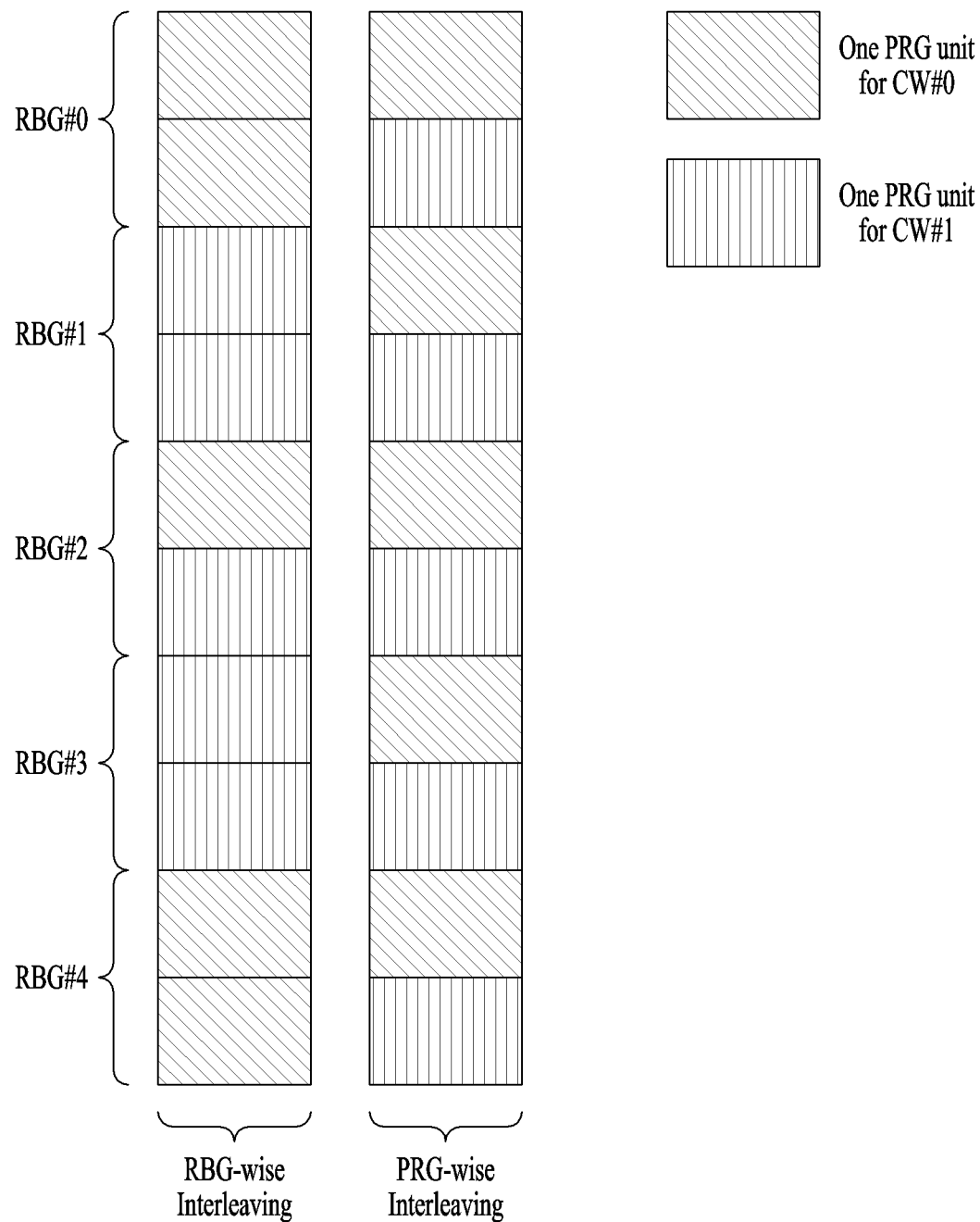

FIG. 28 is a diagram illustrating another example of a PRG for each codeword according to the present disclosure.

In FIG. 28, the first part (RBG-wise Interleaving) shows a PRG configuration for each codeword when NDI=0, 5 RBGs are allocated to a UE, and different CWs are transmitted in RBG units. As shown in FIG. 28, by dividing RBG #2 into two parts, the two CWs may have the same BW.

In FIG. 28, the second part (PRG-wise Interleaving) shows a PRG configuration for each codeword when different CWs are transmitted in PRG units.

The second example and the third example described above may be exclusive to each other. Accordingly, RBG allocation according to MCS may be determined based on higher layer signaling (e.g., RRC, MAC-CE) or DCI. For example, when RBG allocation is determined by DCI, the RGB distribution configuration may be determined based the NDI of the second TB, and/or the RV of the second TB, and/or the MCS field of the second TB.

5.3.2.2. Second RB Allocation Method

A UE configured with the PDSCH-rep-mode may (i) determine a (single) primary frequency position based on the FRA field, and (ii) determine two secondary frequency positions at which two CWs are to be transmitted based on the NDI of the second TB, and/or the RV of the second TB, and/or the MCS field of the second TB based on the primary frequency position.

For operation according to the present disclosure, a downlink resource allocation method defined by the following tables may be applied. However, the following is merely one downlink resource allocation method applicable to the present disclosure, and a different downlink resource allocation method may be applied for the operation according to the present disclosure.

TABLE 32

5.1.2.2.2 Downlink resource allocation type 1

In downlink resource allocation of type 1, the resource block assignment information indicates to a scheduled UE a set of contiguously allocated non-interleaved or interleaved virtual resource blocks within the active bandwidth part of size $N_{BWP}^{size}$ PRBs except for the case when DCI format 1_0 is decoded in any common search space in which case the size of CORESET 0 shall be used.

A downlink type 1 resource allocation field consists of a resource indication value (RIV) corresponding to a starting virtual resource block ($RB_{start}$) and a length in terms of contiguously allocated resource blocks $L_{RBs}$. The resource indication value is defined by if $(L_{RBs} - 1) \leq \lfloor N_{BWP}^{size}/2 \rfloor$ then $RIV = N_{BWP}^{size}(L_{RBs} - 1) + RB_{start}$ else $RIV = N_{BWP}^{size}(N_{BWP}^{size} - L_{RBs} + 1) + ((N_{BWP}^{size} - 1 - RB_{start})$ where $L_{RBs} \geq 1$ and shall not exceed $N_{BWP}^{size} - RB_{start}$.

TABLE 33

When the DCI size for DCI format 1_0 in USS is derived from the size of CORESET 0 but applied to another active BWP with size of $N_{BWP}^{active}$, a downlink type 1 resource block assignment field consists of a resource indication value
(RIV) corresponding to a starting resource block $N_{RB}$ and a length in terms of virtually contiguously allocated resource blocks $L_{RBs} = K, 2 \cdot K, \ldots, N_{BWP}^{initial} \cdot K$.
The resource indication value is defined by:
   if $(L_{RBs}' - 1) \leq \lfloor N_{BWP}^{initial}/2 \rfloor$ then
     1. $RIV = N_{BWP}^{initial} (L_{RBs}' - 1) + RB_{start}'$
   else
     2. $RIV = N_{BWP}^{initial} (N_{BWP}^{initial} - L_{RBs}' + 1) + (N_{BWP}^{initial} - 1 - RB_{start}')$ where $L'_{RBs} = \frac{L_{RBs}}{K}$, $RB'_{start} = \frac{RB_{start}}{K}$ and where $L'_{RBs}$ shall not exceed $N_{BWP}^{initial} - RB'_{start}$.

If $N_{BWP}^{active} > N_{BWP}^{initial}$, K is the maximum value from set {1, 2, 4, 8} which satisfies $K \leq \lfloor N_{BWP}^{active} / N_{BWP}^{initial} \rfloor$; otherwise $K = 1$.

In the first example, when the above-described downlink resource allocation type 1 is applied, the UE may first determine the primary frequency position based on the same/similar method as in conventional cases. In addition, the UE may determine two secondary frequency positions at which two CWs are to be transmitted with respect to the intermediate point of the primary frequency BW, based on the RV of the second TB.

In the present disclosure, the intermediate point of the primary frequency position may satisfy the equation given below. In the equation below, $N_{BW}$, RV, and P may denote the BW at the primary frequency position, an RV value of the second TB, and a PRG size. In the equation below, K may be 1, or may be indicated/configured based on the BW at the primary frequency position or higher layer signaling. Additionally, for simplicity, an operation of utilizing the RV value for the second TB will be described above. However, the operation may be extended to an operation of utilizing at least one of the RV and/or MCS and/or NDI fields of the second TB according to an embodiment.

$$\min\left(\left\lfloor \frac{N_{BW}}{2} \right\rfloor + KP \times (RV - 1), N_{BW} - 1\right) \quad \text{[Equation 10]}$$

$$\min\left(\left\lfloor \frac{N_{BW}}{2} \right\rfloor + KP \times (RV - 1), N_{BW} - 1\right)$$

Figure 29:
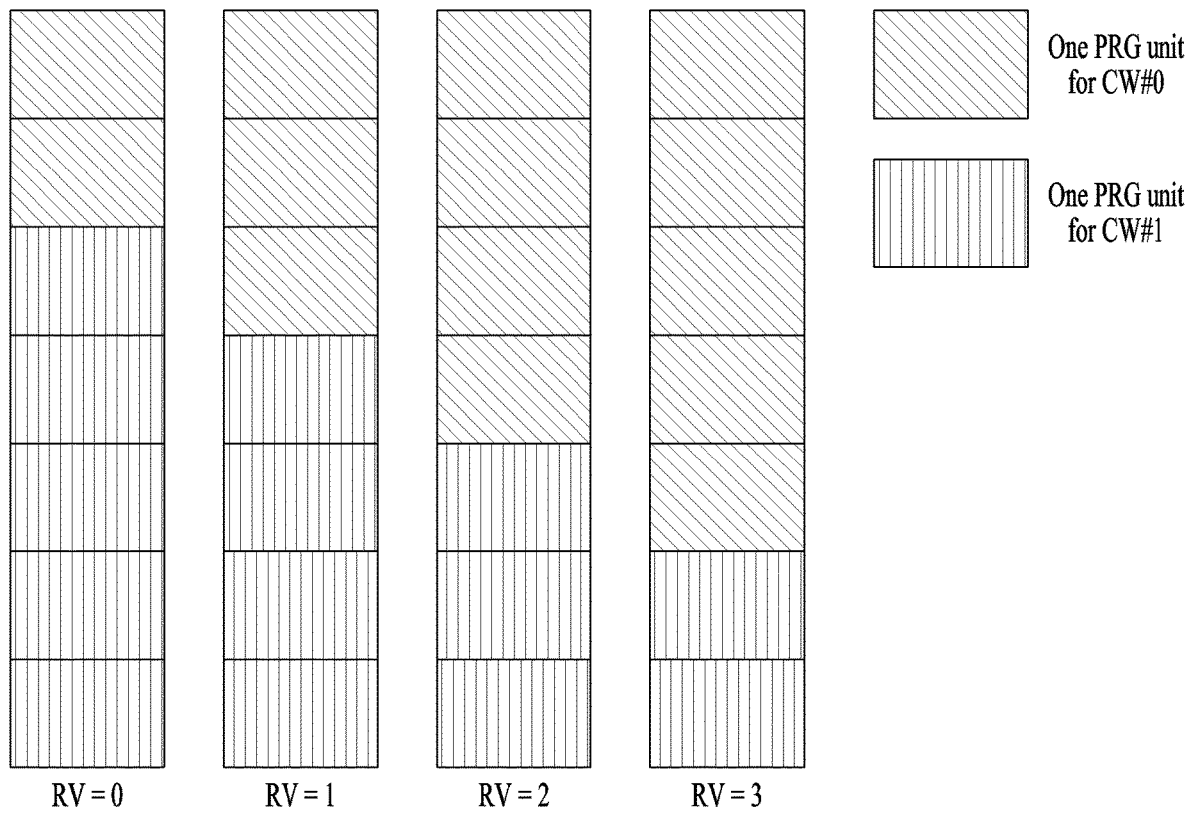
FIGS. 29 to 31 are diagrams illustrating examples of PRGs for respective codewords based on an RV value according to the present disclosure.

FIG. 29 is a diagram illustrating an example of a PRG for each codeword based on an RV value according to the present disclosure.

As illustrated in FIG. 29, when the number of PRGs is 7, frequency resource positions and BWs for CW #0 and CW #1 may be determined based on the above equation. In this operation, it is assumed that the value of K is set to 1. However, another value of K may be set/indicated according to embodiments.

Figure 30:
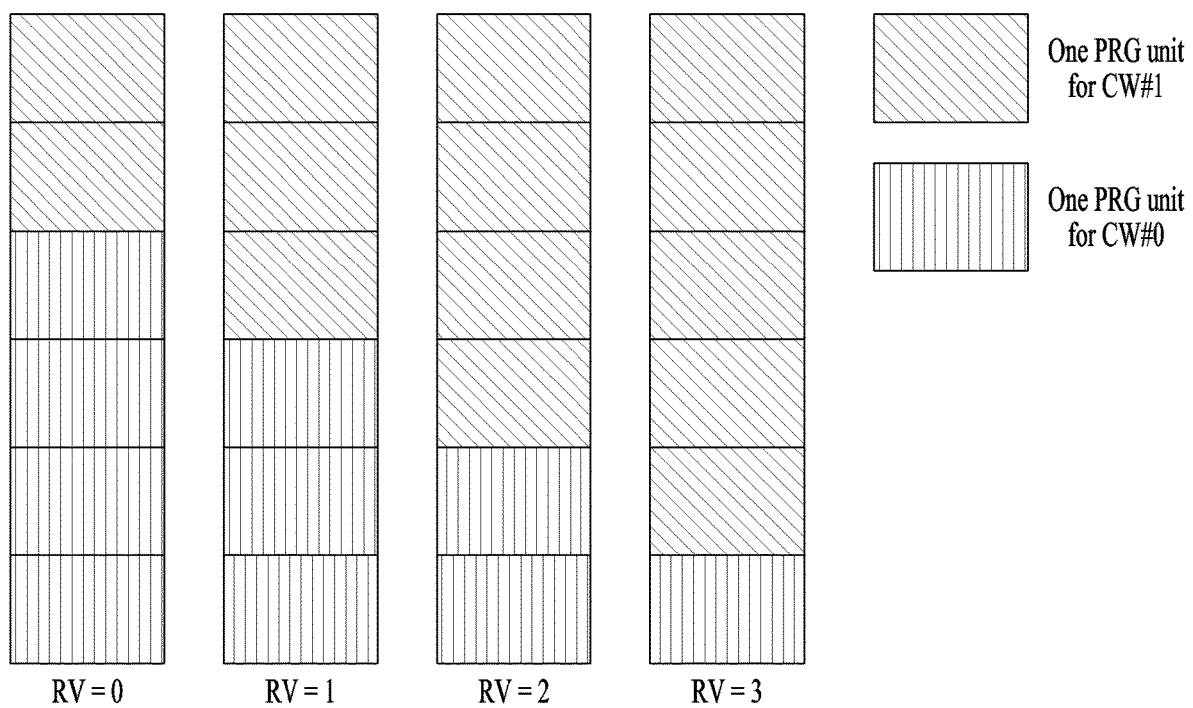

FIG. 30 is a diagram illustrating another example of a PRG for each codeword based on an RV value according to the present disclosure.

As illustrated in FIG. 30, when the number of PRGs is 6, whether to switch the frequency resource positions for CW #0 and CW #1 may be determined based on the value of NDI.

Figure 31:
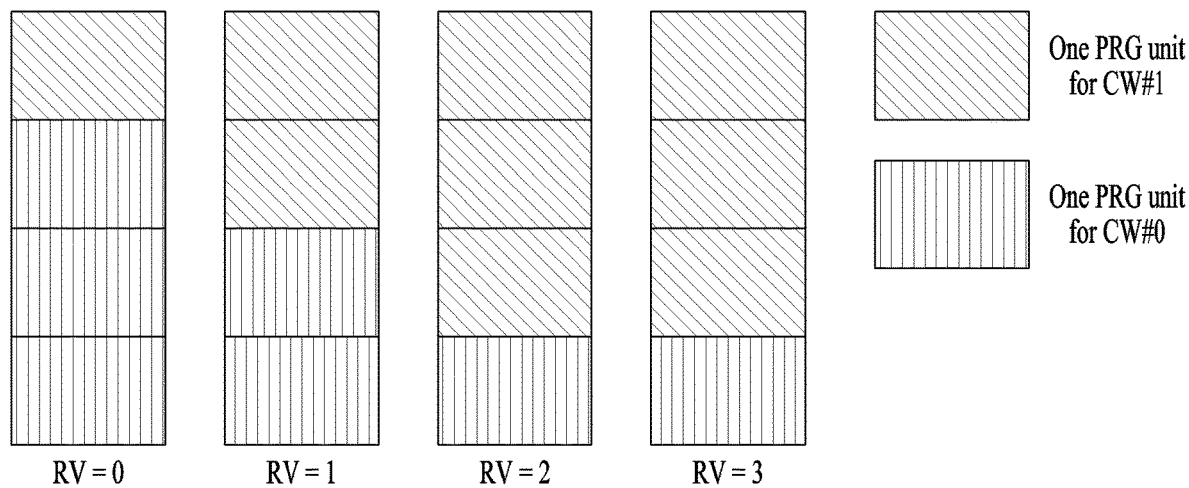

FIG. 31 is a diagram illustrating another example of a PRG for each codeword based on an RV value according to the present disclosure.

According to the example of FIG. 31, the PRG configuration for each codeword given when the RV value is 2 may be the same as that given when the RV value is 3.

When K=1, if the number of PRGs is small, the difference in BW occupied by CW #0 and CW #1 may be set large according to the RV value. On the other hand, when the number of PRGs is large, the difference in BW occupied by each codeword may be set large. Thus, the value of K may be determined based on the BW and/or the number of PRGs. As an example, the value of K may be determined based on the total number of PRGs as shown in the table below. In the present disclosure, the details in the following table are merely an example, and the value of K may be determined based on criteria/rules different from those is the following table.

TABLE 34

| PRG | K |
|---|---|
| PRG < 16 | 1 |
| 16 <= PRG < 32 | 2 |
| 32 <= PRG < 64 | 4 |

5.3.3. Method for Allocating Slots for TDM PRGs Dynamically

A UE configured with the PDSCH-rep-mode may determine the position of a slot/symbol in which the UE is to receive CW #1 after receiving CW #0 based on the NDI of the second TB, and/or the RV of the second TB, and/or the MCS field of the second TB defined in DCI.

In the present disclosure, for example, a TDMed PRG mode may be configured for the UE by the BS based on higher layer signaling and/or DCI. In other words, the UE for which the TDMed PRG mode is configured by the BS set may perform an operation described later.

Figure 32:
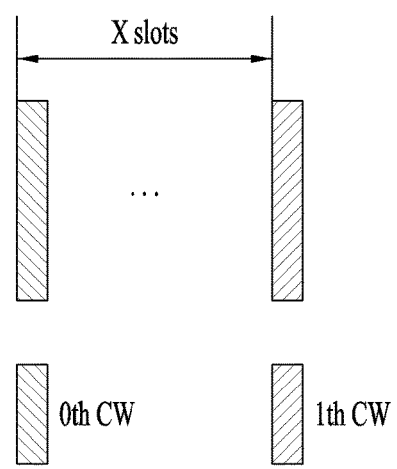
FIG. 32 is a diagram illustrating an example of slot allocation for each codeword applicable to the present disclosure.

FIG. 32 is a diagram illustrating an example of slot allocation for each codeword applicable to the present disclosure.

According to FIG. 32, a UE (e.g., a UE for which a TDMed PRG mode is configured based on higher layer signaling and/or DCI) may receive the 0-th CW, and then receive the 1st CW after X slots.

In the present disclosure, X may be determined by (i) preconfiguring one or more values by higher layer signaling (e.g., RRC, MAC-CE), and (ii) selecting one of the configured values by DCI.

As an example for this operation, at least one of the NDI field of the second TB, and/or the RV field of the second TB, and/or the MCS field of the second TB in the DCI may be used. For example, {2, 4, 8, 16} may be preconfigured by higher layer signaling (e.g., RRC), and 2 may be indicated/selected through the DCI. In this case, the size of the DCI field used may be (variably) set based on the number of candidates configured by higher layer signaling.

Additionally, in the present disclosure, the UE may expect the frequency positions of CW #0 and CW #1 to be the same (for reduction of operation complexity).

5.3.4. UE Behaviors Related to PT-RS

In the present disclosure, a signal for estimating phase noise is referred to as a phase tracking reference signal (PT-RS).

Basically, when the higher layer parameter phaseTrackingRS is configured in the higher layer parameter DMRS-DownlinkConfig (or the higher layer parameter DMRS-UplinkConfig), the UE may receive the PT-RS, assuming that the PT-RS is present. However, if (i) the layer parameter phaseTrackingRS is not configured, or (ii) the higher layer parameter phaseTrackingRS is configured, but a certain condition (e.g., i) the scheduled modulation and coding scheme (MCS) is lower than a certain level, or ii) the number of scheduled RBs is less than a certain value, or iii) the related random network temporary identifier (RNTI) is RA-RNTI (Random Access RNTI), system information RNTI (SI-RNTI), or paging RNTI (P-RNTI)) is satisfied, the UE may assume that the PT-RS is not present.

Regarding the UL PT-RS, a specific UL PT-RS transmission method for the UE may depend on whether transform precoding is enabled/disabled. However, in any cases, the UL PT-RS may be transmitted only within a resource block for the PUSCH. Specifically, when transform precoding is disabled, the UL PT-RS may be mapped to subcarriers for the DMRS port related to the PT-RS port, and may be mapped to some of the resource blocks allocated for PUSCH transmission based on the frequency density, which will be described below.

Regarding the DL PT-RS, the DL PT-RS may be transmitted only within a resource block for the PDSCH, and may be mapped to subcarriers for the DMRS port related to the PT-RS port, and may be mapped to some of the resource blocks allocated for PDSCH transmission based on the frequency density described below.

Figure 33:
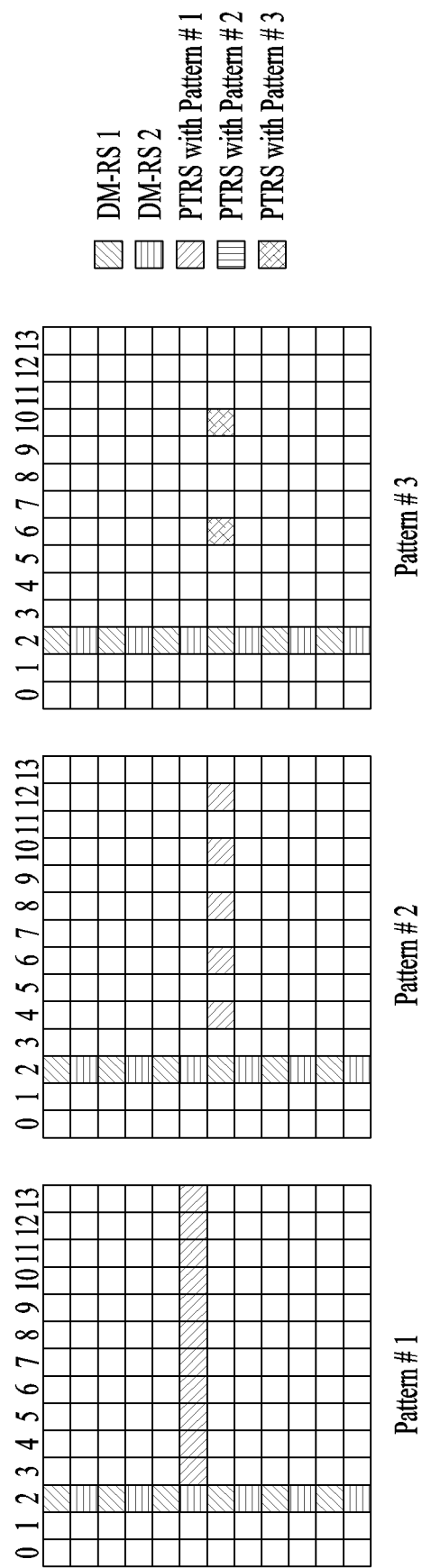
FIG. 33 is a diagram illustrating a time domain pattern of a PT-RS applicable to the present disclosure.

FIG. 33 is a diagram illustrating a time domain pattern of a PT-RS applicable to the present disclosure.

As shown in FIG. 33, the PT-RS may have a different (time) pattern according to the applied MCS level.

TABLE 35

| Scheduled MCS | Time density ($L_{PT-RS}$) |
| --- | --- |
| IMCS < ptrs-$MCS_1$ | PT-RS is not present |
| ptrs-MCS1 ≤ IMCS < ptrs-MCS2 | 4 |
| ptrs-MCS2 ≤ IMCS < ptrs-MCS3 | 2 |
| ptrs-MCS3 ≤ IMCS < ptrs-MCS4 | 1 |

Here, time density 1 may correspond to Pattern #1 of FIG. 33, time density 2 may correspond to Pattern #2 of FIG. 33, and time density 4 may correspond to Pattern #3 of FIG. 33.

Parameters ptrs-MCS1, ptrs-MCS2, ptrs-MCS3, and ptrs-MCS4 constituting Table 35 may be defined by higher layer signaling.

The PT-RS according to the present disclosure may be mapped to and transmitted on 1 subcarrier for every 1 RB, 1 subcarrier for every 2 RBs, or 1 subcarrier for every 4 RBs. In this case, the frequency domain pattern (or frequency density) of the PT-RS as described above may be configured according to the size of the scheduled bandwidth.

TABLE 36

| Scheduled bandwidth | Frequency density ($K_{PT-RS}$) |
| --- | --- |
| $N_{RB} < N_{RB0}$ | PT-RS is not present |
| $N_{RB0} \leq N_{RB} < N_{RB1}$ | 2 |
| $N_{RB1} \leq N_{RB}$ | 4 |

Here, frequency density 2 may correspond to a frequency domain pattern in which the PT-RS is mapped to and transmitted on one subcarrier for every two RBs, and frequency density 4 may correspond to a frequency domain pattern in which the PT-RS is mapped to and transmitted on one subcarrier for every four RBs.

In the configuration above, $N_{RB0}$ and $N_{RB1}$, which are reference values of the scheduled bandwidth for determining the frequency density, may be defined by higher layer signaling.

Based on the PT-RS as described above, the UE may operate as follows.

A UE configured with the PDSCH-rep-mode may determine the frequency position of the PT-RS for each CW based on the RBs through which the respective CWs are transmitted, based on (i) the indication/configuration that the two CWs are transmitted at different resources or (ii) the indication/configuration that the two CWs are transmitted at some resources in an overlapping manner.

The above-described configurations may be applied not only to the UE for which the PDSCH-rep-mode is configured, but also to UEs for which the mode is not configured. That is, irrespective of the PDSCH-rep-mode configuration, when it is indicated/configured to the UE by the BS that two CWs are transmitted at different resources, the UE may determine the frequency position of the PT-RS for each CW based on the RBs in which each CW is transmitted.

For reference, the resource position (in particular, the frequency position) at which the DL PT-RS is transmitted and received may be determined based on the table below.

TABLE 37

Table 7.4.1.2.2-1: The parameter $k_{ref}^{RE}$.

| DM-RS antenna port p | $k_{ref}^{RE}$ | | | | | | | |
|---|---|---|---|---|---|---|---|---|
| | DM-RS Configuration type 1 resourceElementOffset | | | | DM-RS Configuration type 2 resourceElementOffset | | | |
| | offset00 | offset01 | offset10 | offset11 | offset00 | offset01 | offset10 | offset11 |
| 1000 | 0 | 2 | 6 | 8 | 0 | 1 | 6 | 7 |
| 1001 | 2 | 4 | 8 | 10 | 1 | 6 | 7 | 0 |
| 1002 | 1 | 3 | 7 | 9 | 2 | 3 | 8 | 9 |
| 1003 | 3 | 5 | 9 | 11 | 3 | 8 | 9 | 2 |
| 1004 | — | — | — | — | 4 | 5 | 10 | 11 |
| 1005 | — | — | — | — | 5 | 10 | 11 | 4 |

For the purpose of PT-RS mapping, the resource blocks allocated for PDSCH transmission are numbered from 0 to $N_{RB}-1$ from the lowest scheduled resource block to the highest. The corresponding subcarriers in this set of resource blocks are numbered in increasing order starting from the lowest frequency from 0 to $N_{sc}^{RB} N_{RB}-1$. The subcarriers to which the UE shall assume the PT-RS is mapped are given by $$N_{sc}^{RB} N_{RB}-1$$

where
i=0,1,2,
$k_{ref}^{RE}$ is given by Table 7.4.1.2.2-1 for the DM-RS port associated with the PT-RS port according to TS 38.214. If the higher-layer parameter resourceElementOffset in the PTRS-DownlinkConfig IE is not configured, the column corresponding to 'offset00' shall be used.
$n_{RNTI}$ is the RNTI associated with the DCI scheduling the transmission
$N_{RB}$ is the number of resource blocks scheduled
$K_{PT-RS} \in \{2,4\}$ is given by TS 38.214.

In the present disclosure, it may be assumed that TRPs #1 and #2 transmit CWs #0 and #1, respectively. In this case, when the BS indicates/configures to the UE that the (maximum) number of PT-RS ports is 2, TRPs #1 and #2 may each transmit PT-RS to the UE.

In this case, when the RB position at which the PT-RS is transmitted is determined based on the RBs allocated to the UE, a specific TRP may fail to transmit the PT-RS or the frequency density of the PT-RS may be lowered. As a result, the performance of estimating the common phase error (CPE) based on a signal received from the TRP by the UE may be degraded.

Figure 34:
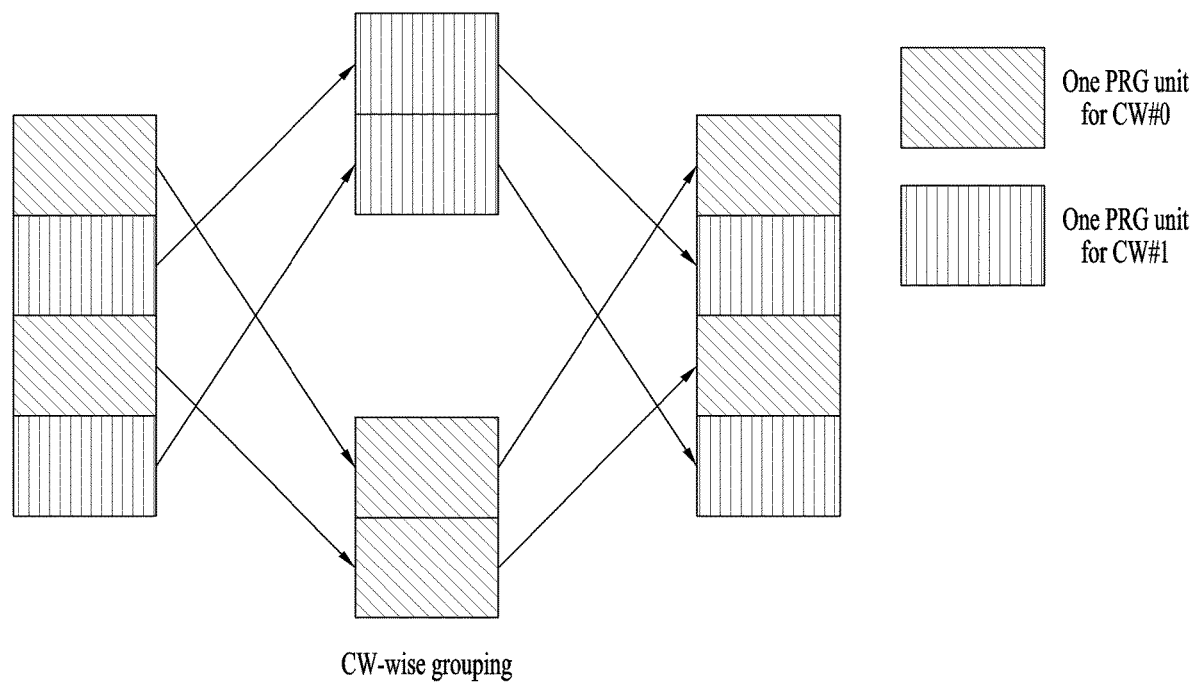
FIG. 34 is a diagram illustrating another example of a PRG for each codeword according to the present disclosure.

FIG. 34 is a diagram illustrating another example of a PRG for each codeword according to the present disclosure.

In FIG. 34, when the PRG size is 2 and the PT-RS frequency density is 4, a specific TRP (e.g., TRP #2) may fail to transmit the PT-RS. To address this issue, the RB position of the PT-RS for TRP #1 may be determined based on the RBs allocated to TRP #1 (or the RBs through which CW #1 is transmitted). Similarly, the RB position of the PT-RS for TRP #2 may be determined based on the RBs allocated to TRP #2 (or the RBs through which CW #1 is transmitted). To this end, the N RBs allocated to each TRP may be (re)indexed from 0 to N-1, and an RB through which the PT-RS is transmitted may be determined from among the N RBs based on the method described above.

The first part (e.g., the leftmost block) and the second part (e.g., the second block from the left) of FIG. 34 illustrate configuration of CW-wise grouping of PRGs (or RBGs) indicated/configured to the UE. The UE may determine the frequency position of the PT-RS within each group based on the existing method for determining the PT-RS frequency position. The second part (e.g., the second block from the left) and the third part (e.g., the third blocks from the left) of FIG. 34 illustrate recovering the original positions of PRGs (or RBGs).

5.3.5. Method for Indicating DMRS Ports of a Specific Codeword (e.g., CW #1) Dynamically 5.3.5.1. First DMRS Port Indication Method When two CWs indicated by DCI are transmitted at different resources (or the two CWs are transmitted at the same resource or partially overlapping resources), a UE configured with the PDSCH-rep-mode may determine the DMRS ports related to (or associated with) the respective CWs based on higher layer signaling (e.g., RRC, MAC-CE, etc.) and/or the DCI.

As a specific example, the DMRS port(s) for CW #0 may be configured/determined based on a first field (e.g., a field related to antenna port(s)) of the DCI, and the DMRS port(s) for CW #1 may be configured/determined based on a second field (e.g., at least one of the antenna port(s) related field, and/or the NDI field of TB #2, and/or the MCS field (of TB #2), and/or the RV field (of TB #2)) of the DCI. As another example, DMRS ports information for CW #0 and CW #1 may be joint-encoded and configured/determined based on a specific field of the DCI. As an example, the DMRS ports information for CW #0 and CW #1 may be configured/determined based on at least one of the antenna port(s) related field, and/or the NDI field of TB #2, and/or the MCS field of (TB #2), and/or the RV field (TB #2).

In this case, when the UE refers to the MCS table, the UE may expect that only one codeword is enabled even if two CWs are enabled.

All the embodiments described in section 5.3.5 are not limited to the UE for which the PDSCH-rep-mode is configured, and may be extended irrespective of whether the mode is configured. For example, the UE may operate based on all the embodiments described in section 5.3.5 regardless of the PDSCH-rep-mode configuration for the UE even if a TCI state or a plurality of TCI states including a plurality of RS sets is configured/indicated to the UE.

Figure 35:
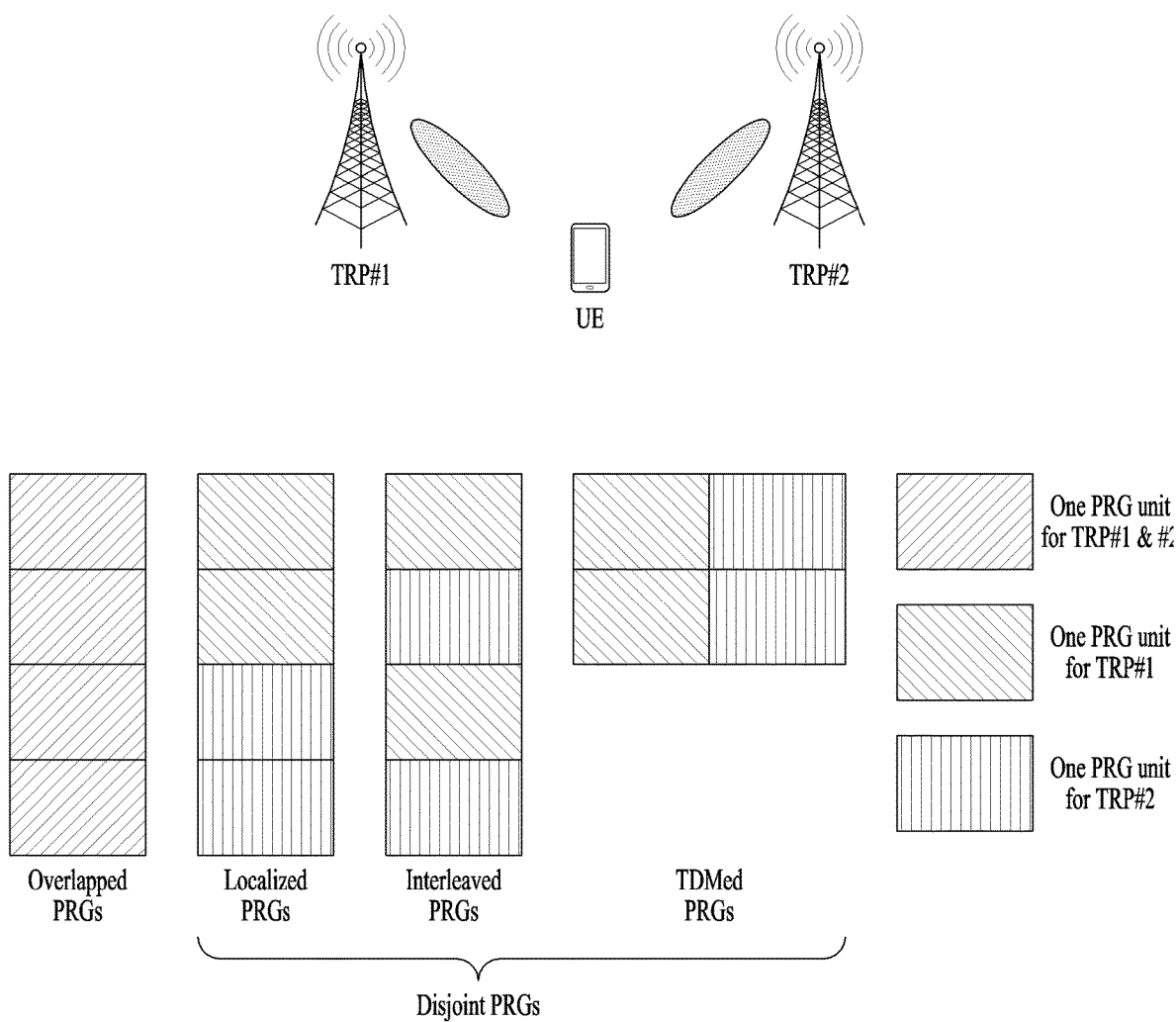
FIG. 35 is a diagram illustrating an example of a PRG configuration for each TRP according to the present disclosure.

FIG. 35 is a diagram illustrating an example of a PRG configuration for each TRP according to the present disclosure.

In FIG. 35, in the case of disjoint PRGs, two CWs may share some DMRS port indexes unlike in the case of overlapped PRGs. Further, the number of DMRS ports (e.g., # of layers) may be set to be the same or different between the CWs.

Accordingly, the operation of classifying the indicated DMRS ports for each CW based on the mapping method defined in the conventional standard (e.g., CW2layer mapping rule) may be inappropriate.

Therefore, according to the present disclosure, the BS needs to indicate, to the UE, separate DMRS ports for each of CW #0 and CW #1. In addition, according to the UE behavior based on the conventional MCS table, when the number of CWs is 2, the UE uses a mapping method defined in the conventional standard (e.g., CW2layer mapping rule). Therefore, according to the present disclosure, the UE may no longer use the operation. Accordingly, according to the present disclosure, even when two CWs are enabled, the UE may interpret the MCS table, assuming that only one codeword is enabled.

According to a first example, DMRS ports for CW #0 may be determined based on an antenna port(s) related field. In addition, DMRS ports for CW #1 may be determined based on 3 bits of least significant bits (LSB) of the MCS for TB #2 and 2 bits of the RV for TB #2. According to this example, 5 bits for indicating the DMRS ports for CW #1 may be supported. Accordingly, according to the above example, most of the DMRS table (e.g., Tables 14 to 16) may be supported without adding a separate DCI field or changing the DMRS tables.

According to a second example, in the case where the BS is allowed to set/indicate the modulation order of a specific CW through the RV field in the first example, 5 bits of the MCS field may be used to configure/indicate DMRS ports for CW #1. In the case of Table 14, 4 bits are required, and thus the MSB 4 bits of the MCS may be used to configure/indicate the DMRS ports for CW #1. In the case of Tables 15 and 16, 5 bits are required, and thus all bit information of the MCS may be used to configure/indicate DMRS ports for CW #1.

According to a third example, the UE may operate as follows.

When TB #1 and TB #2 are enabled at the same time, a UE supporting the Rel-15 NR system may operate with reference to a column for 2 CWs in the DMRS table (e.g., Two Codewords: Codeword 0 enabled, Codeword 1 enabled). On the other hand, according to the first and second examples described above, even when two TBs are enabled at the same time, the UE may operate with reference to a column for 1 CW (e.g., One Codeword: Codeword 0 enabled, Codeword 1 disabled) in the DMRS table. As a result, when the operation is based on the current DMRS table, the first/second examples may not support rank 5 or higher.

Accordingly, in the third example, in order to address this issue, a column for 1 CW in the conventional DMRS table (e.g., One Codeword: Codeword 0 enabled, Codeword 1 disabled) may include information for DMRS ports of rank 5 or higher.

As an example, in the case of Table 15, value=31 in the column for 1 CW (e.g., One Codeword: Codeword 0 enabled, Codeword 1 disabled) may be defined to configure/indicate DMRS ports 0-4.

As another example, based on at least one of the antenna port(s) field, and/or the NDI field of TB #2, and/or the MCS field (of TB #2), and/or the RV field (of TB #2), the DMRS table referred to by CW #0 may be extended to more than 32 (e.g., 64) columns for 1 CW (e.g., One Codeword: Codeword 0 enabled, Codeword 1 disabled).

As another example, based on at least one of the NDI field of TB #2, and/or the MCS (of TB #2), and/or the RV of (TB #2), the BS may configure/indicate a column for 1 CW (e.g., One Codeword: Codeword 0 enabled, Codeword 1 disabled) or a column for 2 CWs (e.g., Two Codewords: Codeword 0 enabled, Codeword 1 enabled) referred to by the UE for CW #0 in the DMRS table.

According to the third example, CW #0 may substantially include two CWs. Similarly, CW #1 may substantially include two CWs.

However, these features may not conform to the principle or premise that CW #0 and CW #1 are generated from the same information sequence. In addition, considering CW #0-0/CW #0-1 from TRP #0 and CW #1-0/CW #1-1 from TRP #1 (where CW #0-0 and CW #1-0 may be generated from the same information sequence), the aforementioned configuration may be awkward.

Therefore, according to the third example, a configuration including CW #0/CW #1 from TRP #0 and CW #0'/CW #1' from TRP #1 rather than the above-described features may be natural. Accordingly, in the third example, the BS may schedule the PDSCH transmitted from each TRP using two DCIs.

In the above-described configurations, CW #0 and CW #1 may be swapped with each other. In other words, according to another embodiment, the features for CW #0 described above may be applied to CW #1, and the features for CW #1 described above may be applied to CW #0.

In the above-described configurations, the CW using the DMRS ports configured/indicated by the antenna port(s) field may be a CW associated with the DCI field (e.g., MCS, RV, NDI) used in determining the TB size. Further, the DMRS ports of the other CW may be determined based on at least one of the MCS field, and/or the RV field, and/or the NDI field of the other CW. For example, when the DCI field of TB #2 is used in determining the TB size, the DMRS ports of CW #1 may be determined based on the antenna port(s) field. And, the DMRS ports of CW #0 may be configured/indicated based on the MCS field (e.g., 5bits) of TB #1.

5.3.5.2. Second DMRS Port Indication Method

In the first DMRS port indication method described above, the UE may expect that the number of front-load symbols of CW #0 and CW #1 (e.g., # of front-load symbols) and/or the number of DMRS CDM groups without data (e.g., # of DMRS CDM group(s) without data) are equal to each other. To this end, the DMRS table referred to by the UE for CW #1 may be configured/indicated based on # of DMRS CDM group(s) without data for CW #0.

As an example, it is assumed that different TRPs each transmit a signal (or layer) to one UE on the same OFDM symbol. In this case, in order to lower the UE complexity and the BS scheduling complexity, the BS may limit (or configure) the number of front-load symbols and the number of DMRS CDM group(s) without data are the same between the two CWs. When the DMRS table referred to by the UE for CW #1 is designed based on this limitation, the number of bits required to indicate/configure the DMRS ports for CW #1 may be reduced.

More specifically, in Table 17, the column for 1 CW (e.g., One Codeword: Codeword 0 enabled, Codeword 1 disabled) may be divided into (i) value=0 to 23 (24 rows in total when the number of front-load symbols is 1) and (ii) value=24 to 57 (34 rows in total when the number of front-load symbols is 2), by the number of front-load symbols. Here, the case where the number of front-load symbols is 2 is modified to 32 rows (by, for example, deleting two rows out of the 34 rows), the BS may indicate/configure the DMRS pots of CW #1 using 5 bits.

Alternatively, when the number of front-load symbols as well as the number of DMRS CDM groups without data is the same, the maximum number of rows that the BS should classify through DCI may be set to 24 (e.g.: # of DMRS CDM group(s)=3, # of front-load symbols=2). In this case, the BS may indicate/configure the DMRS ports of a specific CW using the 5-bit information without modifying the existing DMRS table.

5.3.5.3. Third DMRS Port Indication Method

In the first DMRS port indication method described above, in the case where two CWs are transmitted at the same resource or partially overlapped resources, the UE may expect that the DMRS ports (or layers) belonging to CW #X (e.g., X=0 or 1) are included in one DMRS CDM group. In other words, the UE may not expect a configuration in which the DMRS ports (or layers) belonging to CW #X (e.g., X=0 or 1) are included in a plurality of different DMRS CDM groups. In addition, in the above case, the UE may expect only the case where the number of CDM groups is greater than or equal to 2.

Accordingly, according to the third DMRS port indication method of the present disclosure, the DMRS table referred to by the UE for CW #0 and/or CW #1 may be redesigned based on the above features.

The above-described configuration may be applied only to DMRS configuration type 1 in which the number of DMRS CDM groups is 2.

Alternatively, in the case of DMRS configuration type 2 in which the number of DMRS CDM groups is 3, the above-described configuration may be modified as follows. Specifically, in the first DMRS port indication method described above, the UE may expect that the DMRS CDM group to which the DMRS ports (or layers) of CW #0 belong is different from the DMRS CDM group to which the DMRS ports (or layers) of CW #1 belong. In addition, the UE may expect only the case where the number of CDM groups is greater than or equal to 2. Based on the above-described features, the DMRS table referred to by the UE for CW #0 and/or CW #1 may be redesigned.

Specifically, when two CWs are transmitted at the same resource or at some resources in an overlapping manner, the DMRS ports (or layers) of the two CWs should belong to different DMRS CDM groups, respectively. As an example, in Table 14, the BS cannot configure/indicate value=9 (DMRS ports=0-2), 10 (DMRS ports=0-3), and 11 (DMRS ports=0,2) to the UE for CW #0. In addition, in this case, two or more CDM groups are basically required. Accordingly, the UE may expect only the case where the number of CDM groups is greater than or equal to 2. When a DMRS table referred to by the UE for CW #0/#1 is designed based on the above-described features, the BS may reduce the number of required DCI bits.

In a first example, when the above-described features are applied to Table 14, the number of rows referred to by the UE for CW #0/#1 in the DMRS table may be reduced to 6 (e.g., value=3 to 8 in Table 14).

According to the first example, the BS may indicate/configure the DMRS ports for CW #0/#1 to the UE through a separate DCI field, respectively. As an example, the BS may (i) indicate/configure the DMRS ports of CW #0 based on the antenna port field, and (ii) indicate/configure the DMRS ports of CW #1 based on at least one of the RV field of TB #2, and/or the NDI field (of TB #2), and/or the MCS field (of TB #2).

In a second example, the DMRS ports referred to by the UE for CW #0/#1 may be joint-encoded together and may be defined as shown in the table below. In this case, when a limitation that CW #0 and CW #1 shall not use the same DMRS port index is applied, the number of rows in the table may be further reduced. As a result, the BS may additionally reduce the number of DCI bits required to represent each of the DMRS ports of the two CWs. The DMRS ports of the two CWs may be indicated based on at least one of the antenna port(s) field, and/or the NDI field of TB #2, and/or the RV field (of TB #2), and/or the MCS field (of TB #2).

TABLE 38

| Value | # of DMRS group without data | DMRS ports of CW#0 | DMRS ports of CW#1 |
|---|---|---|---|
| 0 | 2 | 0, 1 | 2 |
| 1 | 2 | 0 | 2, 3 |
| 2 | 2 | 0, 1 | 2, 3 |
| 3 | 2 | 0 | 2 |

Unlike the second DMRS port indication method described above, according to the third DMRS port indication method, the number of rows referred to by the UE for CW #0 as well as CW #1 in the DMRS table may be reduced.

5.3.5.4. Fourth DMRS Port Indication Method

When a UE configured with the PDSCH-rep-mode receives an indication/configuration that one of the two CWs is disabled from the BS through DCI, the UE may determine the DMRS ports of the enabled CW based on an existing DMRS table (e.g., Tables 14 to 17) that is based on the antenna port field.

More specifically, when CW #1 is disabled, the UE may expect that only one specific TRP/beam transmits CW #0 even though the PDSCH-rep-mode is configured therefor. In addition, the UE may expect that the other TRP/beams do not transmit CW #1. The DMRS ports of CW #0 may be determined based on the existing DMRS table (e.g., Tables 14 to 17) that is based on the antenna port field.

Figure 36:
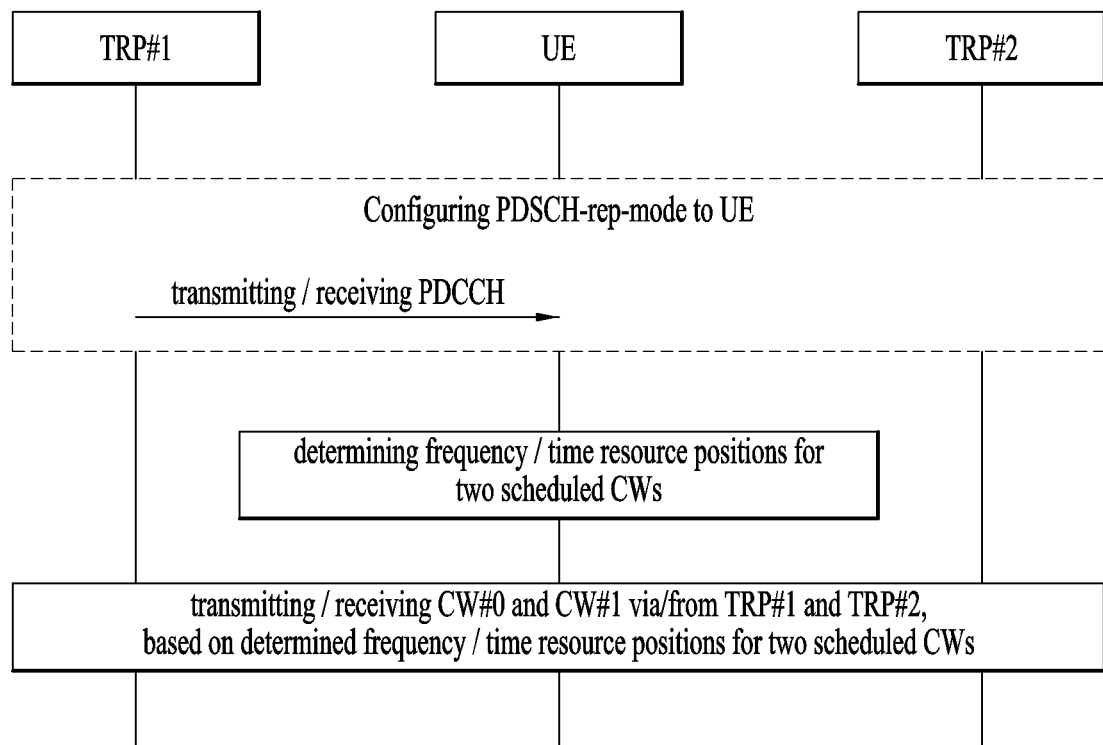
FIG. 36 is a diagram schematically illustrating an exemplary operation of a UE and a base station (e.g., an object including TRP #1 and TRP #2) applicable to the present disclosure.

FIG. 36 is a diagram schematically illustrating an exemplary operation of a UE and a base station (e.g., an object including TRP #1 and TRP #2) applicable to the present disclosure.

In FIG. 36, PDSCH #1 and PDSCH #2 may be composed of coded bits generated from the same information sequence (or the same TB). Additionally, PDSCH #1 and PDSCH #2 in the corresponding configuration may be extended to CW #0 and CW #1, respectively.

First, the PDSCH-rep-mode may be configured for the UE by the BS. As described above in section 5.1.1.1, the configuration may be established through one or more of the following methods.

1) Establishing the configuration through higher layer signaling (e.g., RRC and/or MAC-CE, etc.) of the BS;
2) (i) DCI including CRC scrambled with RNTI for PDSCH-rep-mode is indicated to the UE, and/or (ii) the BS indicates a TCI state (or two TCI states) including two RS sets to the UE through the DCI, and/or (iii) the PDSCH-rep-mode is configured for the UE by higher layer signaling; and 3) (i) The BS indicates/configures two TCI states to the UE through DCI, and (ii) the number of code division multiplexing (CDM) groups allocated through the DCI is 1.

In other words, when the PDSCH-rep-mode is configured based on method 1) between the above-described methods, the UE may additionally receive a PDCCH for scheduling PDSCH #1 and/or PDSCH #2 from TRP #1 or TRP #2.

Alternatively, when the PDSCH-rep-mode is to be configured based on method 2) among the above-described methods, the PDSCH-rep-mode may be configured for the UE based on the determination that (i) the DCI included in a PDCCH for scheduling PDSCH #1 and/or PDSCH #2 received from TRP #1 or TRP #2 includes a CRC scrambled with an RNTI for the PDSCH-rep-mode, and/or (ii) a TCI state (or two TCI states) including two RS sets is indicated.

In addition, based on at least one of the methods according to sections 5.1.2 to 5.1.4 or 5.2.1 to 5.2.3 above, the UE may receive PDSCH #1 (or CW #0 or TB #1) and/or PDSCH #2 (or CW #1 or TB #2) transmitted from TRP #1 and/or TRP #2.

Morqe specifically, the UE may determine whether the frequency resource allocation scheme for two CWs scheduled by a single PDCCH is localized PRGs or distributed PRGs, based on various methods disclosed in section 5.3.1. In addition, the UE may receive a signal indicating specific frequency resource allocation and perform related operations based on various methods disclosed in section 5.3.2.

When it is indicated to the UE that the two CWs are transmitted according to the TDM scheme, the UE may receive a signal indicating time resource allocation for the CWs and perform related operations, based on various methods disclosed in section 5.3.3.

When the two CWs are transmitted to the UE in different frequency regions, the UE may determine a frequency position of the PT-RS for each CW based on various methods disclosed in section 5.3.4.

When the two CWs are transmitted to the UE in different frequency regions, the UE may receive a signal indicating DMRS port indexes of each CW and perform and related operations, based on various methods disclosed in section 5.3.5.

As more specific methods, the methods disclosed above in sections 5.1, 5.2 and 5.3 may be applied.

Figure 37:
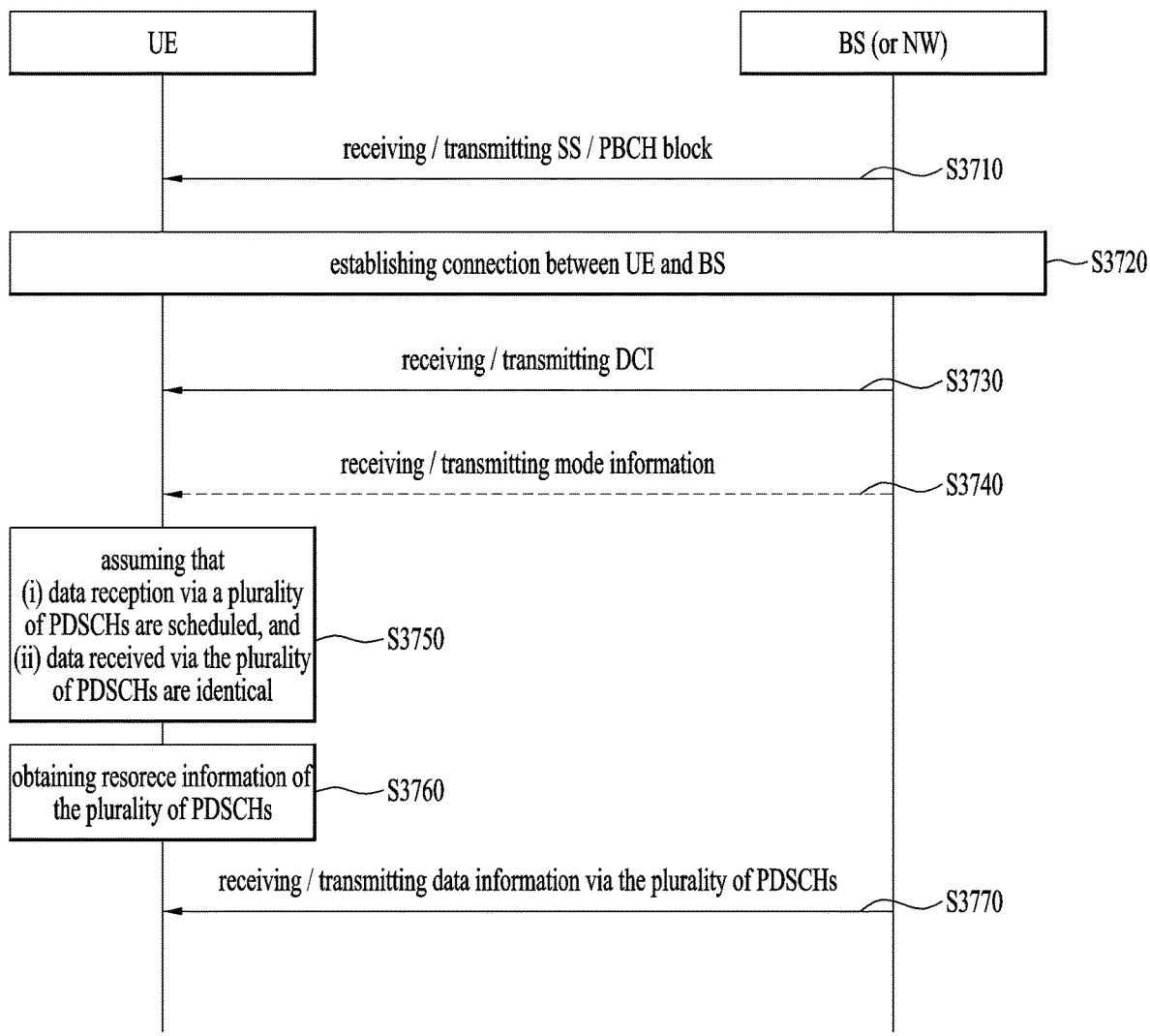
FIG. 37 is a diagram schematically illustrating the operation of a UE and a base station according to an example of the present disclosure.
Figure 38:
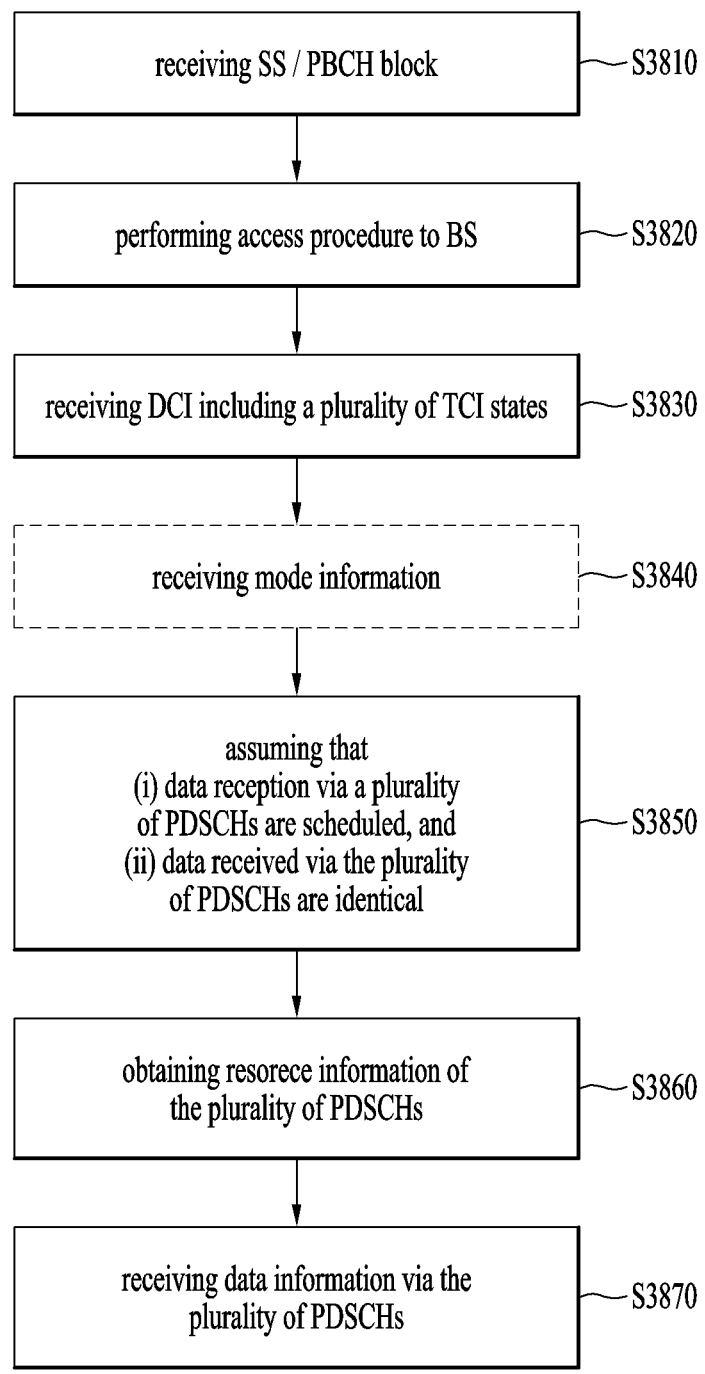
FIG. 38 is a flowchart of an operation of the UE according to an example of the present disclosure.
Figure 39:
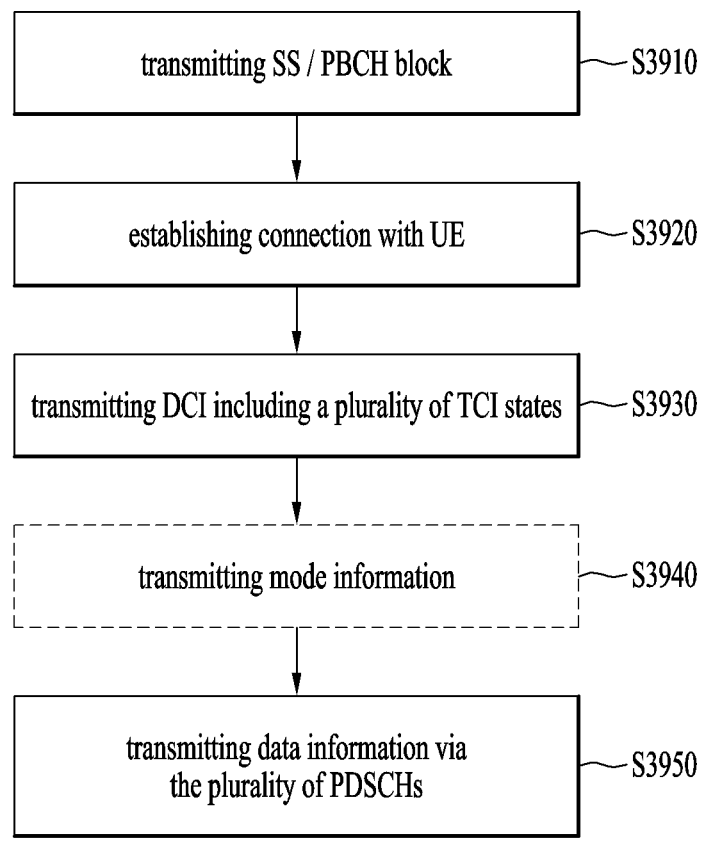
FIG. 39 is a flowchart of an operation of the base station according to an example of the present disclosure.

FIG. 37 is a diagram schematically illustrating the operation of a UE and a BS according to an example of the present disclosure, FIG. 38 is a flowchart of an operation of the UE according to an example of the present disclosure, and FIG. 39 is a flowchart of an operation of the BS according to an example of the present disclosure.

In an example applicable to the present disclosure, the UE may receive an SS/PBCH block including an SS and a PBCH from the BS (S3710 and S3810). In a corresponding operation, the BS may transmit the SS/PBCH block to the UE (S3710 and S3910).

Based on the received SS/PBCH block, the UE may perform a procedure of access to the BS including transmission of a random access channel (RACH) preamble (S3720 and S3820). In response, the BS may establish a connection with the UE (S3720 and S3920).

In addition, the UE and the BS between which the connection is established based on the above-described procedure may operate as follows.

Specifically, the UE may receive downlink control information (DCI) including a plurality of transmission configuration indicator (TCI) states from the BS (S3730, S3830). In a corresponding operation, the BS may transmit the DCI to the UE (S3730, S3830).

In the present disclosure, each of the plurality of TCI states may be related to one RS set.

The UE may obtain, from the BS, mode information related to a first mode in which a plurality of data based on the same information are transmitted.

As an example applicable to the present disclosure, the first mode may include a multi-TRP-based URLLLC (ultra-reliable low latency communication) mode. As another example, the mode information may be related to one of the first mode or a second mode including a multi-TRP-based eMBB (enhanced mobile broadband) mode.

As an example applicable to the present disclosure, the UE may receive the mode information through higher layer signaling including RRC signaling (S3740, S3840). In a corresponding operation, the BS may transmit the mode information to the UE through higher layer signaling (S3740, S3840). In this case, the transmission and reception of the mode information may be performed before or after the transmission and reception of the above-described DCI in the time domain.

Alternatively, as another example applicable to the present disclosure, the UE may obtain the information based on DCI including a cyclic redundancy check (CRC) scrambled with a radio network temporary identifier (RNTI) related to the first mode. In other words, the UE may obtain the mode information related to the first mode without additional signaling.

Based on the DCI and the mode information, the UE may assume that (i) data reception via a plurality of physical downlink shared channels (PDSCHs) is scheduled by the DCI, and (ii) data received via the plurality of PDSCHs is based on the same information (S3750, S3850).

Subsequently, the UE may obtain resource information about the plurality of PDSCHs based on the assumption (S3760, S3860).

In the present disclosure, the DCI may include two TCI states, and the plurality of PDSCHs may include two PDSCHs.

In the present disclosure, based on the size of precoding resource block group (PRG) bundling configured for the UE, (i) the resource information about the plurality of PDSCHs may be determined based on a localized PRG configuration according to the size of PRG bundling configured with a wideband PRG, or (ii) the resource information about the plurality of PDSCHs may be determined based on an interleaved PRG configuration according to the size of PRG bundling set to 2 or 4.

These features may be generalized as follows. For the wideband PRG, first RBs among the RBs allocated to the UE may be assigned to a first TCI state, and the remaining second RBs may be assigned to a second TCI state. In this case, each of the first RBs and the second RBs may be configured as contiguous RBs. Alternatively, for the PRG size set to 2 or 4, even PRGs among the PRGs allocated to the UE may be assigned to the first TCI state, and odd PRGs may be assigned to the second TCI state.

As another example, the DCI may include information for two transport blocks (TBs). In this case, the resource information about the two PDSCHs may be determined based on one of the spatial division multiplexing (SDM), time division multiplexing (TDM), and frequency division multiplexing (FDM) modes based on information related to one of the two TBs related to the DCI.

As another example, the resource information about the two PDSCHs may include frequency resource information about each of the two PDSCHs determined based on the information related to one TB in the information for two TBs included in the DCI.

As a specific example, based on the configuration of PRG bundling configured for the UE, a bundling mode of one of the localized PRG or the interleaved PRG may be configured for the UE. In addition, based on (i) the configured PRG mode and (ii) the information related to the one TB, frequency resource information for each of the two PDSCHs may be configured differently.

In this case, when an odd number of total resource block group (RBG) sizes are allocated to the UE, resources may be allocated for the first/second PDSCHs according to one of the following schemes:
  (i) One more RBG is allocated for the first PDSCH based on configuration in which a first MCS for the first PDSCH between the PDSCHs being higher than a second MCS for the second PDSCH between the PDSCHs;
  (ii) One more RBG is allocated for the second PDSCH based on the first MCS being higher than the second MCS;
  (iii) One more RBG is allocated for the first PDSCH or the second PDSCH based on the first MCS being the same as the second MCS; or
  (iv) One more RBG is allocated for one PDSCH determined based on information related to the one TB between the PDSCHs.

In the present disclosure, the information related to the one TB may be information related to a TB corresponding to a second order between the two TBs. Herein, the information related to the TB corresponding to the second order may include at least one of the followings:
  NDI related to the second TB;
  RV related to the second TB; and
  MCS related to the second TB.

As another example, the resource information about the two PDSCHs may include time resource information about each of the two PDSCHs determined based on information related to one TB in the information for the two TBs included in the DCI.

Here, the time resource information may be related to an offset between the time resource positions for the two PDSCHs. In addition, frequency resources for the two PDSCHs may be configured identically.

Based on the resource information about a plurality of PDSCHs determined based on the method described above, the UE may obtain data information via a plurality of PDSCHs (S3770, S3870). In a corresponding operation, the BS may transmit the data information to the UE through resources indicated by the resource information about the plurality of PDSCHs (S3750, S3950).

In the present disclosure, obtaining the data information by the UE via the two PDSCHs may include (i) obtaining first demodulation reference signal (DMRS) port information for a first PDSCH based on antenna port related information included in the DCI, (ii) obtaining second DMRS port information for a second PDSCH based on information related to one of the two TBs related to the DCI, and (iii) receiving the data information via the first PDSCH and the second PDSCH based on the first DMRS port information and the second DMRS port information.

In the present disclosure, the two PDSCHs may be related to two TCI states, respectively, and the two PDSCHs may be received from different transmission reception points.

In the present disclosure, the UE may additionally (i) determine a frequency position of a phase tracking reference signal (PT-RS) for each of the PDSCHs independently based on frequency resources for each of the two PDSCHs, and (ii) receive the PT-RS for each of the PDSCHs based on the frequency position of the PT-RS for each of the PDSCHs.

In other words, a PT-RS resource mapping pattern for each of the PDSCHs may be determined independently based on RB resources allocated in association with each TCI state. Accordingly, the frequency density of the PT-RS for each of the PDSCHs may be determined based on the number of RGs associated with each TCI state.

It is apparent that examples of the above-described proposed method may also be included as one of the implementation methods of the present disclosure, and accordingly may be regarded as a kind of proposed method. In addition, the above-described proposed methods may be implemented independently, or some of the proposed methods may be combined (or merged) to be implemented. A rule may be defined that the BS shall deliver, to the UE, the information on whether to apply the proposed methods (or information on the rules of the proposed methods) through a predefined signal (e.g., a physical layer signal or a higher layer signal).

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

Embodiments of the present disclosure are applicable to various wireless access systems. The various wireless access systems include, for example, a 3rd generation partnership project (3GPP) or 3GPP2 system. The embodiments of the present disclosure are applicable to all technical fields in which the various wireless access systems find their applications as well as the various wireless access systems. Furthermore, the proposed methods may also be applied to an mmWave communication system using an ultra high frequency band.

Additionally, the embodiments of the present disclosure are applicable to various applications including an autonomous driving vehicle, a drone, and so on.

What is claimed is:

1. A method for operating by a user equipment (UE) in a wireless communication system, the method comprising:
  receiving, from a base station (BS), a synchronization signal/physical broadcast channel (SS/PBCH) block including an SS and a PBCH;
  performing a channel access procedure based on the received SS/PBCH block;
  obtaining, from the BS, configuration information related to repetitive transmission of a plurality of data, the plurality of data being based on same information;
  receiving, from the BS, downlink control information (DCI) including a plurality of transmission configuration indicator (TCI) states;

receiving the plurality of data via a plurality of physical downlink shared channels (PDSCHs) based on the DCI and the configuration information;

obtaining resource information for the plurality of PDSCHs based on the DCI and the configuration information, wherein the plurality of PDSCHs includes a first PDSCH and a second PDSCH;

obtaining first demodulation reference signal (DMRS) port information for the first PDSCH based on information included in the DCI;

obtaining second DMRS port information for the second PDSCH based on the information included in the DCI; and receiving the first PDSCH and the second PDSCH based on the first DMRS port information and the second DMRS port information.

2. The method of claim 1, wherein the DCI includes two TCI states,
wherein the plurality of PDSCHs includes two PDSCHs.

3. The method of claim 2,
wherein the two PDSCHs are each related to two TCI states,
wherein the two PDSCHs are received from different transmission reception points.

4. The method of claim 1,
wherein the resource information is related to an offset between time resource positions for the PDSCHs,
wherein frequency resources for the PDSCHs are identically configured.

5. A user equipment (UE) configured to operate in a wireless communication system, comprising:
at least one transmitter;
at least one receiver;
at least one processor; and
at least one memory operably connected to the at least one processor and configured to store instructions causing, when executed, the at least one processor to perform operations comprising:
receiving, from a base station (BS), a synchronization signal/physical broadcast channel (SS/PBCH) block including an SS and a PBCH;
performing a channel access procedure based on the received SS/PBCH block;

receiving, from the BS, downlink control information (DCI) including a plurality of transmission configuration indicator (TCI) states;

obtaining, from the BS, configuration information related to repetitive transmission of a plurality of data, the plurality of data being based on same information;

receiving, from the BS, downlink control information (DCI) including a plurality of transmission configuration indicator (TCI) states;

receiving the plurality of data via a plurality of physical downlink shared channels (PDSCHs) based on the DCI and the configuration information;

obtaining resource information for the plurality of PDSCHs based on the DCI and the configuration information, wherein the plurality of PDSCHs includes a first PDSCH and a second PDSCH;

obtaining first demodulation reference signal (DMRS) port information for the first PDSCH based on information included in the DCI;

obtaining second DMRS port information for the second PDSCH based on the information included in the DCI; and receiving the first PDSCH and the second PDSCH based on the first DMRS port information and the second DMRS port information.

6. The UE of claim 5, wherein the DCI includes two TCI states,
wherein the plurality of PDSCHs includes two PDSCHs.

7. The UE of claim 6,
wherein the two PDSCHs are each related to two TCI states,
wherein the two PDSCHs are received from different transmission reception points.

8. The UE of claim 5,
wherein the resource information is related to an offset between time resource positions for the PDSCHs,
wherein frequency resources for the PDSCHs are identically configured.

9. The UE of claim 5,
wherein the UE is configured to communicate with at least one of a mobile terminal, a network, or an autonomous vehicle other than a vehicle including the UE.

* * * * *